(12) United States Patent
Jammes et al.

(10) Patent No.: US 6,484,149 B1
(45) Date of Patent: Nov. 19, 2002

(54) SYSTEMS AND METHODS FOR VIEWING PRODUCT INFORMATION, AND METHODS FOR GENERATING WEB PAGES

(75) Inventors: Pierre J. Jammes, Bellevue, WA (US); D. Chase Franklin, Seattle, WA (US); Darren B. Remington, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/948,453

(22) Filed: Oct. 10, 1997

(51) Int. Cl.$^7$ .............................................. G06F 17/60
(52) U.S. Cl. ....................................................... 705/26
(58) Field of Search ................................ 705/26, 27, 28

(56) References Cited

U.S. PATENT DOCUMENTS

| | | | | |
|---|---|---|---|---|
| 5,491,795 A | * | 2/1996 | Beaudet et al. | 345/346 |
| 5,715,314 A | * | 2/1998 | Payne et al. | 380/24 |
| 5,745,681 A | * | 4/1998 | Levine et al. | 705/26 |
| 5,790,116 A | * | 4/1998 | Malone et al. | 345/335 |
| 5,757,917 A | * | 5/1998 | Rose et al. | 380/25 |
| 5,848,399 A | * | 12/1998 | Burke | 705/27 |
| 5,855,015 A | * | 12/1998 | Shoham | 707/5 |
| 5,897,622 A | * | 4/1999 | Blinn et al. | 705/26 |
| 5,956,487 A | * | 9/1999 | Venkatraman et al. | 340/825.06 |
| 5,970,471 A | * | 10/1999 | Hill | 705/26 |
| 6,014,638 A | * | 1/2000 | Burge et al. | 705/27 |

* cited by examiner

Primary Examiner—Matthew Smithers
(74) Attorney, Agent, or Firm—Lee & Hayes, PLLC

(57) ABSTRACT

A system and method for designing and operating an electronic store (1) permit a merchant to organize and advertise descriptions of product inventory over the Internet, (2) permit Web page information to be extracted on-demand from a product inventory database, and (3) permit Web pages to be automatically customized to fit shopping behaviors of individual consumers. A graphical store design user interface of a Web browser displays a hierarchical representation of products and, product groups of an electronic store. A user manipulates icons of the Web browser store design user interface to cause a Web server to modify relationships between products and product groups stored in a product information database. A store designer creates HTML template files, embeds database and customize references within the template files, and assigns template files to groups or products of the electronic store.

The Web server receives requests to access Web pages from consumers using standard Web browsers. The Web server opens a template file related to the requested Web page, creates hyperlinks and other information content by executing database references embedded within the template file, and merges the hyperlinks and content with the template file to generate an HTML Web page to send to the Web browser. The Web server automatically creates additional hyperlinks to any Web pages or products preferred by the consumer by executing customize instructions associated with customize references in a template file. To determine whether any products or Web pages are preferred by a consumer, the Web server examines a traffic analysis database and extracts the consumer's history of accesses to Web pages and orders of products. For each Web page the consumer has accessed, the Web server uses preferred page rules to determine whether the page was accessed with sufficient frequency to generate a hyperlink to the page. For each product the consumer ordered, the Web server uses preferred product rules to determine whether the product was ordered with sufficient frequency to generate a hyperlink to a page offering the product.

17 Claims, 27 Drawing Sheets

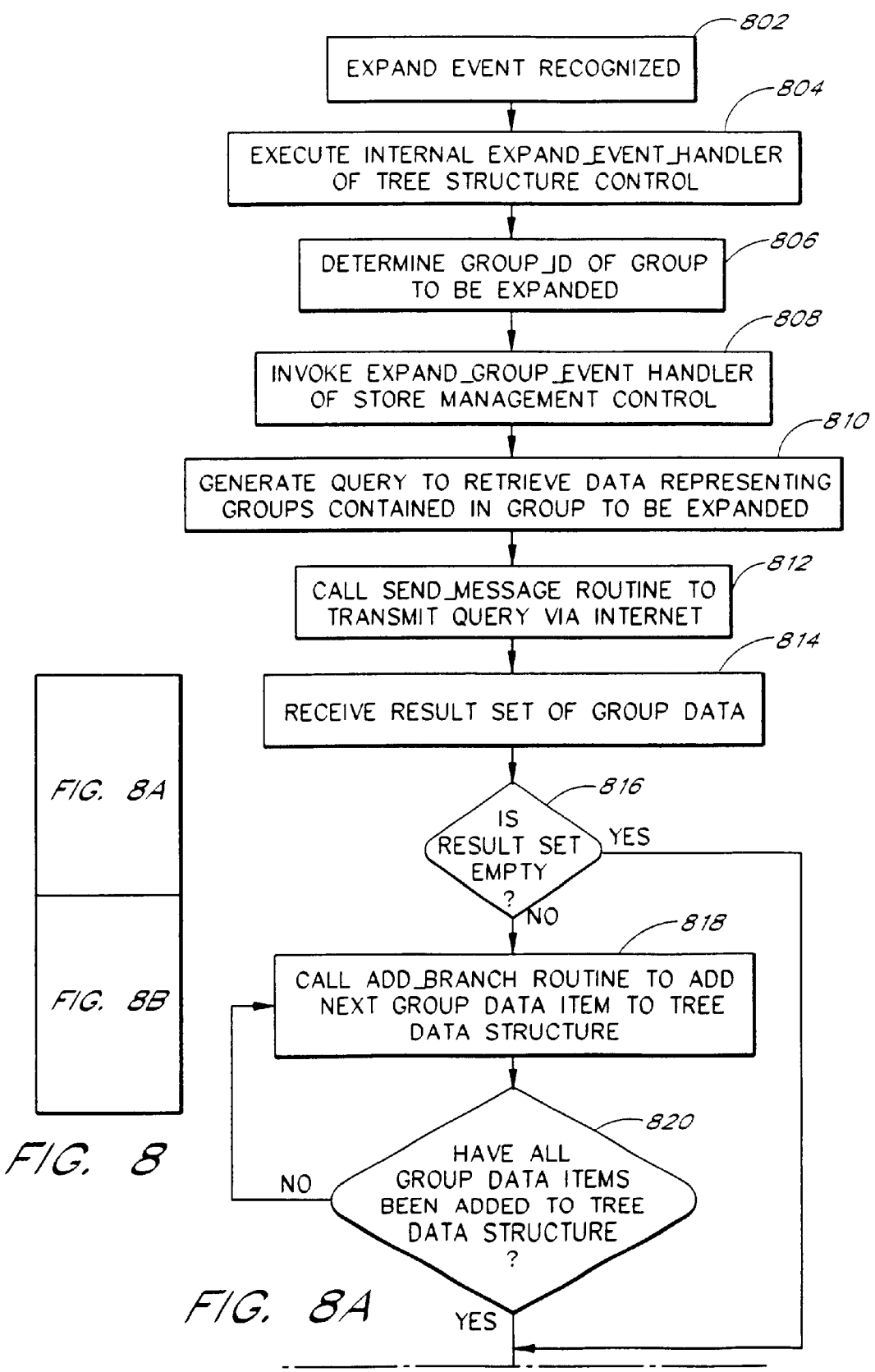

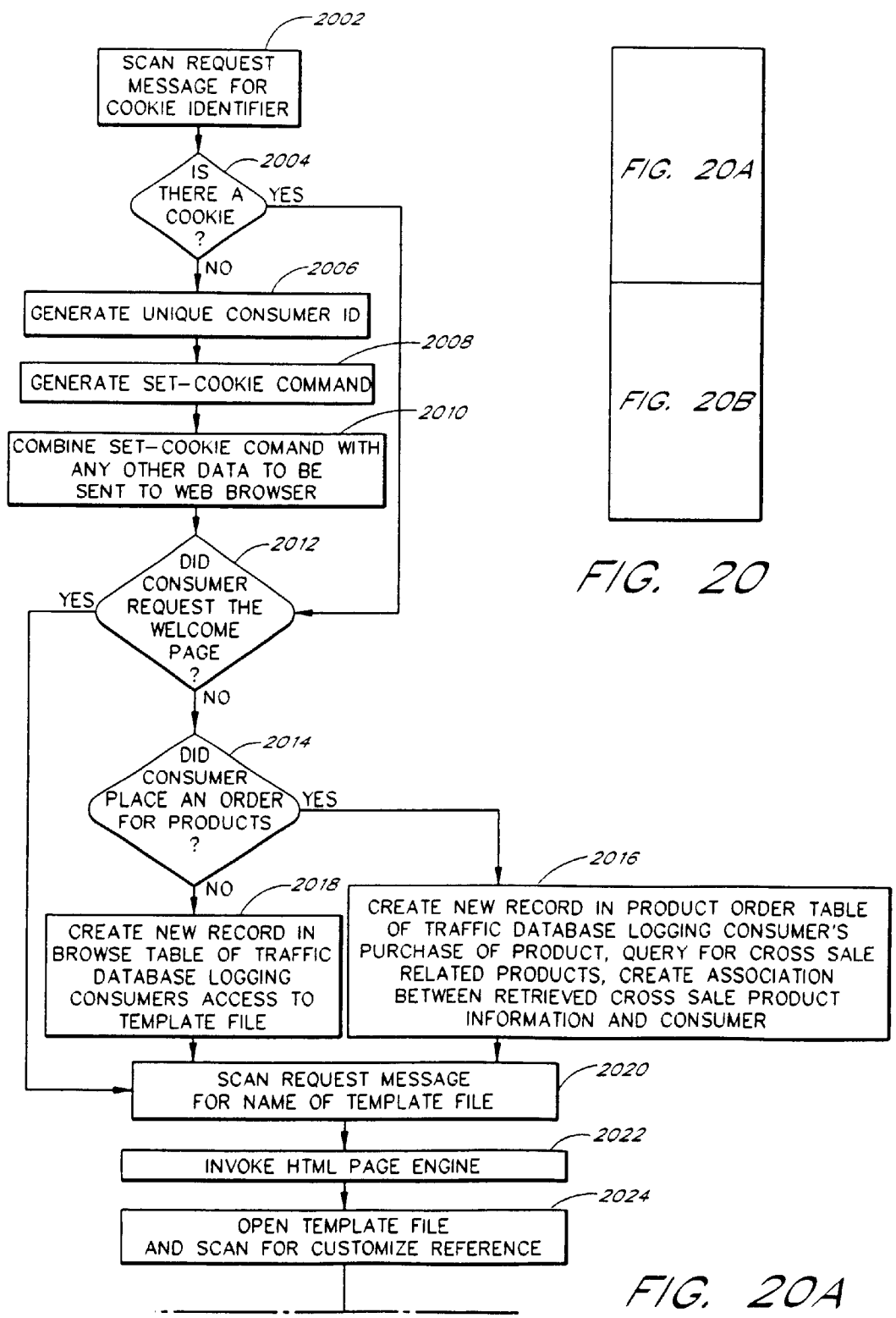

SYSTEMS AND METHODS FOR VIEWING PRODUCT INFORMATION, AND METHODS FOR GENERATING WEB PAGES

BACKGROUND OF THE INVENTION

This invention relates to computer-based shopping. More specifically, the present invention relates to software tools for developing and operating Web sites.

Electronic shopping systems currently exist which permit merchants to sell inventory to consumers over a computer network. Merchants now use computers to publish information about their products on one or more electronic pages (e.g., text and graphics displayable on a computer screen) and to elicit product orders from consumers. Likewise, consumers use computers to access information describing products and to communicate orders to a merchant.

With the increasing popularity and accessibility of the Internet, and particularly the World Wide Web, the number of merchants using and desiring to use the World Wide Web to advertise and sell products is growing rapidly. The World Wide Web is a global information system in which information is exchanged over the Internet using a set of standard protocols. An existing Web-based electronic store typically comprises a collection of Web pages which describe inventory and which include on-line forms allowing consumers to place orders. Consumers use Web browsers to access the Web pages of electronic stores to examine information about available products and to submit product orders.

As described in more detail below, existing Web site development tools are not well suited to the task of developing and managing the content of an electronic store, and do not provide the functionality and flexibility needed by developers to efficiently generate and control a dynamic store environment of the type needed in the electronic marketplace. Existing systems and methods for designing and maintaining electronic stores are burdensome or require a high level of technical knowledge or both. The present invention seeks to solve these and other problems.

SUMMARY OF THE INVENTION

According to one existing method of designing and managing an electronic store, the electronic store is generated by manually assembling and compiling a collection of fixed Web pages. This method generally requires the store designer to have an intimate knowledge of HTML (HyperText Markup Language) to update the content or format of any page. As required by this method, a store designer must learn numerous HTML tags as well as specific parameters for each tag. The store designer uses a standard text editor to edit Web pages by embedding tags, parameters and informational content in text files representing the Web pages.

The burden of altering the content or format of individual Web pages has been eased somewhat by HTML authoring systems which permit Web page designers to work in a WYSIWYG (What You See Is What You Get) manner. Users of existing HTML authoring systems do not need to learn HTML and, instead, use visually oriented commands such as 'bold,' 'italic' or 'center justify' to emphasize or position informational content. A user sees only the visual effect of the command, while the HTML authoring system embeds HTML tags in an underlying text file.

However, a merchant's inventory typically fluctuates greatly, and electronic catalogs require frequent updating due, for example, to changes in product availability and price, the introduction of new products or product lines, upcoming promotions, or product discontinuances. Many merchants use an inventory control system to manage their ever-changing inventory. Yet, it is highly inefficient for a merchant to have to both update inventory through an inventory control system and also use an HTML authoring system to ensure that the same set of changes are accurately reflected in a collection of Web pages.

Moreover, the different inventory control systems commonly use very different types of databases to host the inventory data and use different hardware and software platforms. Very few, if any, of these inventory control systems make information accessible via the World Wide Web, and many merchants do not have the time, skill or resources to design or develop software extensions that would make their inventory control systems compatible with the World Wide Web.

Many merchants now operating electronic stores simply lease Web server resources from a Web service provider and hire skilled technicians to periodically update store Web pages. These merchants thus have no direct control over their electronic stores and have no automated way of taking information from an existing inventory control system and moving that information into a collection of Web pages. What is needed is a way of providing merchants full control over the design and content of their electronic stores and a way to automatically transfer current information from inventory control systems into Web pages.

Another problem encountered by merchants attempting to operate electronic stores is the tedious job of periodically adding or deleting categories of products and reorganizing products into different categories. Many on-line catalogs presenting inventories of electronic stores use a top-down menu approach wherein an initial catalog page appearing on a consumer's computer screen lists general product categories. If a user selects one of the general categories, another page appears on the computer screen presenting a narrower subordinate menu of product lines. Thus, a user navigates from high level menus to lower level menus, eventually reaching a page that describes an individual product. This type of menu navigation is popular on the Internet and on other networks, because it is easy for consumers to understand, and allows consumers to reach a particular product in a convenient and timely manner. However, top-down menu style catalogs are difficult to design and maintain. This is because each of the pages of such a catalog typically includes multiple hyperlinks, each hyperlink providing a precise reference to another page. As a result, a change to one page may require changes to many other pages, creating a complicated and tedious editing job.

More specifically, to effectively use the World Wide Web for advertising and selling products, merchants must create and edit not only the categories and products presented on a page, but also the hyperlinks tying a set of Web pages together such that a user can navigate the pages conveniently. This process is tedious, time consuming, and highly susceptible of introducing errors, especially when altering hyperlinks of a large set of Web pages.

The present invention overcomes these and other problems by providing a software architecture for allowing merchants to design and efficiently manage computer network-based electronic stores. In one embodiment of the present invention, a software system is provided which includes software tools permitting a store designer to use an enhanced Web browser to design and manage an electronic store. The software system is referred to herein as the Merchant Workbench. Using the Merchant Workbench, the store designer uses a graphical user interface to create and edit product information, establish categories of products, and organize a navigable hierarchy of products and categories. The Merchant Workbench allows a merchant having little or no knowledge of HTML coding or database queries to design an electronic store wherein a collection of template Web pages is integrated with a product information database (or inventory control system) such that information is extracted on-demand from the database, merged with the Web page templates, and presented to consumers.

In a preferred embodiment, the Merchant Workbench includes an enhanced Web browser that accesses an electronic store design application via the Internet. Thus, even though an Web site is hosted by a stationary computer—even one leased from a Web service provider—the user (e.g., a merchant) can design and modify the organization and inventory of the store from almost anywhere in the world (i.e., any geographic location having standard telephone lines).

In operation, the enhanced Web browser accesses Web pages of an electronic store design application (hosted by a store Web site) to generate a graphical user interface. This graphical user interface displays information about the products and groups of products offered by the electronic store. Specifically, the graphical user interface displays icons, each of which represents either a group (i.e., category) of products or an individual product. The graphical user interface arranges the icons to visually illustrate hierarchical relationships between the groups and products sold by the electronic store (e.g., an 'Automotive' group contains a 'Sedans' group, and the 'Sedans' group contains a 'Toyota Camry' product, a 'Honda Accord' product, and a 'Mercury Sable' product).

The flexibility provided by the Merchant Workbench in designing a store structure advantageously permits a merchant to design an electronic store having a navigational layout which resembles an actual store. For example, the hierarchy comprising products and product groups may be conveniently based on the product categorization for an actual store, such as floors, departments, subdepartments, aisles, shelves, and individual products. Thus, even consumers new to the Internet experience friendly and familiar shopping elements.

In one implementation of the Merchant Workbench, the graphical user interface of the enhanced Web browser displays the hierarchy of an electronic store using the same model utilized by many personal computer operating systems to graphically display the file structure hierarchy of a computer storage medium, such as a floppy disk, hard disk, or CD-ROM. Such hierarchical displays are generated, for example, by the File Manager program of Windows® version 3.1 and by the Microsoft Explorer program of Windows® 95. These hierarchical displays show a subordinate file directory level as an icon positioned below and to the right of an icon representing a parent directory.

Using an hierarchical display model familiar to millions of personal computer users reduces the need for merchants to learn a new interface. In one embodiment of the present invention, an icon representing a store is related to subordinate icons representing departments of the store which, in turn, are related to further subordinate icons representing subdepartments of the store, each of which may be related to a collection of icons (or other screen elements) representing individual products.

To modify information about a product or a group using the enhanced Web browser, a merchant selects a representative icon, enters or modifies product or group information, and stores the data in the product information database. The merchant can also perform simple drag-and-drop operations on icons to modify relationships between products, groups, or both (e.g., an icon representing a 'Geo Prism' product is dragged from a location hierarchically subordinate to a 'Sedans' group icon and dropped at a location hierarchically subordinate to an 'Economy Car' group icon, thereby creating a relationship between the 'Geo Prism' product and the 'Economy Car' group and deleting the relationship between the 'Geo Prism' product and the 'Sedans' group).

Data records of a product information database store information comprising an inventory of an electronic store, including information about products and groups and the relationships between them. Software tools of the Merchant Workbench create and update the data records of the product information database in response to user manipulation of the graphical user interface.

The Merchant Workbench provides a further advantage over present electronic store systems by monitoring the shopping behavior of consumers to gather traffic analysis data, and by using the traffic analysis data to customize the navigable store hierarchy presented to each consumer. The store hierarchy presented to each consumer is customized according to recorded shopping habits of the particular consumer to make the on-line shopping experience more convenient and expedient as well as more pleasant.

In another advantage over present electronic store systems, the Merchant Workbench stores information indicating that particular products (cross-sale products) are often sold together. Consumers ordering one of such products are automatically presented with links to web pages describing related products.

BRIEF DESCRIPTION OF THE DRAWINGS

A preferred embodiment ("Merchant Workbench") of the present invention will be described below in connection with the accompanying drawing figures in which:

FIGS. 8A and 8B illustrate steps performed to update the store design user interface upon recognition of an expand event;

FIGS. 20A and 20B illustrate steps performed to assign a consumer identifier to a consumer and to record an access to a Web page or to record an order for a product.

DETAILED DESCRIPTION OF THE PREFERRED EMBODIMENT

I. Glossary of Terms and Acronyms

Figure 1:
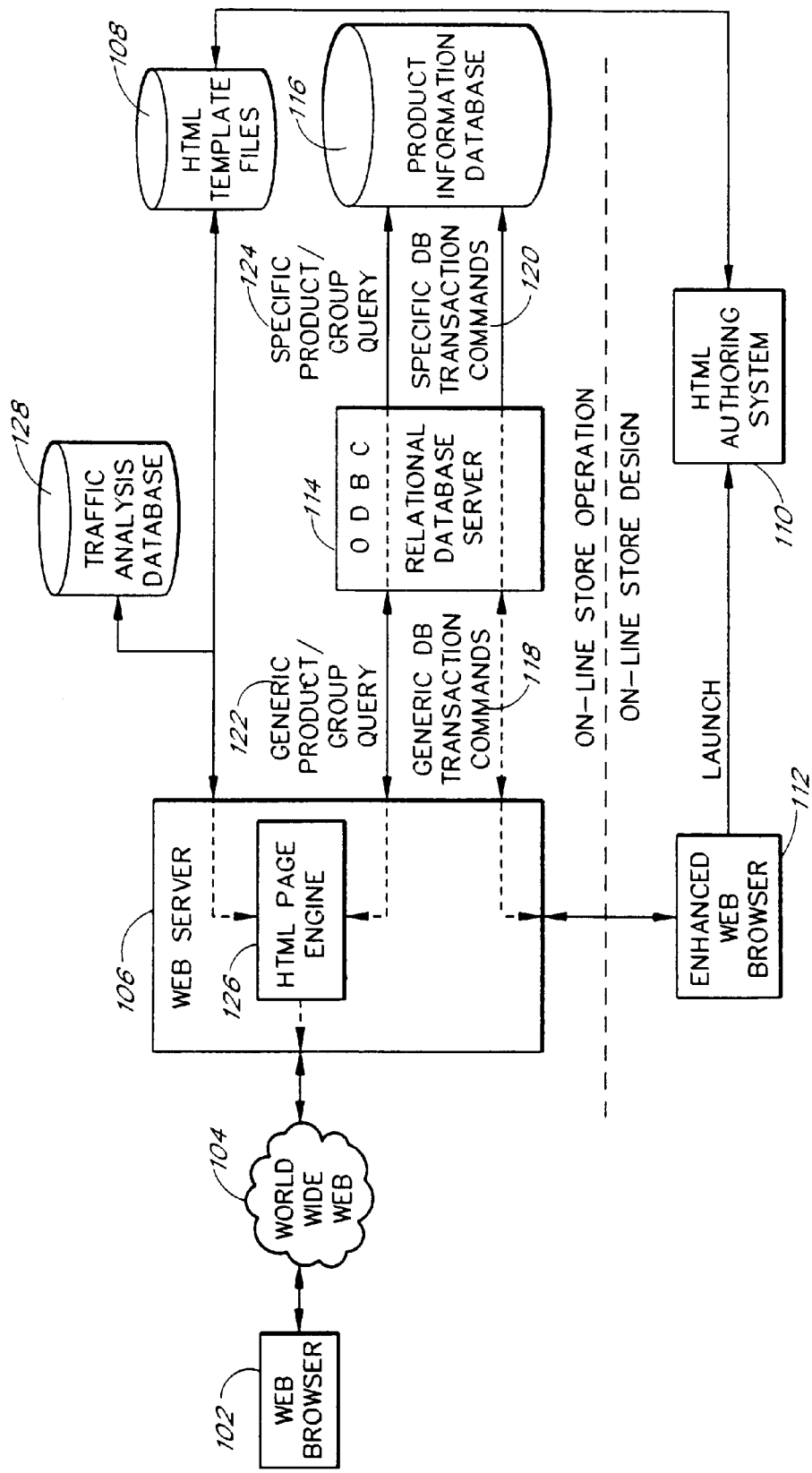
FIG. 1 illustrates components of a Merchant Workbench in accordance with the present invention for designing and operating an electronic store over the Internet.

The following terms, definitions and explanations are intended to facilitate an understanding of the detailed description, and should also be considered when evaluating the scope of the claims. Additional definitions are provided throughout the detailed description.

Internet. The Internet is a collection of interconnected public and private computer networks that are linked together by a set of standard protocols (such as TCP/IP, HTTP, FTM and Gopher) to form a global, distributed network.

Document. Generally, a collection of data that can be viewed using an application program, and that appears or is treated as a self-contained entity.

An "HTML document" is a special type of document which includes HTML (HyperText Markup Language) codes to permit the document to be viewed using a Web browser program. An HTML document that is accessible on a World Wide Web site is commonly referred to as a "Web document" or "Web page." Web documents commonly include embedded components, such as GIF (Graphics Interchange Format) files, which are represented within the HTML coding as links to URLs. (See "HTML" and "URL" below.)

Hyperlink. A navigational link from one document to another, or from one portion (or component) of a document to another. Typically, a hyperlink is displayed as a highlighted word or phrase that can be clicked on using the mouse to jump to the associated document or document portion.

Hypertext System. A computer-based informational system in which documents (and possibly other types of data entities) are linked together via hyperlinks to form a user-navigable "web." Although the term "text" appears within "hypertext," the documents and hyperlinks of a hypertext system may (and typically do) include other forms of media. For example, a hyperlink to a sound file may be represented within a document by a graphic image of an audio speaker.

World Wide Web. A distributed, global hypertext system, based on an set of standard protocols and conventions (such as HTTP and HTML, discussed below), which uses the Internet as a transport mechanism. A software program which allows users to request and view World Wide Web ("Web") documents is commonly referred to as a "Web browser," and a program which responds to such requests by returning ("serving") Web documents is commonly referred to as a "Web server."

Web Site. As used herein, "web site" refers generally to a database or other collection of inter-linked hypertextual documents (and associated data entities) which is accessible via a computer network, and which forms part of a larger, distributed informational system. Depending upon its context, the term may also refer to the associated hardware and/or software server components used to provide access to such documents. When used herein with initial capitalization (i.e., "Web site"), the term refers more specifically to a web site of the World Wide Web. (In general, a Web site corresponds to a particular Internet domain name, such as "merc-int.com," and includes information content associated with a particular organization.) Other types of web sites may include, for example, a hypertextual database of a corporate "intranet" (i.e., an internal network which uses standard Internet protocols), or a site of a hypertext system that uses document retrieval protocols other than those of the World Wide Web.

Web Browser. As used herein, "web browser" refers generally to a data retrieval tool capable of navigating and accessing inter-linked hypertextual documents over a computer network and displaying information from an accessed document on a computer screen. Depending upon its context, the term may also refer to the associated hardware and/or software server components used to navigate and access such documents. When used herein with initial capitalization (i.e., "Web browser"), the term refers more specifically to a web browser of the World Wide Web which navigates and accesses Web pages. Other types of web browser may include, for example, a tool for accessing a hypertextual database of a corporate "intranet" (i.e., an internal network which uses standard Internet protocols), or a tool to access documents of a hypertext system that uses document retrieval protocols other than those of the World Wide Web. A web browser may be implemented as a collection of instructions stored on computer storage media (e.g., disk drive media, CD-ROM, ROM, EPROM, etc.), the instructions executable by a computer as an application program, as part of the operating system, as a dedicated function of network computer, or a combination of these or other forms for loading and executing instructions.

Content Object. As used herein, a data entity (document, document component, etc.) that can be selectively retrieved from a web site. In the context of the World Wide Web, common types of content objects include HTML documents, GIF files, sound files, video files, Java applets, and downloadable applications. Each object has a unique identifier (referred to as the "URL") which specifies the location of the object. (See "'URL" below.)

URL (Uniform Resource Locator). A unique address which fully specifies the location of a content object on the Internet. The general format of a URL is protocol:// machine-address/path/filename. (As will be apparent from the context in which it is used, the term "URL" is also used herein to refer to the corresponding content object itself.)

HTML (HyperText Markup Language). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transmitted by a Web server to a Web browser, the codes are interpreted by the browser and used to parse and display the document. In addition to specifying how the Web browser is to display the document, HTML tags can be used create hyperlinks to other Web documents. For more information on HTML, see Ian S. Graham, *The HTML Source Book*, John Wiley and Sons, Inc., 1995 (ISBN 0471-11894-4).

HTTP (Hypertext Transfer Protocol). The'standard World Wide Web clientserver protocol used for the exchange of information (such as HTML documents, and client requests for such documents) between a Web browser and a Web server. HTTP includes several different types of messages which can be sent from the client to the server to request different types of server actions. For example, a "GET" message, which has the format GET <URL>, causes the server to return the content object located at the specified URL.

CGI (Common Gateway Interface). A standard interface which specifies how a Web server (or possibly another information server) launches and interacts with external programs (such as a database search engine) in response to requests from clients. With CGI, the Web server can serve information which is stored in a format that is not readable by the client, and present such information in the form of a client-readable Web page. A CGI program (called a "CGI script") may be invoked, for example, when a Web user fills out an on-screen form which specifies a database query. For more information on CGI, see Ian S. Graham, *The HTML Source Book*, John Wiley and Sons, Inc., 1995 (ISBN 0471-11894-4), pp. 231–278.

ISAPI (Internet Server Application Program Interface). Microsoft's interface for allowing a Web server (or other information server) to launch and interact with external programs in response to requests from clients. ISAPI programs are in the form of dynamic link libraries (DLLs) which run in the same process space as the Web server. Thus, ISAPI performs a similar function to that of CGI, but without requiring the launching of a separate process. Documentation on ISAPI is available from Microsoft Corporation as part of the Microsoft Internet Information Server Software Development Kit.

The present invention is directed to software tools and associated methods for designing and operating an electronic store via a distributed network such as the Internet. In the preferred embodiment these software tools and associated methods are embodied within a software system referred to as the Merchant Workbench. In accordance with the invention, a consumer uses a standard Web browser to access an electronic store, and a store designer uses an enhanced Web browser (a component of the Merchant Workbench) to establish and manage inventory information for the electronic store and to organize the presentation of that inventory through a collection of linked Web pages.

FIG. 1 illustrates components of the Merchant Workbench for designing and operating an electronic store over the Internet. A Web browser 102 sends and receives data over the World Wide Web 104. An Web server 106 also sends and receives data over with the World Wide Web 104. The Web server 106 accesses HTML template files 108 stored on accessible computer storage media. An HTML authoring system 110 is used to create and modify HTML template files 108.

Many HTML authoring systems exist which can be used with the present invention to create HTML template files 108. Each HTML template file 108 provides a background for one or more Web pages of an electronic store. The background may consist of a solid color or multi-colored pattern, fixed text displayed in various fonts, sizes, and colors, or one or more graphic illustrations, or a combination of all of these. Moreover, each HTML template file may also contain SQL queries used to designate data to be merged with the template when a shopper requests a page of the electronic store. Such queries will be further described herein. Additionally, the template may contain HTML commands (HTML tags) to format the result set generated by the SQL queries.

The enhanced Web browser 112 communicates directly or indirectly with a Web server 106. The communication between the enhanced Web browser 112 and the Web server 106 can take place across the World Wide Web 104, or over a local area network comprising at least two computers wherein the enhanced Web browser 112 runs on a first computer and the Web server 106 runs on a second computer. Also, the enhanced Web browser 112 and the Web server 106 could operate at the same time on a single computer running a multi-tasking operating system such as Microsoft Windows™, Microsoft Windows 95™, or Microsoft Windows NT™.

The enhanced Web browser 112 initiates data transactions with the product information database 116. The enhanced Web browser 112 issues database transaction commands to the Web server 106, which in turn issues those transaction commands to a relational database server 114. In a preferred embodiment, the relational database server 114 utilizes open database connectivity (ODBC).

Relational database servers 114 utilizing ODBC are known in the art. One function of such relational database servers is to provide to application programs a common query interface to interact with multiple database systems having different query interfaces. Methods for providing such common query interfaces are not within the scope of this invention and will not be further discussed.

The Web server 106 passes generic database transaction commands (or queries) received from the enhanced Web browser 112 to the relational database server 114. The relational database server 114 formats the generic database transaction commands 118 received from the Web server 106 as necessary to generate specific database transaction commands required to retrieve, store, or modify information stored in the product information database 116.

The Web server 106 receives requests generated by a standard Web browser 102 on a consumer computer. The standard Web browser 102 provides general capability to request data pages over the World Wide Web by including a URL value in an HTTP-coded request and transmitting that request. Known Web browsers such as Netscape Navigator™ 2.2 or Microsoft Explorer™ 3.0 are examples of standard Web browsers.

In response to a request for a page, an HTML page engine 126 of the Web server 106 assembles an HTML page. Pages requested by a consumer running a Web browser 102 do not, in many cases, exist prior to the request. The HTML page engine 126 processes the information stored in the HTML template file 108, extracts SQL queries from the template, and issues these generic product or category queries 122 to the relational database server 114, which in turn issues a specific product or group (i.e., category of products) query 124 to the product information database 116. The HTML page engine 126 receives the results of a product or group query and merges data from the query with a template file 108 to generate an HTML page.

The HTML page engine also accesses a traffic analysis database 128 to examine prior interactions between a consumer and an electronic store to determine whether Web pages are customized for the consumer. To customize a Web page, the HTML page engine generates additional HTML hyperlinks for the Web page, enabling the consumer to more conveniently access preferred products or preferred Web pages. The HTML page is then routed via the Worldwide Web 104 to the Web browser 102 to satisfy the consumer's request.

The components described in FIG. 1 are used both to design an electronic store and also to operate an electronic store. Specifically, the HTML authoring system 110 and the enhanced Web browser 112 provide functionality for designing and maintaining an electronic store. Many HTML authoring systems 110 exist which can be used in connection with the Merchant Workbench, such as Microsoft FrontPage™, or Microsoft Visual Interdev™. Methods used by HTML authoring systems to produce HTML-coded information are well known in the art and will not be discussed further. However, aspects of the enhanced Web browser 112 permitting design of the structure of an electronic store are included in the present invention.

The Web server 106, having access to HTML template files 108 and also having access to data from the product information database 116 via the relational database server 114, provides functionality for operating an electronic store. Neither the enhanced Web browser 112 nor the HTML authoring system 110 are needed to operate an electronic store.

A. Design and Modification of an Electronic Store

Figure 2:
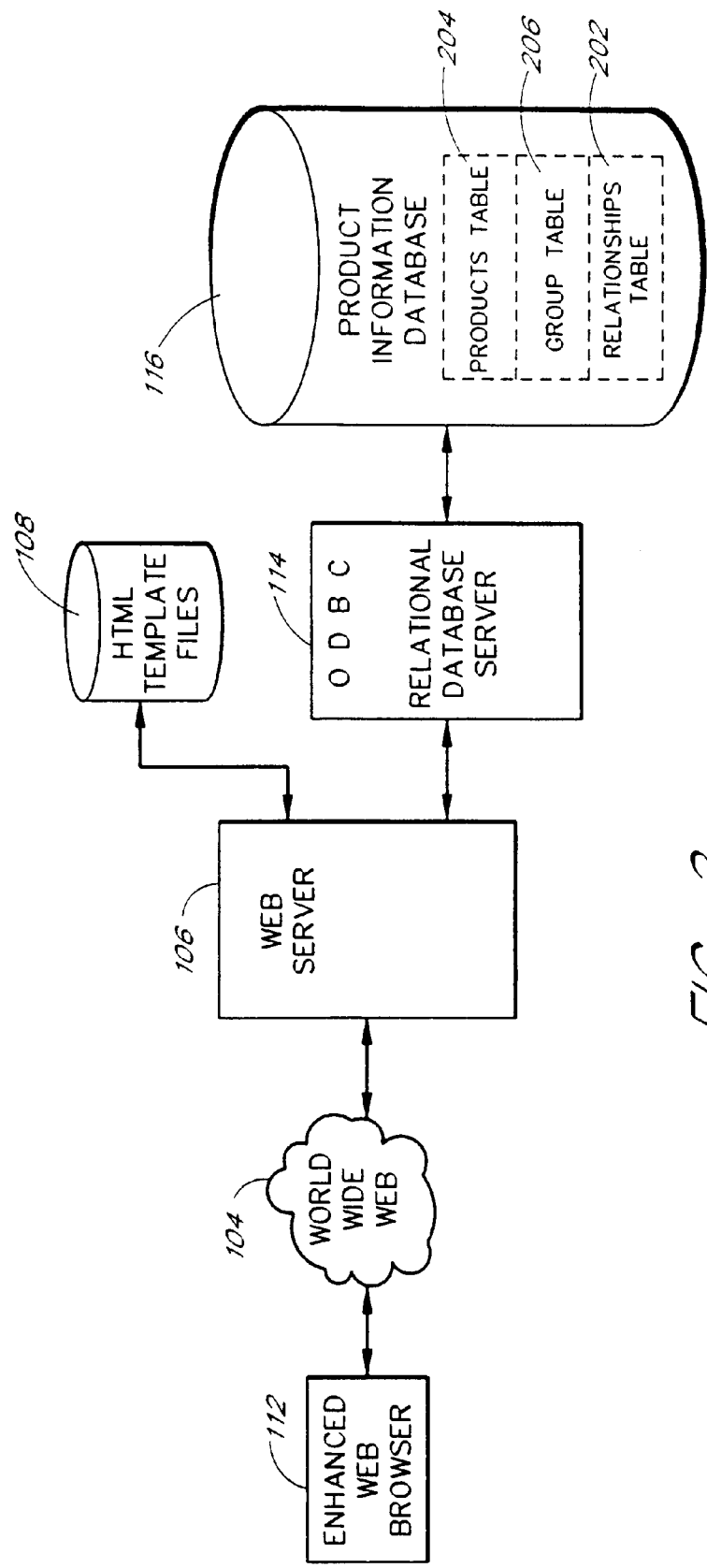
FIG. 2 illustrates components of the Merchant Workbench used to design an electronic store.

FIG. 2 illustrates software components of the Merchant Workbench used to design an electronic store. An enhanced Web browser 112 communicates via the World Wide Web 104 with a Web server 106. The Web server 106 accesses HTML template files 108, as well as product information from a product information database 116.

The enhanced Web browser 112 permits a merchant to design an electronic store over the Internet. A merchant using the enhanced Web browser 112 creates data records which represent products and groups (i.e., product categories) and also relationships between them. These data records are stored in the product information database 1 16.

The product information database 116 can be hosted by a number of different relational database systems. For example, existing database products such as Oracle™ or Microsoft SQL Server™ could each be used to store and manage product information. Even though each such database product may accept a different set of commands for performing similar transactions, the relational database server 114 allows the Web server 106 to communicate with any of these database products using a uniform command interface.

A user of the Merchant Workbench organizes the structure of an electronic store by establishing and maintaining relationships between products and groups of products. A products table 204 maintains information about products offered for sale. Table 1 describes the fields of each data record of the products table. A groups table 206 maintains information about groups of products offered for sale. The fields of each data record of the groups table 206 are described below in Table 2 . The relationships between products and groups are stored in a relationships table 202. Table 3 describes the fields of each record of the relationships table 202. Note, that the names of the fields are descriptive of the information stored in each.

TABLE 1

Products Table

Merchant_ID
Product_ID
Name
Short_Description
Template_File_Name
Small_Image_File_Name
Large_Image_File_Name
Manufacturer_ID
No_Sale_Before_Date
No_Sale_After_Date
Unit_Measure
Currency
Price
Weight
Height
Width
Length
Shipping_Restriction_Flag
Shipping_Cost
Handling_Cost
Tax_Code
Status
Attribute_1
Attribute_2
Attribute_3
Attribute_4

TABLE 2

Groups Table

Merchant_ID
Group_ID
Group_Name
Parent
Short_Description
Template_File_Name
Small_Image_File_Name
Reference
No_Sale_Before_Date
No_Sale_After_Date
Attribute_1
Attribute_2
Attribute_3
Attribute_4

TABLE 3

Relationships Table

Merchant_ID
ID
ID_Type
Relationship
Related_ID
Related_I_Type

Figure 3:
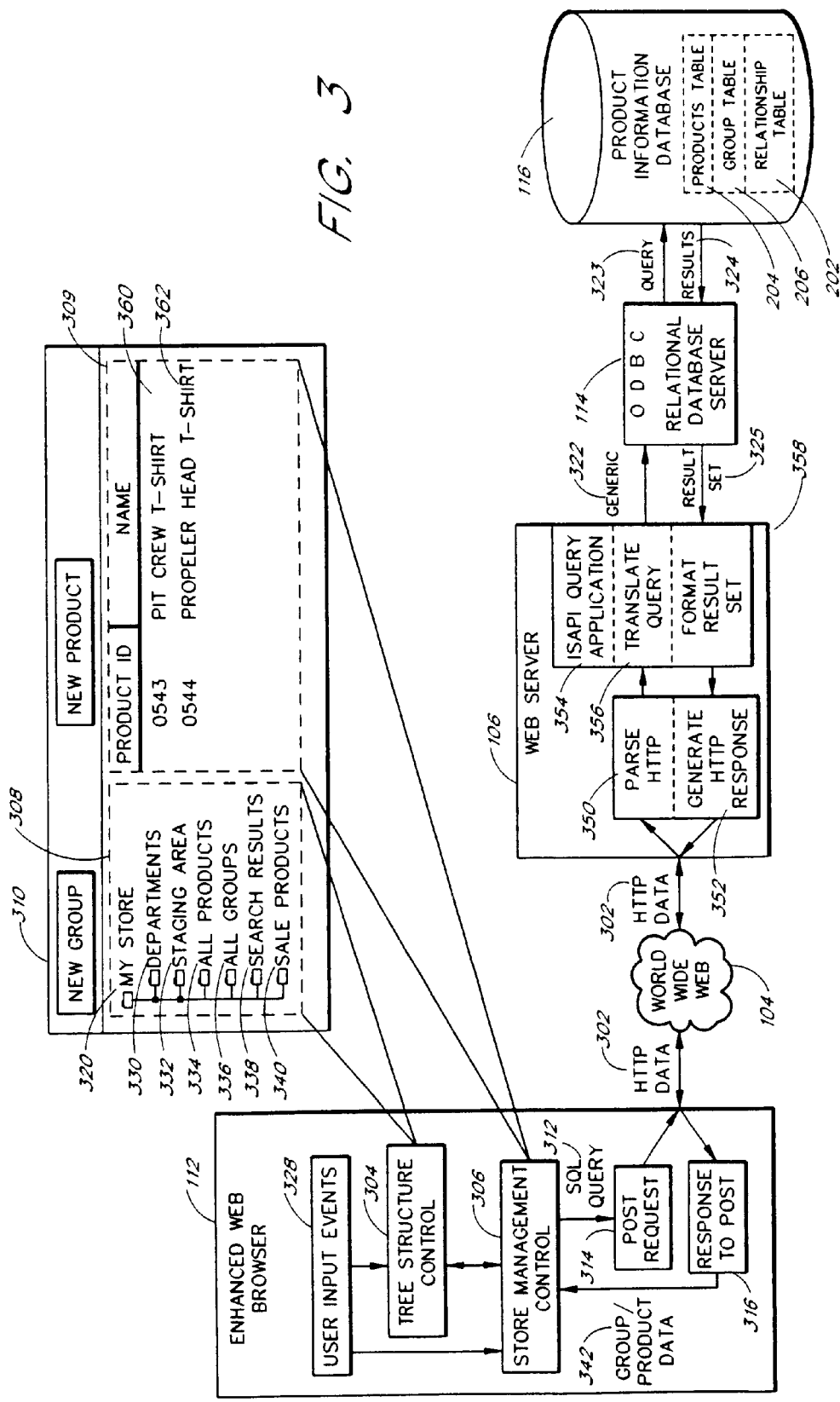
FIG. 3 illustrates components of the Merchant Workbench which generate a hierarchal user interface enabling a user to access and update data describing inventory of an electronic store.

FIG. 3 illustrates software components of the Merchant Workbench which generate a convenient, hierarchal user interface enabling a user to access and update data records holding information about products and groups of products of an electronic store. The enhanced Web browser includes a tree structure control 304 and a store management control 306. As used here, a control refers to a software component that runs within the process space of the Web browser that is displayed within the window of the browser and that adds capabilities to the browser. Computer instructions of the tree structure control 304 and the store management control 306 execute in the same process space as the enhanced Web browser 112.

The tree structure control 304 includes a refresh method which generates, and repaints as needed, a left pane 308 of a store design user interface 310. A refresh method of the store management control 306 generates, and updates a right pane 309 of the store design user interface 310. The left pane 308 and the right pane 309 comprise separate paint regions of the store design user interface 310. The store design user interface 310 is displayed within the two-dimensional space of the graphical user interface of the enhanced Web browser 112.

The hierarchical display of elements (e.g., icons, text labels, and lines) of the left pane 308 of the store design user interface 310 represents relationships between products and groups of products advertised and sold by an electronic store. The store management control 306 correlates the visual arrangement of elements displayed by the store design user interface 310 with the relationships between products and groups stored in the relationships table 202.

In a preferred embodiment, computer instructions included in the store management control 306 cause relationship data to be extracted from the product information database 116. The store management control uses the relationship data to direct the tree structure control 304 to construct a local data structure representing the hierarchy of groups of an electronic store, thus enabling the tree structure control 304 to render (i.e., draw graphical and textual elements of) the left pane 308 of the store design user interface 310. The store management control 306 also uses extracted relationship information to construct a local data structure associating information about individual products with groups containing them.

When a user selects a group to examine its contents (i.e., subordinate products or groups contained in the group), the store management control determines what products are contained in the group and renders the right pane 309 to display a list of those products.

The tree structure control 304 and the store management control 306 of the enhanced Web browser 112 are implemented using the ActiveX control specification. The ActiveX control specification is known in the art. See Kraig Brockschmidt, "Inside OLE," 2nd ed., *Microsoft Press*; David Chappell, "Understanding ActiveX and OLE, *Microsoft Press*. The method of implementing activeX control technology is beyond the scope of this invention and will not be described in detail.

A store designer initiates the store design application by using the enhanced Web browser 112 to establish a communication link to the Internet. The enhanced Web browser 112 accesses a Web server 106 hosting an electronic store by transmitting, in part, a URL (Uniform Resource Locator) value (e.g., "http://mystore.design.com") to the Internet which uniquely identifies the Web server hosting the electronic store design application. The Web server 106 responds by transmitting initial HTTP data 302 to the enhanced Web browser 112.

Embedded in the initial HTTP data are references to the tree structure control 304 and the store management control 306, as well as control setup instructions for the two controls. Also embedded in the HTTP data 302 are Internet locations (i.e., additional URL's) from which executable instructions of the respective controls can be downloaded to the enhanced Web browser 112. The following is an example of the format of a control reference located in HTTP data:

<OBJECT
  id=ControlName
  type="application/x-oleobject"
  classid="clsid:CEC3ED35-903F-11d0-BEEA-
    AAAAAAAAAAAA"
  codebase="http://www.server.com/location/
    control.cab#version=1,00,00,0000"
  width=96%
  height=90%>
</OBJECT>

After receiving the initial HTTP data and recognizing the references to the tree structure control 304 and the store management control 306, the enhanced Web browser 112 scans local computer storage media to determine whether executable computer instructions of the tree structure control 304 or the store management control 306 are accessible (directly readable from local computer storage media). If computer instructions of the tree structure control 304 or the store management control 306 are not accessible, the enhanced Web browser 112 accesses the Internet locations embedded in the HTTP-coded data and requests that data files comprising the respective controls be transmitted to the enhanced Web browser 112. Requesting data files from Internet sites is well known in the art, as is storing files transmitted via the Internet on computer storage media accessible by a Web browser.

Once the instructions of the tree structure control 304 and the store management control 306 are downloaded from specified Internet locations, those instructions are stored on computer storage media accessible to the enhanced Web browser 112. The instructions of the tree structure control 304 and the store management control 306 then persist on computer storage media accessible by the enhanced Web browser 112, remaining on the computer storage media even after the enhanced Web browser disconnects from the Worldwide Web 104. The tree structure control 304 and the store management control 306 thus do not need to be downloaded at the beginning of each store design session.

The enhanced Web browser 112 recognizes each control reference embedded in HTTP data and interprets each as a request to load the referenced control. To load a control, the Web browser 112 requests that the computer operating system, such as Windows, load the control. If the load fails, the Web browser 112 assumes the control has not yet been installed on the local computer and generates a message asking the user or store designer whether to install the control. If the user indicates a desire to install the control, the Web browser 112 requests that the control be downloaded from the server and it then installs the control on the local computer. The process of loading referenced controls is well known in the art, and the invention is not limited by any process of loading a referenced control.

Once the tree structure control 304 and the store management control 306 are stored on local computer storage media, the enhanced Web browser 112 installs the two controls within its own address space. By installing the two controls within its own address space, the enhanced Web browser 112 is able to respond to an additional set of events. Known Web browsers, such as Microsoft Internet Explorer version 3.0 (or later) use controls which respond to events (e.g., user interface command button controls which cause instructions to be executed when a mouse click event is recognized).

After installing the tree structure control 304 and the store management control 306, the enhanced Web browser 112 executes control setup instructions embedded in the HTTP data of the initial Web page. The control setup instructions set properties of the two controls and also register event-handling routines to respond to certain predefined events recognizable by the tree structure control 304 and the store management control. Event-handling routines, or event handlers, are collections of executable computer instructions designed to be executed in response to an event (i.e., a particular condition or state of a computer system). Instructions of an event handler are executed when an associated event occurs.

Event-driven computer applications are well-known in the art, as are application program controls which recognize certain predefined events. It will be appreciated by one of ordinary skill in the art, that it is common to set properties of such controls, as well as to register an event handler (i.e., a collection of executable computer instructions designed to respond to an event) with a predefined event.

For example, many computer programs having graphical user interfaces utilize a dialogue box control which displays a rectangular window and permits text to be displayed within the rectangular window. Properties of a dialogue box control include width, height, font, font size, forecolor, and backcolor. These properties are set to determine, respectively, the width of the dialogue box window (in units such as pixels), the height of the dialogue box window, the font (or typeface) to use when displaying text characters within the dialogue box window, the size (usually in points) of text characters displayed in the dialogue box window, the color of the text characters displayed, and the color of the background area behind text characters.

Events recognized by a dialogue box window include a keystroke event and a mouse click event. The keystroke event occurs whenever a key from the keyboard is typed. A mouse click event occurs whenever the mouse pointer is located over the dialogue box and the user presses one of the buttons of the mouse. Event handlers are typically registered for both the keystroke event and the mouse click event.

A typical keystroke event handler for a dialogue box control causes a character to be displayed in the dialogue box. A mouse click event handler causes a new field of the dialogue box to become enabled thus allowing the user to enter information in different fields of the dialogue box.

1. Store Design and Modification Events

Generally, the store management control 306 recognizes events caused by a user manipulating an element of the right pane 309, and the tree structure control 304 recognizes events caused by a user manipulating an icon (or other element) of the left pane 308. The store management control 306 includes executable routines, each associated with an event recognized by the store management control 306. Because each such routine is part of the store management control 306 and each responds to an event recognized by that control, each such routine is an internal event handler. The store management control 306 also includes additional routines comprising external event handlers, each designed to respond to an event recognized by the tree structure control 304. In a preferred embodiment, the tree structure control 304 includes at least one internal event handler.

In an alternative embodiment, external event handlers are embedded in HTML-coded data of a Web page and are associated with events recognized by the store management control 306 and the tree structure control 304, and the controls themselves include no event handlers, internal or external. Thus, control setup instructions embedded in a Web page extract routines from a Web page and register them as event handlers whose instructions are executed upon the occurrence of respective events recognized by the store management control 306 and the tree structure control 304. One of ordinary skill in the art will understand that the practice of the present invention is not appreciably affected by the manner in which event handlers are delivered to the enhanced Web browser 112 or by using event handlers which are not included in controls.

In a preferred embodiment, the tree structure control 304 recognizes an initialize event, an expand event, a contract event, a drag event, and a drop event. Tree structure controls recognizing such events are known in the art. See *Microsoft Visual Basic Professional Features* 453, Microsoft Corporation, 1995. Table 4 lists and describes each event recognized by the tree structure control 304. The store management control 306 recognizes an initialize event, a double-click event, a drag event, and a drop event. Table 5 lists and describes each event recognized by the store management control 306.

TABLE 4

| Tree Structure Control Event | Description |
| --- | --- |
| Initialize | Event recognized just prior to the initial display of the left pane of store design user interface |
| Expand | Event recognized when user enters a request (e.g., by clicking on an expand icon) to examine groups or products subordinate to a group. |
| Contract | Event recognized when user requests (e.g., by clicking a contract icon) that groups and products subordinate to a group be hidden from display. |
| Drag | Event recognized when user uses a mouse to point to an element of the left pane of the store design user interface, holds down a mouse button, and moves the mouse to thereby move the element. |
| Drop | Event recognized when user has initiated a drag event and releases the depressed mouse button to drop an element at a new location in the left pane of the store design user interface. |

TABLE 5

| Store Management Control Event | Description |
| --- | --- |
| Initialize | Event recognized just prior to the initial display of the right pane of store design user interface |
| Double Click | Event recognized when user positions mouse pointer over an element of the right pane of the store design user interface and clicks a mouse button twice in rapid succession. |
| Drag | Event recognized when user uses a mouse to point to an element of the right pane of the store design user interface, holds down a mouse button, and moves the mouse to thereby move the element. |
| Drop | Event recognized when user has initiated a drag event and releases the depressed mouse button to drop an element at a new location in the right pane of the store design user interface. |

Figure 4:
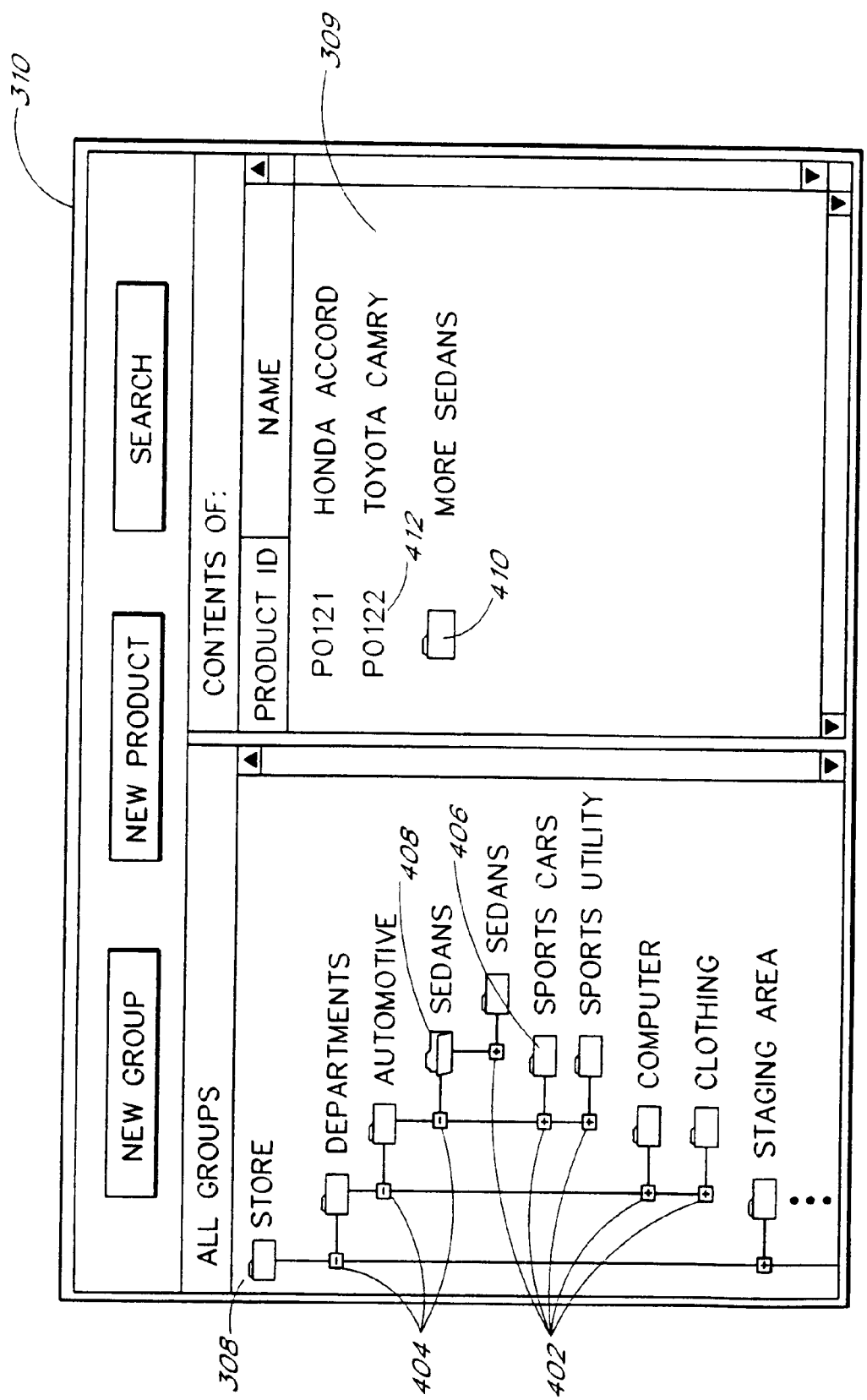
FIG. 4 illustrates components of an example of a store design user interface of the Merchant Workbench.

FIG. 4 illustrates components of the store design user interface 310, including a left pane 308 and right pane 309.

A user causes recognizable events to occur by selecting and manipulating elements (e.g., icons and text strings) of the left pane 308 and the right pane 309. Initialize events, however, typically occur when instructions of a control (such as the tree structure control 304 or the store management control 306) are loaded for execution.

The initialize event recognized by the tree structure control 304 occurs as the first step in displaying the left pane 308 of the store design user interface 310. The initialize event recognized by the store management control 306 occurs as the first step of displaying the right pane 309 of the store design user interface 310. In a preferred embodiment of the present invention, an internal event handler of the store management control 306 executes when the initialize event of the store management control 306 is recognized.

The expand event recognized by the tree structure control 304 occurs when a user positions a mouse pointer over an expand icon 402 and presses the left mouse button. Expand icons, typically represented by a plus sign located inside of a small square box, are known in the art and, when selected, permit a user to examine subordinate elements of some hierarchical structure by causing icons representing the subordinate elements to be displayed on a graphical user interface. In the preferred embodiment of the present invention, an external expand event handler of the store management control 306 is registered to execute when an expand event occurs.

The contract event recognized by the tree structure control 304 occurs when a user positions a mouse pointer over a contract icon 404 and presses the left mouse button. Contract icons are known in the art and are usually represented by a minus sign located within a small square box. Selection of a contract icon typically causes subordinate elements of a hierarchical structure to be hidden from view in a user interface. An internal contract event handler is included in the tree structure control 304, and the contract event handler executes when a contract event occurs. Such contract event handlers are known in the art.

The drag event recognized by the tree structure control 304 occurs when a user positions a mouse pointer over a group icon, such as the sports car group icon 406 illustrated in FIG. 4, depresses a mouse button and then moves the mouse pointer to reposition the group icon. Likewise, the drag event recognized by the store management control 306 occurs when a user positions the mouse pointer over a group icon, such as the more sedans group icon 410, depresses a mouse button and then moves the mouse pointer to move the group icon to a different location. The drag event recognized by the store management control also occurs when a user positions the mouse pointer over text corresponding to a product, such as the product ID 412 associated with the Toyota Camry product as illustrated in FIG. 4, depresses a mouse button and then moves the mouse pointer to reposition the text.

The drop event recognized by the tree structure control 304 occurs when a drag event has been initiated and the user releases a mouse button to reposition a dragged element over a valid drop target within the left pane 308. Valid drop targets are usually group icons such as the sedans group icon 408. Similarly, the drop event recognized by the store management control 306 occurs when a drag event has been initiated and the user releases the mouse button to relocate the dragged element on top of a valid drop target of the right pane 309. Valid drop targets of the right pane 309 are generally limited to group icons, such as the more sedans group icon 410. In a preferred embodiment, a drag event can be initiated in either the left pane 308 or the right pane 309 and a drop event can occur in either the left pane 308 or the right pane 309. Thus, an element may be dragged from the left pane 308 and dropped in the right pane 309 or vice-versa.

The double click event recognized by the store management control 306 occurs when a user positions the mouse pointer over an element of the right pane 309 and presses the mouse button twice in quick succession.

It will be appreciated by those of ordinary skill in the art that the expand and contract, drag and drop, and double click events recognized by the tree structure control 304 and the store management control 306 may occur as a result of a series of key strokes typed on a keyboard rather than by use of a mouse pointer. For example, an element of either the left pane 308 or the right pane 309 may be selected by pressing the tab key repeatedly until a desired item is highlighted (usually by rendering it in a different color) indicating that it is selected. A double click event may occur by pressing the enter key when an element has been selected using the tab key. Also, drag and drop events may occur by using the tab key to select an element using keyboard keystrokes to activate a pulldown menu, to select a cut option, and to select a paste option. It will be understood that the present invention is not limited by a user interface method such as a mouse, keyboard, or voice control input.

2. Event Handlers

Many of the events recognized by the store management control 306 and the tree structure control 304 occur as a result of a user's request to examine or modify the relationships between products and groups of an electronic store (e.g., a store designer wants to know which groups or products are currently contained within a 'Sedans' group). In a preferred embodiment of the present invention, a product information database 116 stores relationships between products and groups of an electronic store. To satisfy a user's request to examine or modify relationships between products or groups, event handlers associated with the corresponding events may conduct transactions with the product information database 116 either to retrieve information about subordinate groups or products or to modify relationship information.

In a preferred embodiment, event handlers of the store management control 306 (both internal and external) conduct transactions with the product information database 116 by submitting queries 312 (FIG. 3) and receiving query results. The enhanced Web browser 112 and the Web server 106 communicate the queries and query results to and from the store management control 306 and the product information database 116.

a. Generating the Initial user Interface Display

Figures 5, 5A:
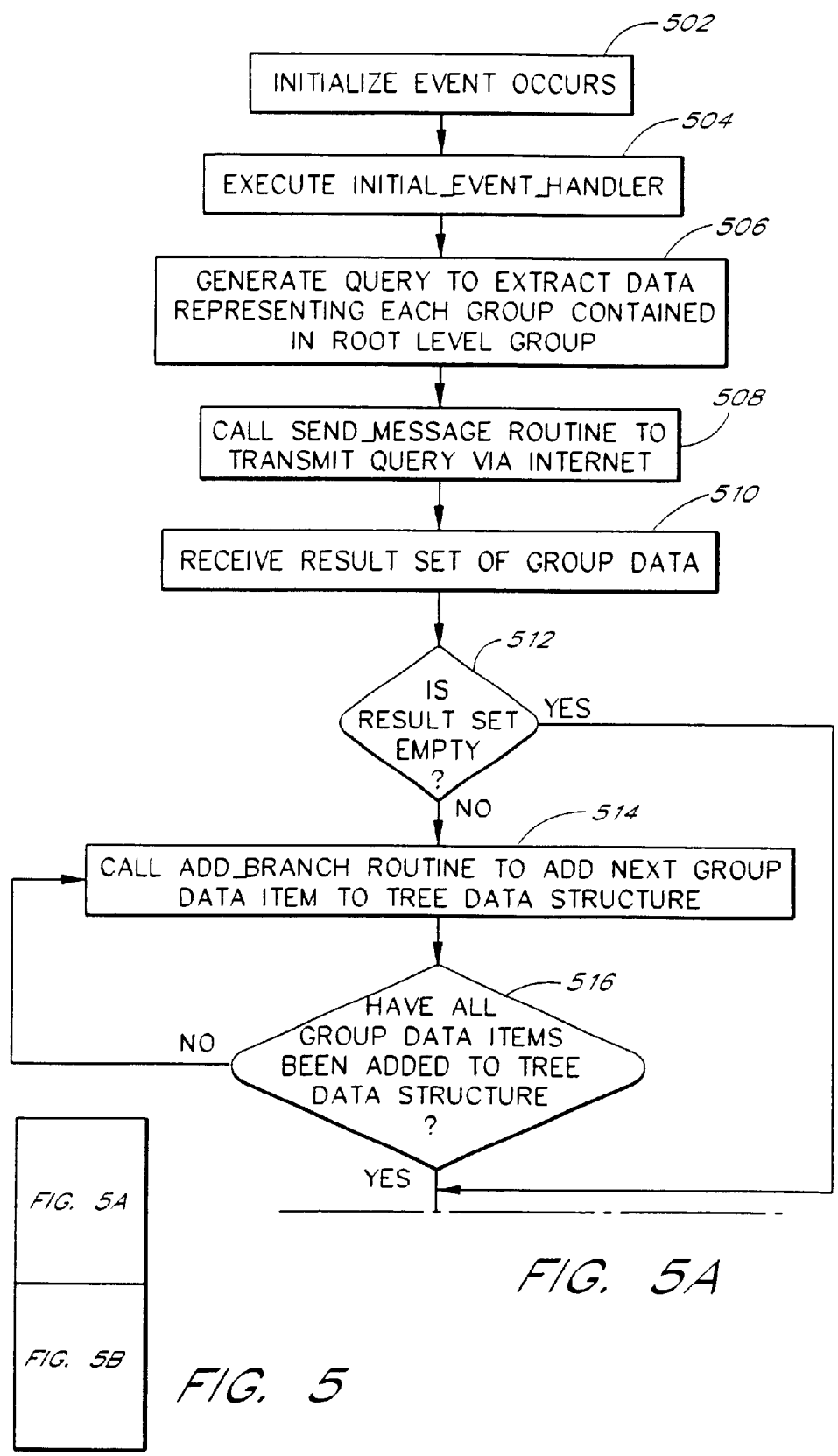
FIGS. 5A and 5B illustrate the steps required to generate initial left pane and right pane displays of a store design user interface.
Figure 5B:
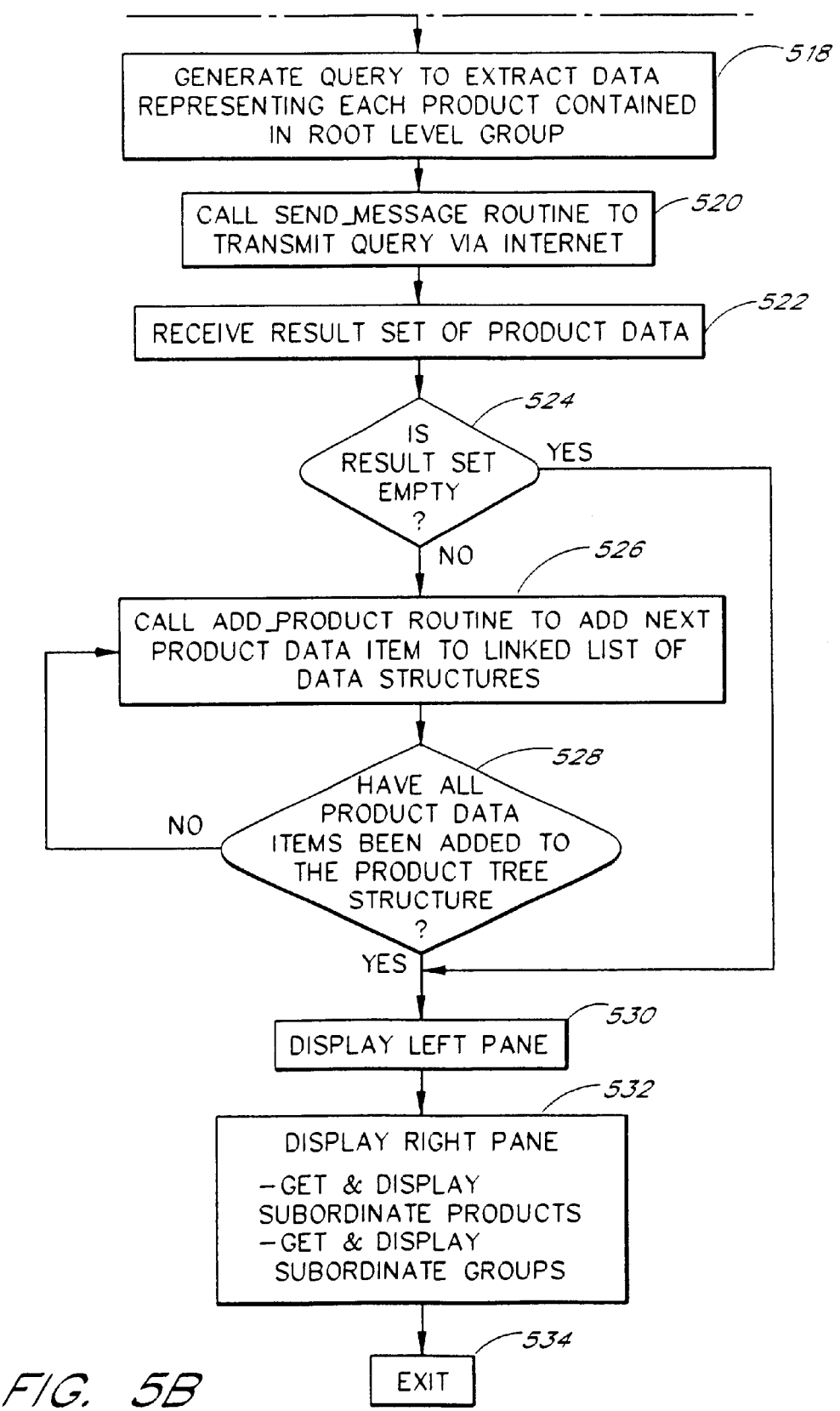

FIGS. 5A and 5B illustrate steps performed to generate an initial left pane display 308 and an initial right pane display 309 of the electronic store design application. In a first step 502, the initialize event of the store management control 306 is recognized. In a next step 504, an internal event handler of the store management control 306 called, for example, Initial_Event_Handler, begins running after the initialize event is recognized. Then, in a step 506, the Initial_Event_ Handler formulates a query 312 designed to retrieve data representing all groups and products contained in (i.e., subordinate to) the root level group My Store 320.

The Initial_Event_Handler generates a query in the form of a name/value pair. A name/value pair is generated by combining three data elements: (1) the name of a data value, (2) an '=' character, and (3) data representing a value. Some examples of name value pairs are "population=15,300,250," "temperature=28C," "ForeColor=Blue" and "Baseball_

Team=Yankees." One of ordinary skill in the art will appreciate that it is common to communicate data values over the Internet in the form of name/value pairs. The following is one example of a name/value pair representing a query generated by the Initial_Event_Handler:

Query=Select Group_Name, Group_, Parent From Relationships,
Groups Where ID_Type='G' And ID=1000 And
Relationship='Contains' And Related_ID_Type='G' And
Related_ID=Group_ID In the above example, the name of the data value is "Query", followed by an "=", and the remainder constitutes data representing a value. One of ordinary skill will understand that the above query can be generated by a simple reference to a character string constant, or by concatenating one or more character string constants and one or more character string variables. The query associates a value of "G" with the parameter "ID_Type", the value "1000" with the parameter "ID", and the value "Contains" with the parameter "Relationship". If the root level group My Store 320 is represented in the group table 206 by a data record of type "G" (group) having a unique ID value of "1000", it will thus be appreciated that the above query may be used to retrieve data from all data records related to the root level group My Store 320 by a "Contains" (i.e., contained within) relationship.

b. Communicating a Query from Web Browser to Database

After generating a query in name/value pair format, at least one executing thread of the Initial_Event_Handler issues a post request 314 (i.e., a request to post an Internet message) in a further step 508 by synchronously calling a Send_Message routine of the enhanced Web browser 112. It is well known in the art that Web browsers include routines similar to the present Send_Message routine, which accept as parameters data in name/value pair format as well as data representing a message type (e.g., a Post message), embed the parameter data in a message, and transmit the message to the Internet in a form compliant with the message type. A post message is one of a number of message types included in the Hypertext Transport Protocol (HTTP) used by Web servers and Web browsers.

In the step 508, the Initial_Event_Handler passes the query in name/value pair format to the Send_Message routine and also passes a parameter indicating that the type of message to send is 'Post.' Post messages in accordance with the HTTP protocol are well known in the art and will not be further discussed. Because the Send_Message routine of the enhanced Web browser 112 is called synchronously, no further instructions of the calling thread of the Initial_Event_Handler execute until the Send_Message routine returns a result. Synchronous procedure calls (or function calls) are well understood in the art.

The Send_Message routine of the enhanced Web browser 112 then embeds the query within an HTTP Post message and transmits the HTTP data 302 via the World Wide Web 104 to the Web server 106. A Parse_HTTP routine 350 (FIG. 3) of the Web server 106 scans the URL of the HTTP Post message and recognizes that an ISAPI query application 354 is identified by the URL.

The Parse_HTTP routine 350 launches (i.e., causes a computer to begin executing the instructions of) the ISAPI query application 354 if it is not already running. Also, the Parse_HTTP routine 350 extracts the query from the HTTP Post message in name/value pair format and passes the extracted query to the ISAPI query application 354. One of ordinary skill in the art will understand that Web servers possess parsing routines to extract data parameters from HTTP Post messages in name/value pair format and that applications, such as the ISAPI query application, may be identified by a portion of a URL.

The ISAPI query application 354 identified in the URL is associated with a single electronic store. Thus, the ISAPI query application 354 conducts transactions with a single, product information database 116 associated with the electronic store.

It will be appreciated that an ISAPI query application, dedicated to perform database operations on product data of a single electronic store, includes a constant (i.e., a predetermined value included in a computer program that does not change when the program is executing) representing the name and location of a product information database.

In another embodiment of the present invention, the ISAPI query application is associated with multiple electronic stores and thus conducts transactions with multiple product information databases. In the case where a single ISAPI query application 354 is associated with multiple stores, a user of the enhanced Web browser 112 selects an electronic store from a list of electronic stores. In this embodiment, the user of the enhanced Web browser 112 is first presented with a display generated from an initial HTML page that lists the available electronic stores. When the user clicks on the name of one of the electronic stores, the Web browser 112 sends a request to the Web server for the store management HTML page for that particular store. The name of the electronic store is sent along with the request as part of the URL. For example, when the store name "BiltRite Hardware" appears in the list of electronic stores, then, if the user clicks on that name, a URL having a store identifier parameter is generated. One example of such a URL is:

http://www.server.com/StoreManager.dll?Store= "BiltRite Hardware" Thus, the URL contains information identifying the ISAPI application to call (StoreManager.dll), as well as the parameter Name/Value pair to pass to the ISAPI application (Store= "BiltRite Hardware"). The ISAPI query application 354 (e.g., StoreManager.dll) uses the parameter to determine which electronic store to administer.

The Parse_HTTP routine 350 passes the store identifier parameter to the ISAPI query application 354. The ISAPI query application 354 uses the store identifier parameter to determine which product information database 116 to access.

One of ordinary skill in the art will appreciate that a two-dimensional array associates store name values with database identifiers (e.g., DB_Array[1,1]="BiltRite Hardware," DB_Array[1,2]="BR_Hdwr.db," DB Array[2,1]="Underdog Used CD's," and DB_Array[2,2]="Under_Dog.db"), and will further appreciate that the ISAPI query application 354 performs a look up (e.g., sequential name comparison) operation to obtain a database identifier associated with the store identifier value "BiltRite Hardware." It will also be appreciated that a simple database table associating database identifiers with store identifier values could be used in place of a two-dimensional array to identify a database when given a store identifier value. Furthermore, an operating system registry, such as, for example, the Windows NT registry could also be used to associate database names with store identifiers. The present invention is not limited by any method for associating a store name with a database.

When the appropriate database is identified, a Translate_Query routine 356 of the ISAPI query application 354 translates the query parameter from name/value pair format into a format suitable for submission to the relational database server 114. Those skilled in the art will appreciate that different relational database products require differing query commands. Thus, the translation required may be sophisticated or may be simple depending on the relational database server used. The present invention is not limited by a relational database product or a particular query language.

In a preferred embodiment, the ISAPI query application 354 establishes an ODBC link to a computer hosting the product information database and communicates an SQL-compliant query 323 to a relational database server 114 running on the computer. Those of ordinary skill in the art will appreciate that an ODBC link identifies a specific computer operating in a LAN (Local Area Network) to receive a transmitted SQL command. Thus, a relational database server 114 running on the computer identified by the ODBC link receives the SQL command, queries the product information database 116, and generates a result set 324.

To extract all groups and all products contained in the root level group Mystore 320, the SQL query 323 causes the group table 206 and the relationship table 202 to be joined. Once the group table 206 and the relationships table 202 are joined, data is extracted from data records representing groups contained in (i.e., having a 'contains' relationship with) the group Mystore 320. The following are example portions of both the group table 206 and the relationship table 202 of the product information database 116 from which data is extracted by the initial query generated by the Initial_Event_Handler:

TABLE 6

Group Table

| Group-ID | Group-Name | Parent |
|---|---|---|
| 2000 | DEPARTMENTS | Y |
| 3000 | STAGING AREA | Y |
| 4000 | ALL PRODUCTS | Y |
| 5000 | ALL GROUPS | Y |
| 6000 | SEARCH RESULTS | N |
| 7000 | SALE PRODUCTS | N |

TABLE 7

Relationship Table

| ID | Relationship | Related-ID |
|---|---|---|
| 1000 | C | 2000 |
| 1000 | C | 3000 |
| 1000 | C | 4000 |
| 1000 | C | 5000 |
| 1000 | C | 6000 |
| 1000 | C | 7000 |

The result set 325 generally comprises data from one or more rows of the group table 206 or the products table 204 which satisfy a query. Each row of a result set 324 typically includes three columns: (1) a name value, (2) an ID value, and (3) a parent status value. After the relational database server 114 generates the result set 325, it passes the result set to the ISAPI query application 354. A Format_Result_Set routine 358 of the ISAPI query application 354 translates the result set 325 into name/value pair format as described above. The following is an example of a result set in name/value pair format:

Group_Name=DEPARTMENTS, Group_ID=2000, Parent=Y,

Group_Name=STAGING AREA, Group_ID=3000, Parent=Y,

Group_Name=ALL PRODUCTS, Group_ID=4000, Parent=Y,

Group_Name=ALL GROUPS, Group_ID=5000, Parent=Y,

Group_Name=SEARCH RESULTS, Group_ID=6000, Parent=N,

Group_Name=SALE PRODUCTS, Group_ID=7000, Parent=N

One of ordinary skill understands that the data values included in the above result set may be extracted from the database tables shown in Table 6 and Table 7 by a query requesting all group data records having a relationship of 'C' (i.e., 'contained in') with the group data record having an ID value of 000.

In the example result set above, each Group_Name value (e.g., DEPARTMENTS) comprises descriptive text which may later be formatted and displayed as a label associated with group icons 330, 332, 334, 336, 338, 340 displayed on the store design user interface 310. Each Group_ID value (e.g., 2000) uniquely identifies a group data record in the group table 206 of the product information database 116. The Parent parameter of each group in the result set indicates the existence of any groups or products subordinate to (contained in) the respective group (e.g., whether a group is a parent and thus has subordinate or child groups or products). Thus, a group having a Parent parameter of 'Y' contains at least one subordinate group or product, and a group having a Parent parameter of 'N' contains no subordinate groups or products.

If there is some error condition created by the query, then the result set data includes an error code representing the specific error, rather than a collection of rows from the products table 204 or the groups table 206. It will be appreciated that numerous error conditions could prevent the success of a database query ranging from a syntax error in the query to a disk volume being off-line and that a unique code is associated with each such error condition. The following are examples of an error condition in name/value pair format: Error=32 or Error=Disk Volume Not Ready. When an error condition prevents completion of a query, a result set comprises a representation of the error condition in name/value pair format.

C. Communicating Query Result from Database to Web Browser

The ISAPI query application 354 passes the result set data in name/value pair format to a Generate_HTTP_Response routine 352 of the Web server 106. The Generate_HTTP_Response routine 352 generates a response message by combining the result set data in name/value pair format with other data which identifies the enhanced Web browser 112 as the target of an Internet message and which ensures compliance with the HTTP protocol. The Web server 106 transmits the response message to the World Wide Web 104.

The enhanced Web browser 112 receives the response message, extracts the result set data, and returns the result set data in name/value pair format to the Initial_Event_Handler which, in a step 510, receives the result set data as a return value of the Send-Message routine. The Send_Message routine then terminates. A thread of the Initial_Event_Handler expects to receive the result set data as a response to post 316 (e.g., a response to its earlier post request 314).

If, in a next step 512, the Initial_Event_Handler determines that the result set is not empty (i.e., at least one group data record is subordinate to the root level group), then, in a further step 514, the Initial_Event_Handler calls an Add_Branch routine of the tree structure control 304.

Routines of the tree structure control 304 create, maintain, and manage a tree type data structure called, for example, a Group Tree Structure, comprising hierarchically related nodes (i.e., collections of data). In one embodiment of the present invention, the tree structure control 304 is used to create, maintain, and manage a Group Tree Structure comprising nodes which represent a root level group, groups immediately below or subordinate to the root level group, groups below those groups, and additional groups at further subordinate levels as needed to represent the product grouping structure of an electronic store. Tree type data structures maintained by tree structure controls are known in the art and will not be described in detail herein.

The Add_Branch routine of the tree structure control 304 adds a new node to the Group Tree Structure. In the step 514, the Initial_Event_Handler passes four parameters to the Add_Branch routine: (1) the ID value of the root level group, (2) a Group_Name value, (3) a Group_ID value, and (4) a Parent value (e.g., 1000, 'DEPARTMENTS', 2000, and 'Y'). The ID value of the root level group identifies a node that already exists in the Group Tree Structure, and the Add_Branch routine adds a new node subordinate to the identified existing node.

The Add_Branch routine allocates memory for the new node and creates pointers from an existing node (which in the step 514 represents the root level group) to the new node and from the new node to the existing root level node. One of ordinary skill in the art understands how to create and add nodes to tree data structures. After being added to the Group Tree Structure, a node includes, at least, a Group_Name property (e.g., 'DEPARTMENTS'), a Group_ID property (e.g., 2000), and a Parent property (e.g., 'Y').

In a next step 516, the Initial_Event_Handler determines if all group data items of the result set have been added as new nodes to the Group Tree Structure. If not, then the step 514 is repeated to add another node representing a group which has not yet been added to the Group Tree Structure. If all group data items have been added as new nodes of the Group Tree Structure or if the result set was determined to be empty in the step 512, then, in a step 518, the Initial_Event_Handler generates a query to extract product data from the product information database 116.

The Merchant Workbench permits a store designer to design an electronic store having not only groups associated with the root level group, but also products. Thus, a store may have a root level group called, for example, 'My Store.' Two subordinate groups called, for example, 'Automobiles' and 'Computers' may be contained in the 'My Store' group. Such a structure may suit the needs of an organization engaged in the sale of both automobiles and computers. The store designer may then cause the groups 'Sedans,' 'Sports Cars,' and 'Sport Utility Vehicles' to be contained in the 'Automobiles' group, and the groups 'IBM' and 'Macintosh' to be contained in the 'Computers' group. If consumers visit such a store via the Internet, they would encounter an initial Web page containing links to an 'Automobiles' page and a 'Computers' page, and could easily navigate the hierarchical structure of the store to find products of interest.

However, if such a store also had very popular t-shirts in its inventory but did not generally sell clothing, the store designer may want to advertise the t-shirts on the initial page of the electronic store. Accordingly, the Merchant Workbench permits a store designer to associate not only groups, but also products with the initial Web page. To do this, a store designer may specify that one or more products are contained in the root level group.

It will thus be appreciated that, to provide an initial user interface screen which accurately shows a store structure to a store designer, both group data and product data must be examined to visually present to a store designer the groups and products contained in the root level group. Accordingly, the Initial_Event_Handler generates two queries.

While the query generated in the earlier step 506 is designed to extract group data, the query generated in the step 518 is designed to extract product data representing each product contained in the root level group. In the step 518, as in the step 506, the Initial_Event_Handler formats the query in name/value pair format. The following is one example of a name/value pair representing a query generated by the Initial_Event_Handler to extract product data related to the root level group:

Query=Select Product_Name, Product_ID From Relationships, Groups

Where ID_Type='G' And ID=1000 And Relationship= 'Contains' And

Related_ID_Type='P' And Related_ID=Product_ID

The query to extract product data is communicated to the product information database in the same manner as the query to extract group data. Thus, in a next step 520, the Initial_Event_Handler makes a post request 314 by calling the Send_Message routine and passing to it, as a parameter, the generated query in name/value pair format, as well as a parameter indicating that the message type is 'Post.' The Send_Message routine then formats the message in HTTP format, including a URL in the message which identifies both the Web server 106 and an ISAPI query application 354. Next, the Send_Message routine transmits the message via the World Wide Web 104 to the Web server 106. The Parse_HTTP routine 350 of the Web server 106 recognizes the reference to the ISAPI query application 354 embedded in the message, launches the ISAPI query application 354, and passes to the ISAPI query application 354 the query in name/value pair format.

The Translate_Query routine 356 of the ISAPI query application 354 translates the query from name/value pair format into a format useful to the relational database server 114. The Translate_Query routine 356 transmits the translated query to the relational database server 114. The relational database server 114 receives the query and queries the product information database 116. One of ordinary skill in the art will appreciate that the query generated by the Initial_Event_Handler in the step 518 causes the products table 204 and the relationship table 202 to be joined.

The following are example portions of the product table 204 and the relationship table 202 from which data is extracted.

TABLE 8

Product Table

| Product-ID | Product-Name |
|---|---|
| 0543 | Pit Crew T-Shirt |
| 0544 | Propeller Head T-Shirt |

TABLE 9

Relationship Table

| ID | Relationship | Related-ID |
|---|---|---|
| 1000 | C | 0543 |
| 1000 | C | 0544 |

The relational database server 114 generates a result set from the query, and the Format_Result_Set routine 358 translates the result set into name/value pair format. The following is an example of a result set 325 generated by the relational database server 114 and translated into name/value pair format by the Format_Result_Set routine 358:

Product_Name=Pit Crew T-Shirt, Product_ID=0543,
Product_Name=Propeller Head T-Shirt, Product_ID=0544

The result set generated by the query is communicated to the enhanced Web browser 112. Thus, the ISAPI query application 354 passes the result set to the Generate_HTTP_Response routine 352. The Generate_HTTP_Response routine 352 generates a response message by combining the result set data in name/value pair format with additional data which ensures compliance with the HTTP protocol and identifies the enhanced Web browser 112 as a destination. The Web server 106 transmits the response message to the enhanced Web browser 122 via the World Wide Web 104.

The enhanced Web browser 112 receives the response message and passes the result set data in name/value pair format to the Initial_Event_Handler as a result of the Send_Message routine. The Send_Message routine terminates and, in a further step 522, the Initial_Event_Handler receives the result set data. A thread of the Initial_Event_Handler receives the result set data as a response to its post message 316 transmitted to the Web server 106 in the step 520.

If, in a next step 524, the Initial_Event_Handler determines that the result set is not empty (e.g., at least one product is subordinate to the root level group), then, in a step 526, the Initial_Event_Handler calls an Add_Product routine of the store management control 306. The Add_Product routine adds a product data item from the product data 342 of the result set to a binary tree structure.

Routines of the store management control 306 create, manage, and maintain a binary tree type data structure called, for example, a Product Tree Structure. The Product Tree Structure comprises nodes (e.g., collections of data) each of which includes left and right node pointers to other nodes. Each node also includes data about a group (i.e., a Group_Name value and a Group_ID value), and a pointer to a product data structure. Each product data structure includes information (i.e., a Product_Name value and a Product_ID value) about a product advertised or offered for sale by an electronic store. Each product data structure also includes a pointer which may point to another product data structure.

Figure 6:
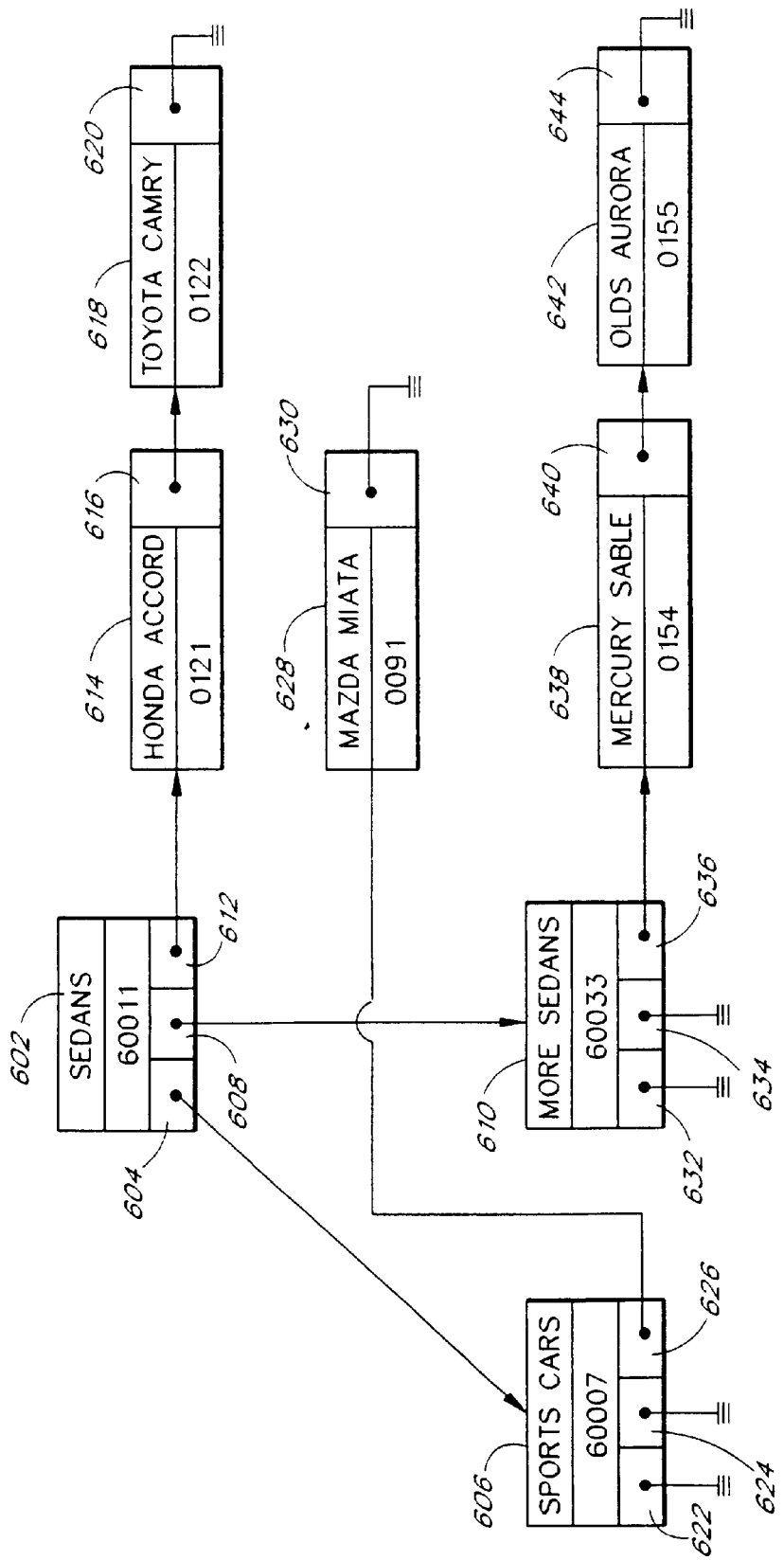
FIG. 6 illustrates a portion of an example product tree structure.

FIG. 6 illustrates a portion of an example Product Tree Structure. A node 602 includes information about a group having a Group_Name value of 'Sedans' and a Group_ID value of 60011. The node 602 also has a left node pointer 604 to a node 606 and a right node pointer 608 to a node 610. The node 602 also has a pointer 612 to a product data structure 614. The product data structure 614 has a Product_Name value of 'Honda Accord' and a Product_ID value of 0121, as well as a pointer 616 to a product data structure 618.

The product data structure 618 has a Product_Name value of 'Toyota Camry' and a Product_ID value of 0122. The product data structure 618 also has a pointer 620 to a product data structure. The pointer 620 is null.

The node 606 has a Group_Name value of 'Sports Cars' and a Group_ID value of 60007. Also, the node 606 includes a left node pointer 622 and a right node pointer 624 which are null. A pointer 626 of the node 606 points to a product data structure 628 which has a Product_Name value of 'Mazda Miata' and a Product_ID value of 0091. The product data structure 628 has a pointer 630 to a product data structure. The pointer 630 is null.

The node 610 has a Group_Name value of 'More Sedans' and a Group_ID value of 60033. Further, the node 610 includes a left node pointer 632 and a right node pointer 634 which are null. A pointer 636 of the node 610 points to a product data structure 638 which has a Product_Name value of 'Mercury Sable' and a Product ID value of 0154. The product data structure 638 also includes a pointer 640 which points to a product data structure 642. The product data structure 642 has a Product_Name value of 'Olds Aurora' and a Product_ID of 0155. Also, the product data structure 642 has a pointer 644 that is null.

Binary tree data structures are well known in the art and one of ordinary skill will appreciate that binary tree search routines may navigate the nodes 602, 606, and 610 of the example Product Tree Structure illustrated in FIG. 6. In particular, one of ordinary skill will understand that recursion may be efficiently employed to navigate a binary tree structure such as that exemplified in FIG. 6.

A navigation routine employing recursion receives a parameter identifying a node of a binary tree, examines data values of the node, determines whether data values of the node satisfy search criteria, and, if not, issues a call to itself, passing as a parameter a node pointed to by the left node pointer of the current node. On return from that call, the navigation routine makes another call to itself, passing as a parameter a node pointed to by the right node pointer of the current node.

Such a binary tree navigation routine may be applied to the nodes of the binary tree data structure illustrated in FIG. 6. To search the binary tree for a node whose Group_ID value is 60033, a navigation routine is called and receives as a parameter the node 602. In a first iteration of execution, the navigation routine checks the Group_ID value of the node 602, determines that value to be 60011, and concludes that 60011 is not equivalent to 60033. The navigation routine then calls itself, passing as a parameter the node 606 (whose address is accessible from the left node pointer 604 of the node 602). A second iteration of the navigation routine thus checks the Group_ID value of the node 606, determines the value to be 60007, and concludes that 60007 is not equivalent to 60033. Before the second iteration of the navigation routine attempts to call itself, it checks the left node pointer 622, determines the left node pointer 622 is null (e.g., no nodes exist to the left of the current node) and, thus, does not call itself.

Next, the second iteration of the navigation routine attempts to call itself again using as a parameter a node pointed to by the right node pointer of node 606. Because the right node pointer of node 606 is null, the second iteration of the navigation routine again avoids calling itself, and the second iteration of the navigation routine terminates, returning control to the first iteration of the navigation routine.

The first iteration of the navigation routine then continues executing and calls itself, passing as a parameter a node 610 pointed to by the right node pointer 608. A third iteration of the navigation routine begins running and checks the Group_ID value of the node 610, determines that the value is 60033, and concludes that 60033 is equivalent to the search value 60033. Thus, a recursive navigation routine successfully traverses the nodes of the binary tree illustrated in FIG. 6 to locate a node having a particular ID value.

One of ordinary skill in the art will understand that searching a binary tree structure for a node having a particular numeric value is improved if the binary tree is constructed such that for any given node, its left node pointer points to a node having a numeric value less than its own, and its right node pointer points to a node having a numeric value greater than its own. The present invention is in no way limited by any method of constructing or searching a binary tree structure.

Furthermore, the invention is not limited by a data structure associating product data with particular groups.

The Initial_Event_Handler, in the step 526, calls the Add_Product routine and passes to it three parameters: (1) the Group_ID value of the root level group, (2) a Product_Name value, and (3) a Product_ID value. The Add_Product routine navigates the Product Tree Structure to search for a node whose Group_ID value matches that of the Group_ID parameter. If no matching node is located, the Add_Product routine creates such a node and links it to the Product Tree Structure. The Add_Product routine then establishes a current node (i.e., the matched node if the search succeeded, the created node if the search failed). The Add_Product routine then determines whether the current node points to any product data structures. If so, the Add_Product routine navigates to the end of the linked list of product data structures (i.e., finds the first product data structure whose pointer is null). Next, the Add_Product, routine allocates memory for a new product data structure and sets its Product_Name value equal to the Product_Name parameter and its Product_ID value equal to the Product_ID parameter. Finally, the Add_Product routine links the new product data structure to the end of the linked list of product data structures, or, if the current node does not point to any product data structures, the Add_Product routine links the new product data structure to the current node.

In an additional step 528, the Initial_Event_Handler determines whether all product data items represented in the product data 342 have been added to the Product Tree Structure. If not, then the step 526 is repeated. If so, then, in a next step 530, the left pane 308 of the store design interface 310 is displayed. A refresh method (i.e., routine) associated with the tree structure control 304 updates the display of the left pane 308.

The refreshed left pane 308 displays icons and text labels associated with groups subordinate to the root level group represented by the My Store icon 320. As illustrated in FIG. 3, the groups subordinate to the root level group My Store 320 are a departments group 330, a staging area group 332, an all products group 334, an all groups group 336, a search results group 338, and a sale products group 340. In addition, the refresh method of the tree structure control 304 places an expand icon adjacent to group icons representing groups whose Parent parameter is 'Y' (i.e., groups which have further subordinate groups or products below them). Such a refresh method for tree structure controls is known in the art. See *Microsoft Visual Basic Professional Features* 455, Microsoft Corporation, 1995. Expand icons are also known in the art.

The departments group 330 corresponds to a store structure modeled after an actual store having numerous departments, each department offering a collection of related products. Thus, additional subgroups may exist subordinate to the departments group 330.

In a preferred embodiment, additional special groups are subordinate to a root level group:

The staging area group 332 comprises any number of groups or products whose relationships or properties are being modified by a merchant or store designer.

The all products group 334 comprises an enumeration of all products stored in the products table 204. Thus, the all products group 334 provides a merchant or store designer convenient access to a list of all products, regardless of their relationship to any group or to each other. Likewise, the all groups group 336 enumerates all groups included in the group table 206, and thus provides convenient access to all groups of an electronic store. Those of ordinary skill appreciate that database commands, such as SQL commands, are easily constructed to retrieve all records of a database table, and further that such a command would facilitate retrieving all data records from the products table 204 to generate a result set. It will be understood that data fields of the result set facilitate creation of data structures underlying an all products group 334 using techniques disclosed herein.

The search results group 338 comprises a collection of groups or products resulting from a search request issued by a user. The search results group 338 represents products and groups identified by the most recently performed search. Thus, groups and products identified in each new search replace existing groups and products within the search results group. Those of ordinary skill appreciate that database commands, such as SQL commands, are easily constructed to search the records of a database table, to retrieve the records matching particular query parameters, and to generate a corresponding result set. It will further be understood that many types of interfaces are available to elicit from a user a text or numeric pattern which may contain wildcard (or variable) pattern matching specifications. The Merchant Workbench invokes such an interface when a user clicks on the search command 776 (see FIG. 7D). The user responds by entering search criteria from which the Merchant Workbench generates an SQL query. Finally, it will be understood that a result set generated by a database search command employing pattern matching on particular fields of data records facilitates construction of data structures underlying a search results group 338 using techniques disclosed herein.

The sale products group 340 comprises all products currently marked for inclusion in a promotion or sale. Thus, a store designer or a merchant can conveniently access each and every product marked for sale in an electronic store. One of ordinary skill will appreciate that a status field of each data record in the products table 204 may be set to a particular value indicating that the product represented by the data record has been designated for inclusion sale by a merchant. It will be understood that database query commands, such as SQL commands, can easily be formulated to search for and retrieve data records whose status fields match a predetermined status value and that a corresponding result set would be generated. It will be further understood that such a result set facilitate creation of data structures underlying a sale products group 340 using techniques disclosed herein.

In a step 532 (FIG. 5), the right pane 309 of the store design user interface 310 is displayed by a refresh method of the store management control 306. The refresh method of the store management control 306 displays information about products subordinate to a current group (i.e., a group represented by an icon in the left pane 308 that is selected by a user) and also displays information about groups subordinate to the current group.

To display information about subordinate products, the refresh method is passed the value of the Group_ID associated with the current group. At the time the initialize event of the store management control 306 is recognized, the root level group (e.g., My Store) is the current group, and the refresh method will search for any products contained in (i.e., directly subordinate to) the root level group. Whether any products are contained in the root level group is a decision made by the designer of the electronic store, and that decision may be dictated by whether the store designer wants any products advertised on an initial Web page of the Web site.

The refresh method of the store management control 306 navigates (i.e., searches) the Product Tree Structure for a node whose Group_ID value matches that of the current group. When the refresh method of the store management control 306 is called by the Initial_Event_Handler, the root level is the current selected group, and if its Group_ID value is 1000, then the refresh method navigates the Product Tree Structure to find a node whose Group_ID value is 1000. Once the matching node is found, the refresh method examines the node's pointer to a product data structure. If the pointer is null, then there is no product data to display, and the refresh method terminates.

If, however, the matched node points to a product data structure (e.g., representing a first popular t-shirt), then the Product_ID value (e.g., 0543) and the Product_Name value (e.g., 'Pit Crew T-Shirt') are accessed and displayed as a first product entry 360 in the right pane 309. The refresh method uses standard text display routines known in the art (e.g., such as those commonly used by a refresh method to display entries of a standard list box control) to display Product_ID and Product_Name values. See *Microsoft Visual Basic Language Reference* 772, Microsoft Corporation, 1995.

The refresh method then examines the pointer of that product data structure which may point to another product data structure. If that pointer is null, then the refresh method terminates. If the pointer points to another product data structure (e.g., representing a second popular t-shirt), then the Product_ID value (e.g., 0544) and the Product_Name value (e.g., 'Propeller Head T-Shirt') of that product data structure are displayed as a second product entry 362. The refresh method continues thus to navigate a linked list of product data structures until a null pointer is encountered and the refresh method terminates.

After displaying information about subordinate products, the refresh method of the store management control 306 displays information about subordinate groups. The refresh method of the store management control 306 invokes a Get_Subordinate_Groups routine of the tree structure control 304 and passes as a parameter the Group_ID associated with the root level group. Tree structure control routines which retrieve subordinate elements of a selected element are known in the art and will not be further discussed. See *Microsoft Visual Basic Professional Features* 463, Microsoft Corporation, 1995.

The Get_Subordinate_Groups routine returns, in one embodiment of the present invention, a pointer to a linked list of group structures. Each group structure in the linked list contains information about a group, including Group_ID value and Group_Name value, and also includes a pointer to another group structure. The refresh method of the store management control receives the pointer to this linked list of structures and sequentially navigates the group structures. Navigation of the linked list terminates when a pointer of a group structure is null.

As each group structure is encountered during navigation, the refresh method outputs information to the right pane display 309. For each group encountered, the refresh method outputs one row of information in the right pane, including an icon and text characters representing a Group_Name. One of ordinary skill in the art will understand that other arrangements and displays of group information in a right pane are possible, and the present invention is not limited by a particular arrangement of elements in the right pane display 309.

The refresh method thus outputs to the right pane display 309 elements representing both products and groups. All products and groups illustrated in a single right pane display are contained in (subordinate to) a certain group selected by a user.

In a preferred embodiment, each product included in the right pane display is represented by one row of text elements and each group included in the right pane display is represented by one row comprising an icon and a text label.

After the refresh method of the store management control 306 completes its output to the right pane display 309, the refresh method terminates, and returns control to the Initial_Event_Handler. Then, in a next step 534, the Initial_Event_Handler terminates.

The store design user interface 310 thus displays an hierarchical model of an electronic store, including icons and labels arranged to represent parent-child and sibling relationships established between groups and products.

d. Examining Subordinate Groups

Figure 7A:
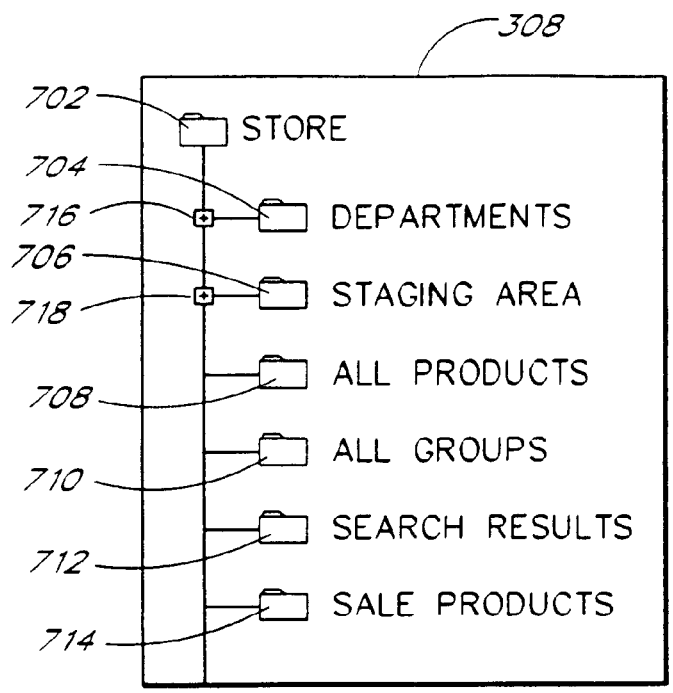
FIGS. 7A, 7B, 7C, and 7D illustrate successive representations of a store design user interface.

FIG. 7A illustrates one embodiment of a left pane 308 of a store design user interface 310 which displays the hierarchy of an electronic store. The user interface illustrated in FIG. 7A displays a store icon 702 at the root level and, at the next subordinate level, displays a departments icon 704, a staging area icon 706, an all products icon 708, an all groups icon 710, a search results icon 712, and a sale products icon 714.

An expand icon 716, represented by a plus sign inside a small box, is located to the left of the departments icon 704. A similar expand icon 718 is located to the left of the staging area icon 706. Expand icons and other command options presented by a user interface are generally activated by using a pointing device, such as a mouse, in combination with depressing a key or button such as a mouse button.

Accordingly, a merchant can position the mouse pointer over the expand icon 716 and depress a mouse button to activate the expand option associated with the departments icon 704. Such activation of the expand option associated with the departments icon 704 causes an expand event to occur. An expand event is the first step in updating the store design user interface 310 to display the next subordinate level of groups or products associated with the departments group.

Figure 8B:
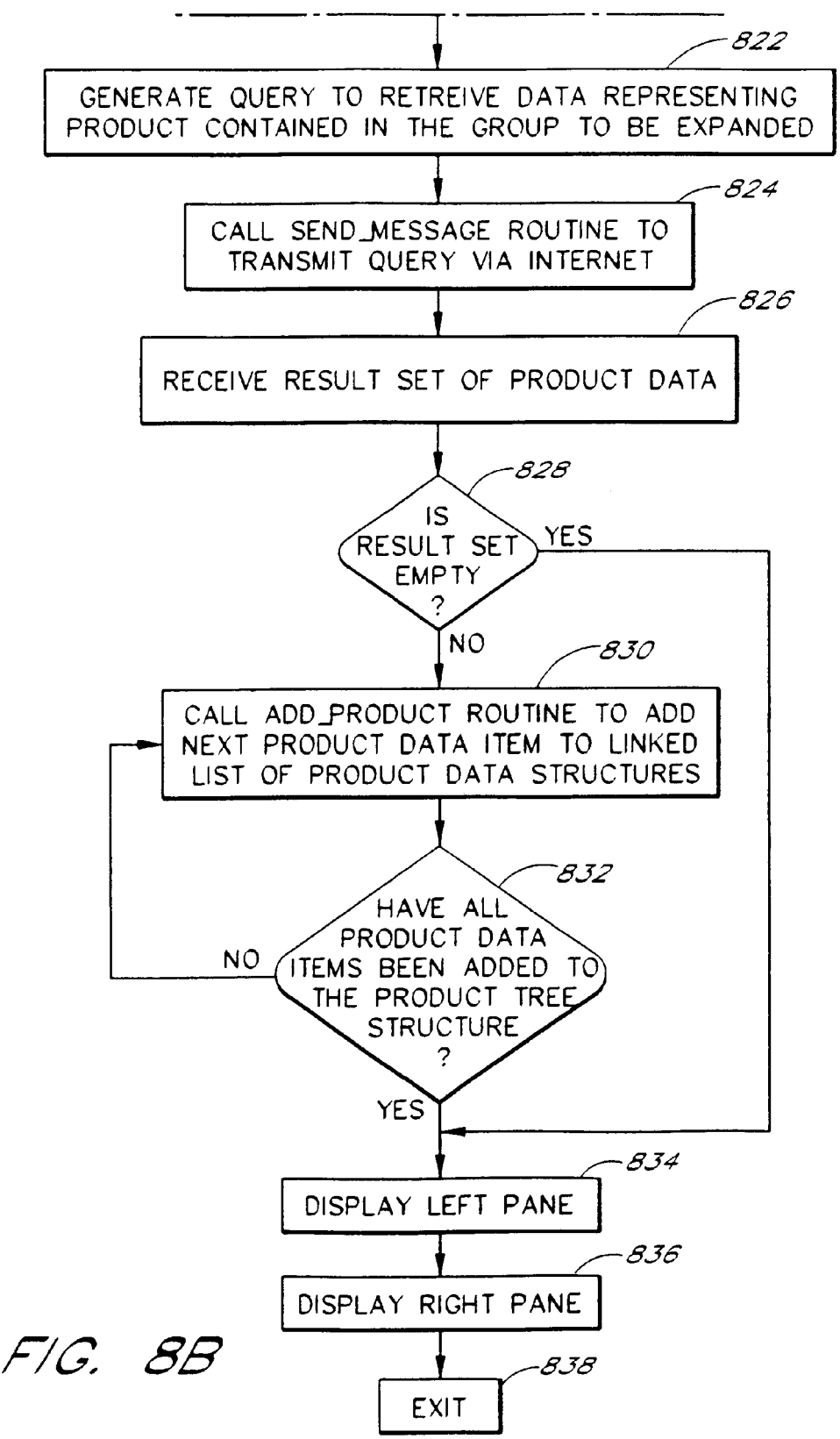

FIGS. 8A and 8B illustrate steps involved in updating the store design user interface 310 upon recognition of an expand event. In a first step 802, an expand event is recognized. In a next step 804, an internal Expand_Event_Handler of the tree structure control 304 begins running. The Expand_Event_Handler of the tree structure control 304 determines, in a further step 806, the Group_ID of the group to be expanded. Expand_Event_Handlers of tree structure controls which return values identifying an element of an hierarchical structure to be expanded are known in the art.

In a further step 808, the Expand_Event_Handler invokes an ExpandGroup_Event_Handler of the store management control 306. The Expand_Event_Handler passes the Group_ID value of the group to be expanded as a parameter to the ExpandGroup_Event_Handler.

In a next step 810, the ExpandGroup_Event_Handler generates a query designed to retrieve data representing all groups that are contained in the group to be expanded. In a preferred embodiment, the query is constructed by concatenating a character string constant, a character string variable including digit characters representing the Group_ID value, and another character string constant. The following is an example of a query generated by the ExpandGroup Event_Handler:

Select Group_Name, Group_ID, Parent From Relationship, Groups
Where Relationship.ID_Type='G'
and Relationship.ID=Parent_Group_ID
and Relationship.Relationship='Contains'
and Relationship.Related_ID_Type='G'
and Relationship.Related_ID_Groups.Group_ID In a next step 812, the ExpandGroup_Event_Handler calls the Send_Message routine to transmit the query via the Internet. As described in relation to FIG. 5, the Send_Message routine receives the query as a parameter, as well as a message-type of 'Post' as a second parameter. Communication of the query to the product information database 116 occurs as was described in relation to FIG. 5.

The relational database server 114 receives the query and queries the product information database 116. The relational database server generates a result set including data retrieved from data records having a 'contained in' relationship with the data record. corresponding to the group to be expanded. The ISAPI query application 354 of the Web server 106 formats the result set in name/value pair format. The Web server 106 communicates the result set in name/value pair format to the enhanced Web browser 112 in the manner described in relation to FIG. 5.

In an additional step 814, the ExpandGroup_Event_Handler receives the result set comprising data representing groups contained in the group to be expanded. Next, in a step 816, the ExpandGroup_Event_Handler determines whether the result set is empty. If the result set is not empty (i.e., the group to be expanded contains at least one group), then, in a next step 818, the ExpandGroup_Event_Handler calls the Add_Branch routine to add a new node to the group tree structure.

The ExpandGroup_Event_Handler passes four parameters to the Add_Branch routine: (1) the Group_ID value corresponding to the group to be expanded, (2) a Group_Name value, (3) a Group_ID value; and (4) a Parent value. The Add_Branch routine then creates a new node and adds that node to the Group Tree Structure in the manner described in relation to FIG. 5.

In a further step 820, the ExpandGroup_Event_Handler determines whether all groups included in the result set have been added as new nodes to the Group Tree Structure. If not, then the step 818 is repeated as necessary. If all of the groups included in the result set have been added as new nodes to the Group Tree Structure or if the result set in the step 816 was determined to be empty, then, in a next step 822, the ExpandGroup_Event_Handler generates a query designed to retrieve data from product data records representing products contained in the group to be expanded. The following is an example of a query so designed:

Select Name, Product_ID From Relationship, Products
Where Relationship.ID_Type='G'
and Relationship.ID=Parent_Group_ID
and Relationship.Relationship='Contains'
and Relationship.Related_ID_Type='P'
and Relationship.Related_ID=Products.Product_ID In a further step 824, the ExpandGroup_Event_Handler calls the Send_Message routine to transmit the query via the Internet. As previously described in connection with FIG. 5, a result set is generated from the query and formatted in name/value pair format and communicated from the Web server 106 to the enhanced Web browser 112.

In a next step 826, the ExpandGroup_Event_Handler receives the result set comprising data retrieved from product data records and formatted in name/value pair format. In a next step 828, the ExpandGroup_Event_Handler determines whether the result set is empty. If not, then, in a further step 830, the ExpandGroup_Event_Handler calls the Add_Product routine to add data representing each product in the result set to the Product Tree Structure in the manner described in connection with FIG. 5.

In an additional step 832, the ExpandGroup_Event_Handler determines whether all product data items included in the result set have been added to the Product Tree Structure. If not, the step 830 is repeated as necessary. When all product data items have been added as product data structures to the Product Tree Structure, or, if in the step 828, it was determined that the result set was empty, then, in a next step 834, the ExpandGroup_Event_Handler calls the refresh method of the tree structure control 304 to display an updated left pane 308 of the store design user interface 310.

In a next step 836, the ExpandGroup_Event_Handler calls the refresh method of the store management control 306 which navigates the Product Tree Structure to locate a node corresponding to the group that was selected to be expanded. When that node is located in the Product Tree Structure, the refresh method navigates the linked list of product data structures and outputs one row (e.g., text strings representing a Product_ID value and a Product_Name value) to the right pane display 309 for each product data structure encountered until a null pointer is reached.

The refresh method of the store management control 306 then calls the Get_Subordinate_Groups routine of the tree structure control 304. The Get_Subordinate_Groups routine constructs a linked list of group structures subordinate to the group to be expanded, and returns a pointer to that linked list upon termination. The refresh method of the store management control 304 receives a pointer to the linked list of group structures as a result returned by the Get_Subordinate_Groups routine.

The refresh method of the store management control 306 then navigates the group structures of the linked list and outputs one row (e.g., an icon and a text string representing the Group_Name) to the right pane display 309 for each group structure encountered. The refresh method terminates when a null pointer is encountered at the end of the linked list. After an updated right pane 309 is displayed, then, in a further step 838, the ExpandGroup_Event_Handler terminates.

e. Hiding Subordinate Groups from View

A user of the store design user interface 310 selects a contract icon 404 to eliminate (i.e., hide from view) subordinate groups from the left pane display 308 and the right pane display 309. Tree structure controls known in the art provide contract routines which hide subordinate elements from view. When a contract event occurs from a user selecting a contract icon associated with a particular group, a Contract_Group routine of the tree structure control 304 hides from view all icons representing subordinate groups of the particular group. The Contract_Group routine then calls a Contract_Event_Handler of the store management control 306. The Contract_Event_Handler removes all elements (e.g., text strings and icons) from the right pane 309 display. One of ordinary skill understands that rectangular areas of a computer screen are easily blanked or cleared.

Figure 7B:
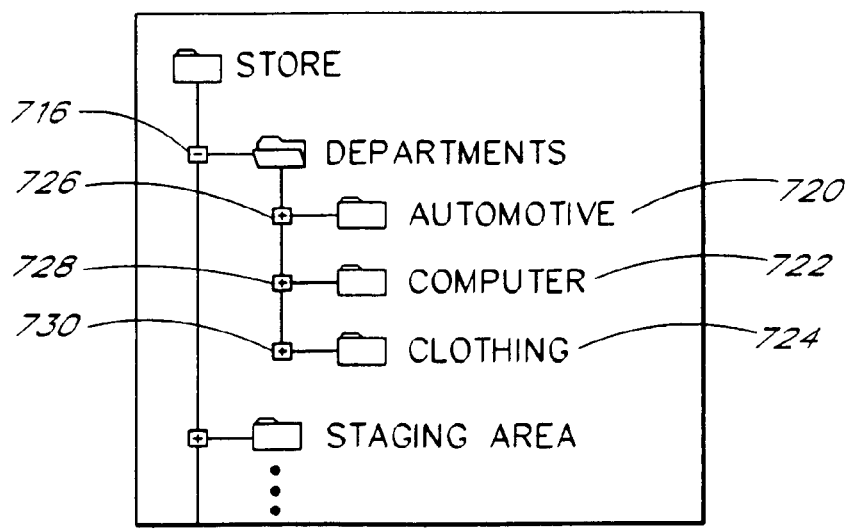

FIG. 7B illustrates a left pane display 308 of a hierarchy of groups of an electronic store generated by selecting the expand icon 716 of the user interface illustrated in FIG. 7A. FIG. 7B illustrates a next subordinate level of icons—an automotive icon 720, a computer icon 722, and a clothing icon 724—immediately below the departments icon 704. Expand icons 726, 728, and 730 are located to the left of the automotive 720, computer 722, and clothing 724 icons. The expand icon 716 to the left of the departments icon 704 is changed from a plus sign in FIG. 7A to a minus sign in FIG. 7B, indicating that a next selection of that expand icon 716 will contract or close the departments group and eliminate from the left pane display 308 the automotive 720, computer 722, and clothing 724 icons. The expand icons 726, 728, 730 displayed at the left of the automotive group icon 720, the computer group icon 722, and the clothing group icon 724 indicate that further subordinate groups or products are contained in groups represented by these icons.

Figure 7C:
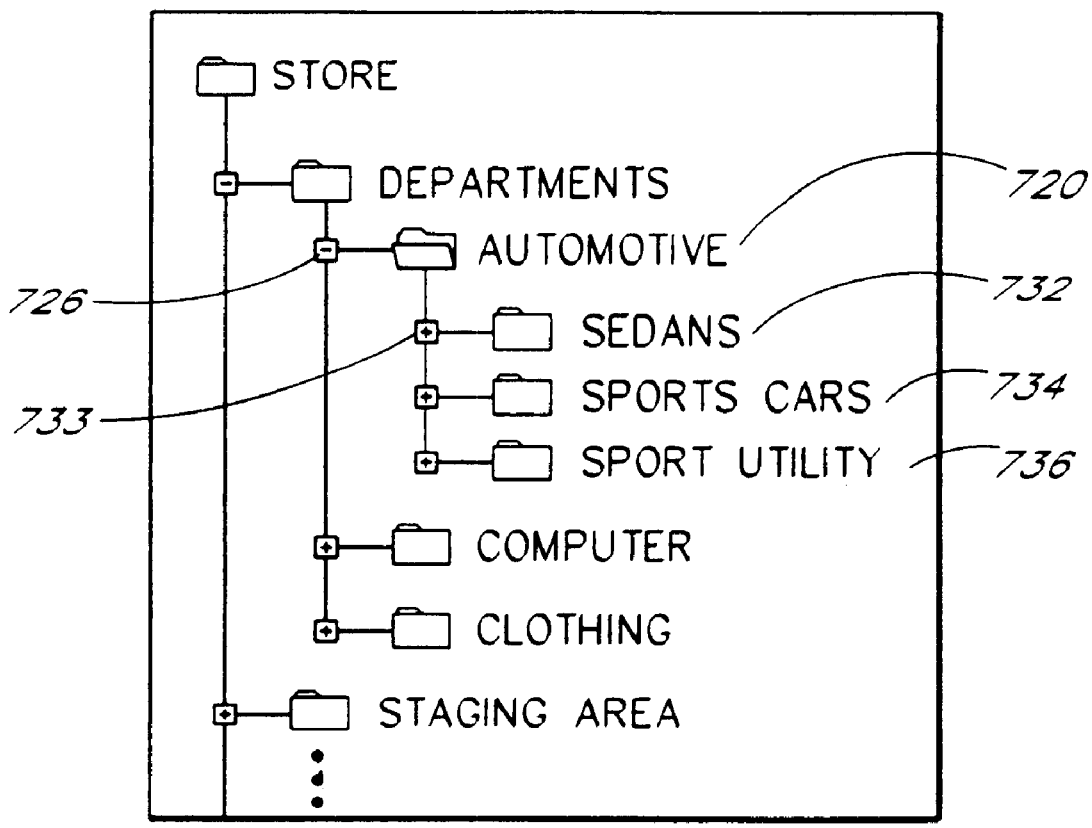

FIG. 7C illustrates a further subordinate level of group icons—a sedans icon 732, a sports cars icon 734, and a sport utility vehicles icon 736—immediately below the automotive icon 720. The left pane display 308 of FIG. 7C is generated, for example, by clicking the expand icon 726 (represented by a '+' sign) illustrated in FIG. 7B. The sedans icon 732, the sports cars icon 734, and the sport utility vehicles icon 736 represent groups contained within the automotive group represented by the automotive icon 720. As illustrated in FIG. 7C, the icon 726 is a contract icon (represented by a '−' sign), indicating that the automotive group has been expanded and that it may be contracted by clicking the contract icon 726.

Figure 7D:
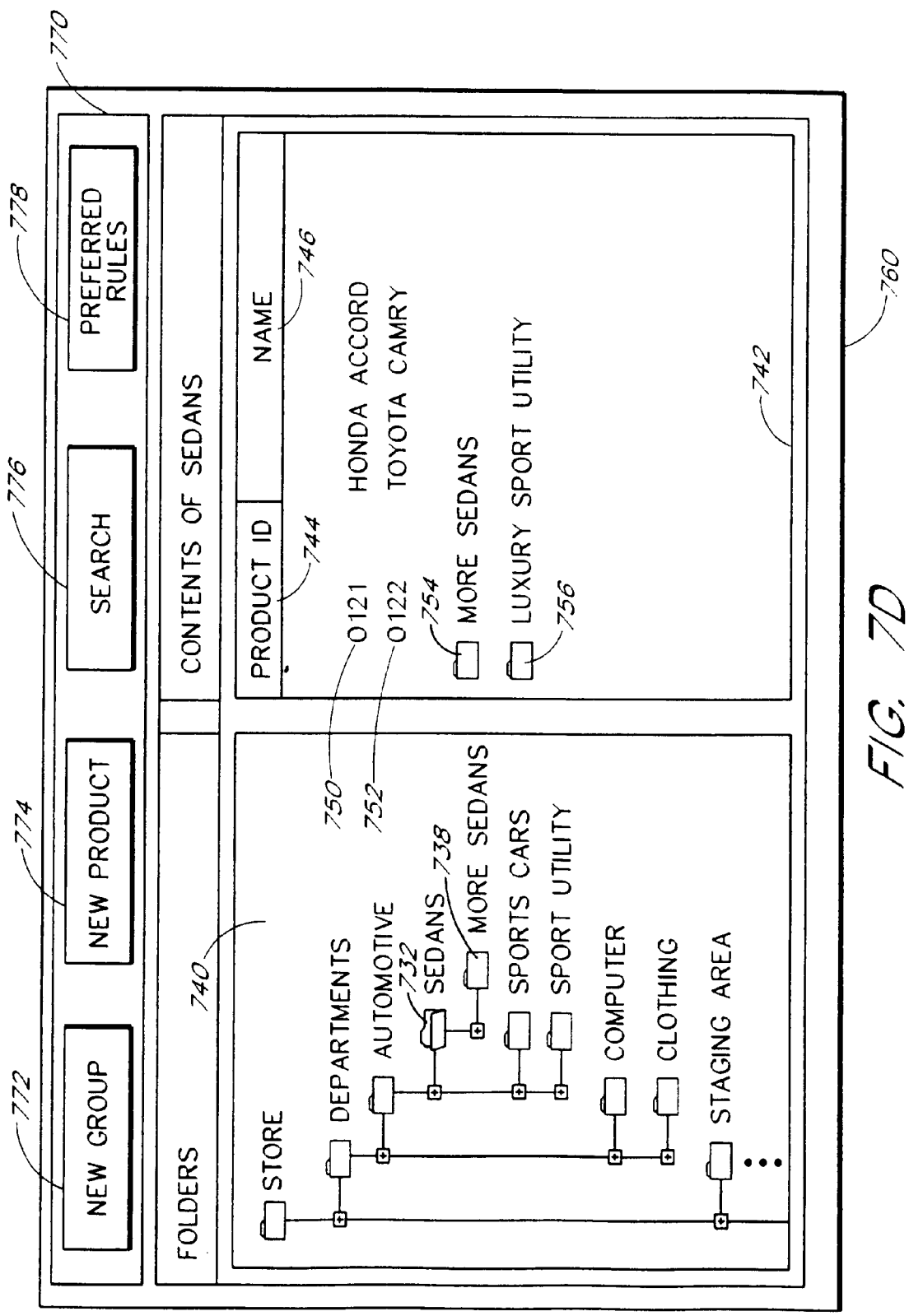

FIG. 7D illustrates an embodiment of a store design user interface 760 comprising a command area 770, as well as a left pane display 740 and a right pane display 742. The command area 770 includes a new group command 772, a new product command 774, a search command 776, and a preferred rules command 778.

The left pane display 740 and right pane display 742 represent a hierarchical view of an electronic store generated in response to selecting the expand icon 733 associated with the sedans icon 732 of FIG. 7C. A more sedans icon 738 is displayed at a level subordinate to (e.g., to the right of and below) the sedans icon 732. Thus, the left pane 740 illustrated in FIG. 7D displays the hierarchal structure of groups of an electronic store. The right pane 742, however, illustrates both products and groups contained in or related to the sedans group represented by the sedans icon 732.

The right pane 742 displays the products and groups contained in the sedans group in a two-column format. Each column is designated by a column heading—a Product_ID heading 744, and a Name heading 746. A first product 750 contained in the sedans group is represented in FIG. 7D as having a Product_ID "P0121," and a name "Honda Accord." A second product 752 contained in the sedans group is represented as having a Product_ID "P0122," and a name "Toyota Camry." A more sedans group is represented as being contained within the sedans group by an icon 754 labeled "More Sedans." Also, a luxury sport utility group is represented as being contained within the sedans group by an icon 756 labeled "Luxury Sport Utility."

The store design user interface 760 thus conveniently and concisely conveys to a merchant relationships between groups and products forming the structure of an electronic store. Using the enhanced Web browser, a merchant also establishes and modifies those relationships. Advantageously, the Merchant Workbench modifies relationships between products or groups based on single drag-and-drop operations.

f. Modifying Store Structure by Drag-and-Drop Operations

Figure 9:
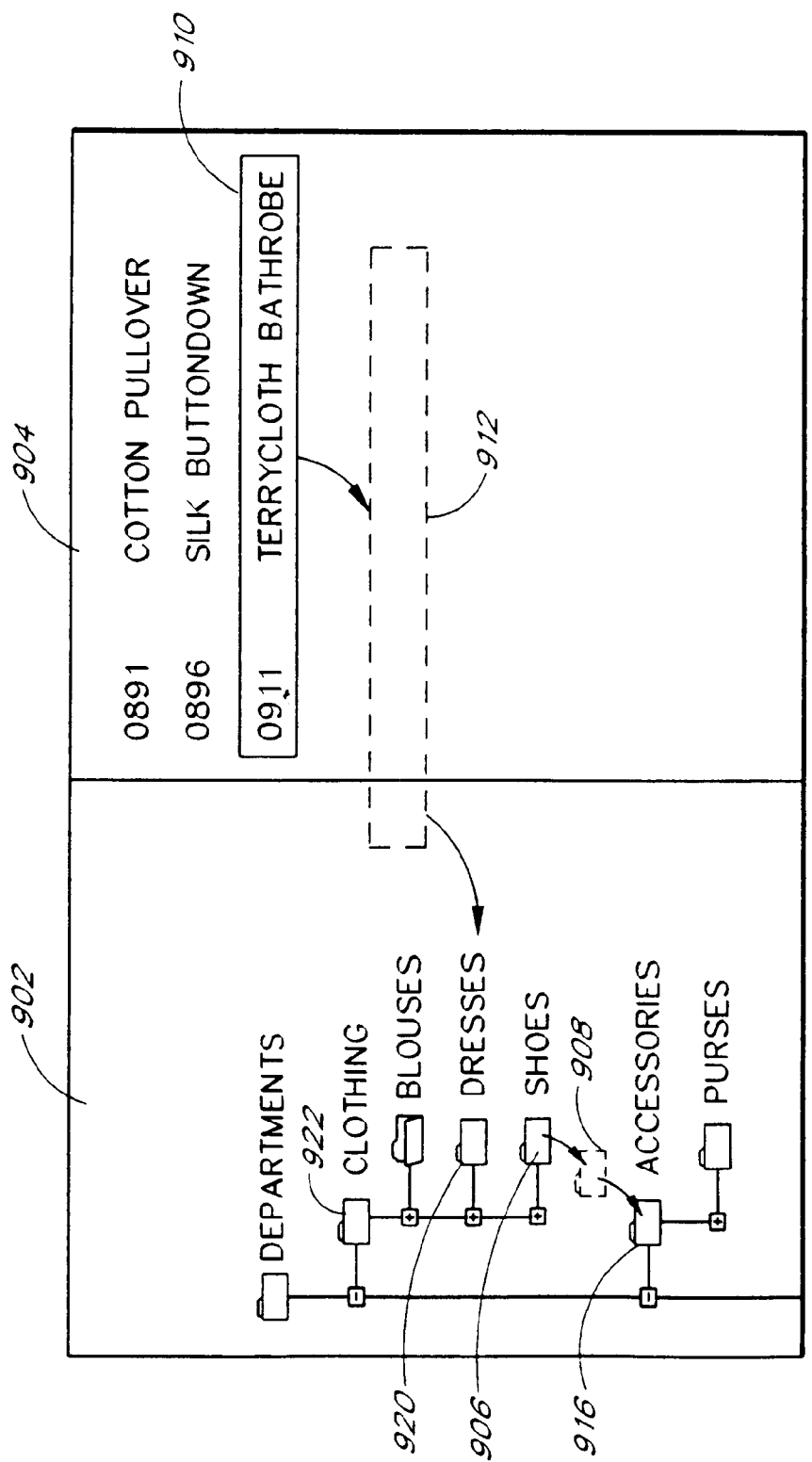
FIG. 9 illustrates a process of dragging and dropping elements of a left pane and of a right pane of a store design user interface.

FIG. 9 illustrates a left pane 902 and a right pane 904 of a store design user interface. Elements appearing in the left pane 902 or the right pane 904, such as an icon 906 or a text item 910, are selected using a mouse pointer. A user selects the icon 906 by positioning a mouse pointer over the icon 906 and depressing a mouse button. The user drags the icon 906 by moving the mouse pointer to a different screen location while continuing to depress the mouse button.

Each element (e.g., text string or icon), whether associated with a group or a product, is enabled as a valid drag source. Thus, each element representing a product (e.g., text string representing a Product_ID value or Product_Name value) can be selected by a mouse and 'dragged' to a different position in the store design user interface 310. Furthermore, each such element is associated with information about the respective product it represents and that information is available to event_handler routines when such element is dragged.

Each element of the left pane 902 or the right pane 904 associated with a group (e.g., an icon or a text string representing a Group_Name) can also be selected with a mouse and dragged to a different location in the store design user interface. When a group element is dragged, information about the group (e.g., Group_ID value and Group_Name value) is accessible by event handlers.

One of ordinary skill in the art knows how to create bitmaps (i.e., collections of adjacent pixels on a computer screen) comprising icons and text strings, such that the bitmaps may be dragged by a mouse to different locations in a graphical user interface. Further, it is also well known to associate information with a bitmap such that the information is accessible when the bitmap is dragged.

Figure 10A:
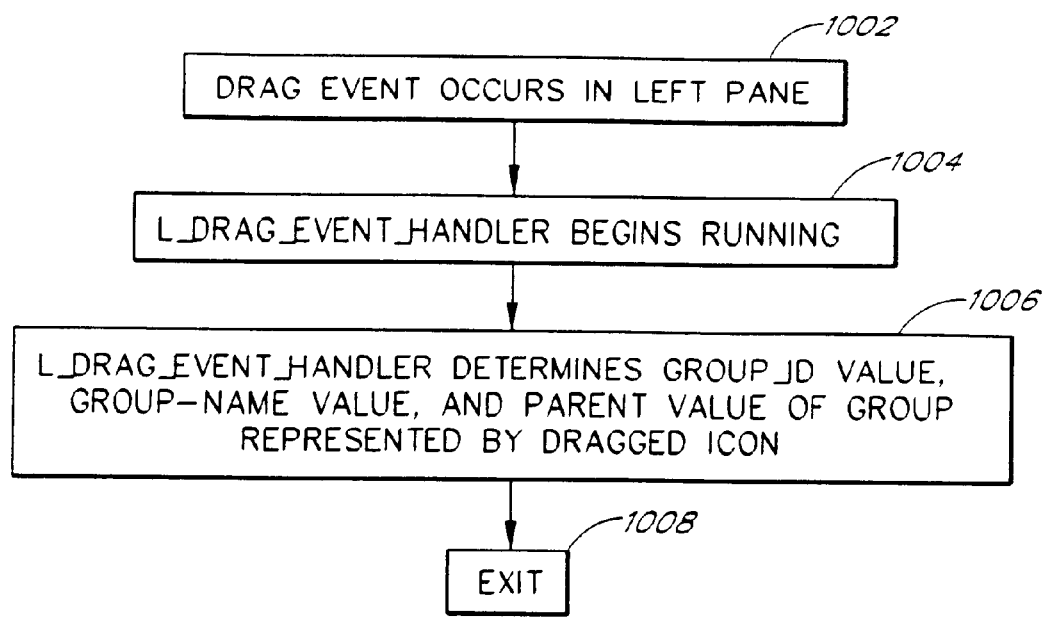
FIG. 10A illustrates steps performed when a drag event occurs in the left pane of a store design user interface.

FIG. 10a illustrates steps performed when a drag event occurs in the left pane 902. In a first step 1002, a left pane drag event is recognized. In a next step 1004, an event handler called, for example, L_Drag_Event_Handler, of the Tree Structure Control 304, begins running. In a further step 1006, the L_Drag_Event_Handler determines the Group_ID value of the group associated with the icon being dragged. Also, in the step 1006, the L_Drag_Event_Handler determines the Group_Name value and the Parent value of the group associated with the icon being dragged. In a next step 1008, the L_Drag_Event_Handler terminates.

A drag event occurs in the right pane 904 when the user selects an element of the right pane 904 using the mouse and proceeds to position the element to a new location within the store design user interface 905. For example, the drag event in the right pane 904 is recognized when a user positions a mouse pointer over the text element 910 representing a product, depresses a mouse button, and moves the mouse pointer to a new location 912 while continuing to depress the mouse button.

Figure 10B:
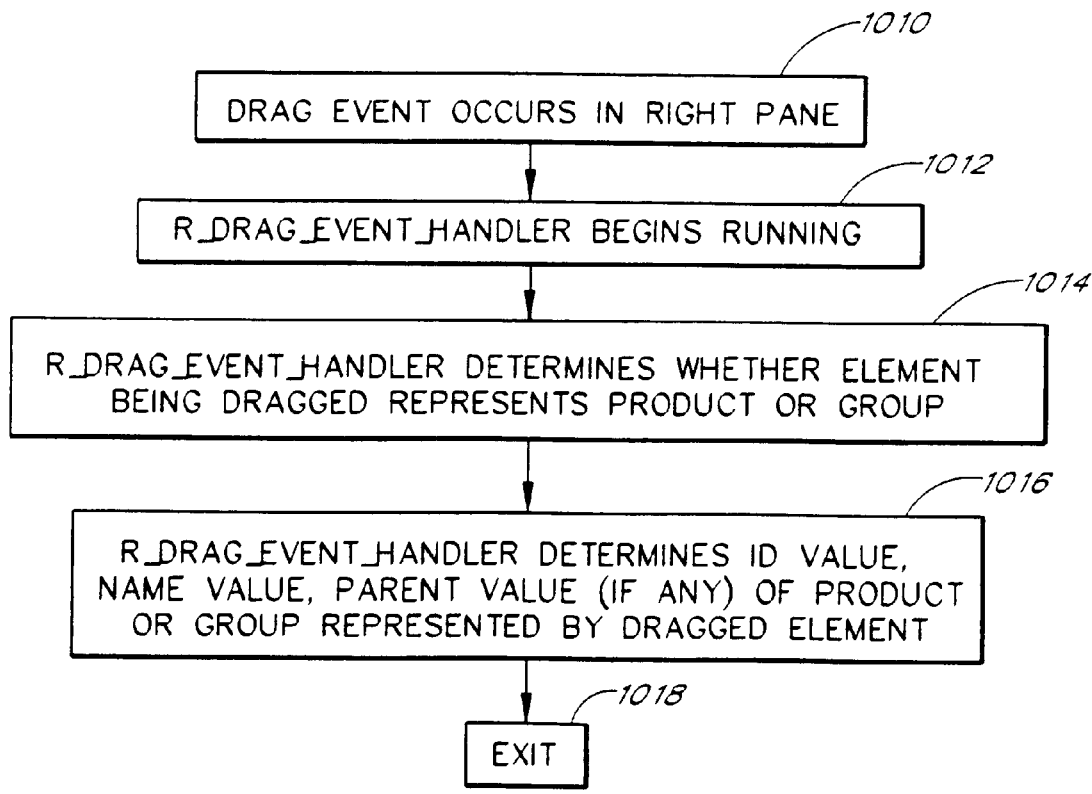
FIG. 10B illustrates steps performed when a drag event occurs in the right pane of a store design user interface.

FIG. 10b illustrates steps performed when a drag event is recognized in the right pane 904. In a first step 1010, a drag event in the right pane is recognized. An event handler called, for example, R_Drag_Event_Handler, of the store management control 306 begins running in a further step 1012, following the recognition of the drag event in the right pane 902. In a next step 1014, the R_Drag_Event_Handler determines whether the element in the right pane being dragged represents a group or a product. To determine whether a dragged element represents a group or product, the R_Drag_Event_Handler accesses the drag source information made available by the drag source object. If a dragged element represents a group, then the R_Drag_Event_Handler accesses drag source information including Group_ID value, Group_Name value, Parent value, and a Type value. A Type value of 'G' indicates, for example, that the dragged element represents a group. If a dragged element represents a product, however, then the R_Drag_Event_Handler accesses drag source information including Product_ID value, Product_Name value, and a Type value of 'P' (indicating that the dragged element represents a product).

In a next step 1016, the R_Drag_Event_Handler determines the ID value of the product or group being dragged. Also, in the step 1016, the R_Drag_Event_Handler determines the group name or the product name of the element being dragged, as well as the Parent value if the element is a group. In a further step 1018, the R_Drag_Event_Handler tenninates.

A drop event is recognized in the left pane 902 when an element in the process of being dragged is dropped in the left pane 902. For example, the icon 906 is selected and dragged to a new location 908 and is further dragged to the position occupied by the icon 916 whereupon the mouse button is released. The drop event occurs when a drag event terminates with the release of a mouse button and when the dragged element is positioned on top of a valid drop target. According to one embodiment of the present invention, icons representing groups in the left pane 902 or the right pane 904 of the store design user interface are valid drop targets.

In response to simple drag and drop operations, the Merchant Workbench updates relationship information in a product information database 116 (or inventory control system) and also updates relationship information in data structures local to the enhanced Web browser 112. Accordingly, any changes to the hierarchical structure of an electronic store initiated by a merchant using the enhanced Web browser cause modifications to a remote product information database, and those modifications are then represented to the merchant by altering as needed the subordinate relationships of icons displayed by the store design user interface. Thus, a merchant receives intuitive visual feedback that requested structural changes were successfully accomplished.

Figure 11A:
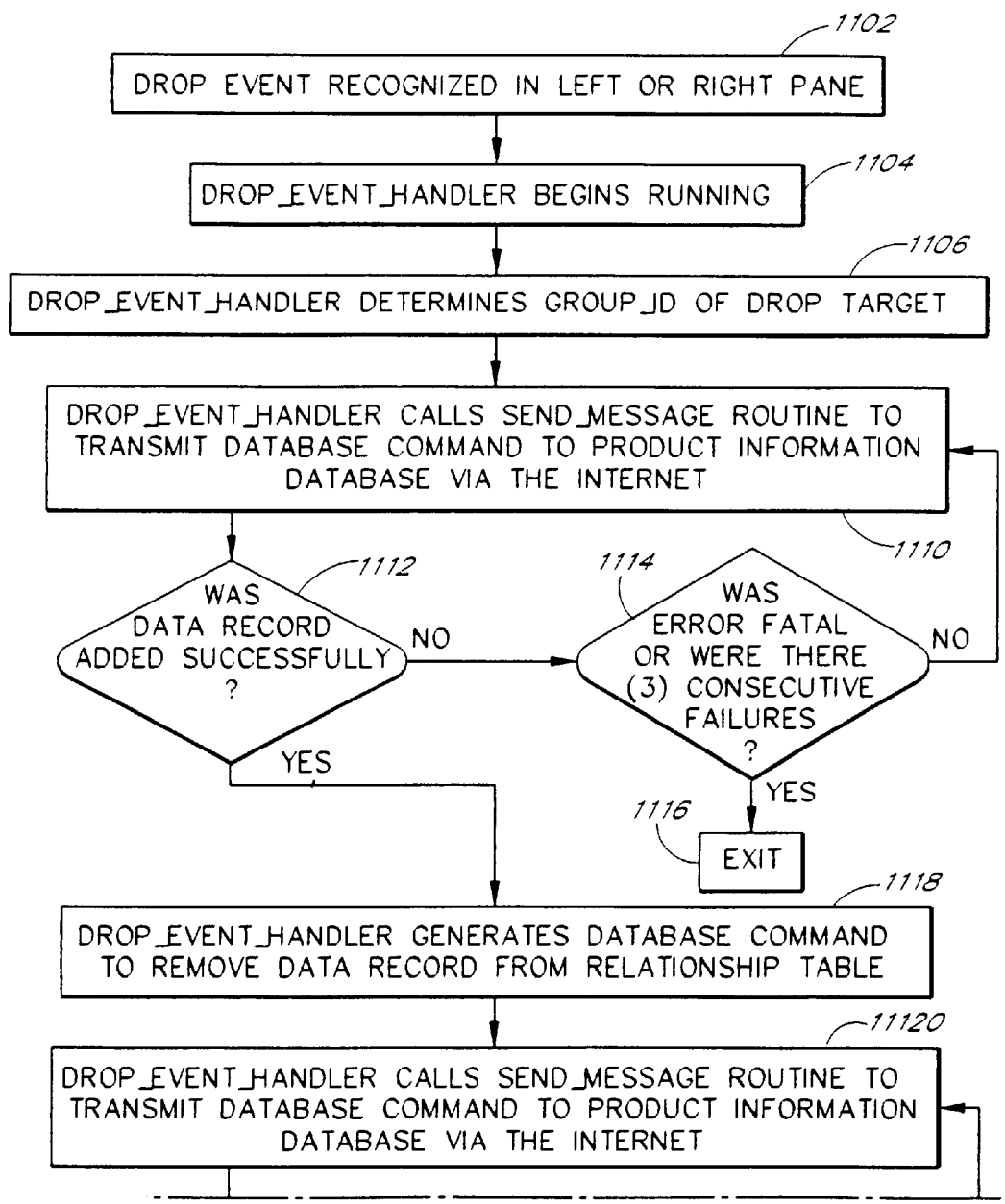
FIGS. 11A and 11B illustrate steps performed to modify relationships between groups or products when a drop event is recognized in either the left pane or the right pane of a store design user interface.
Figure 11B:
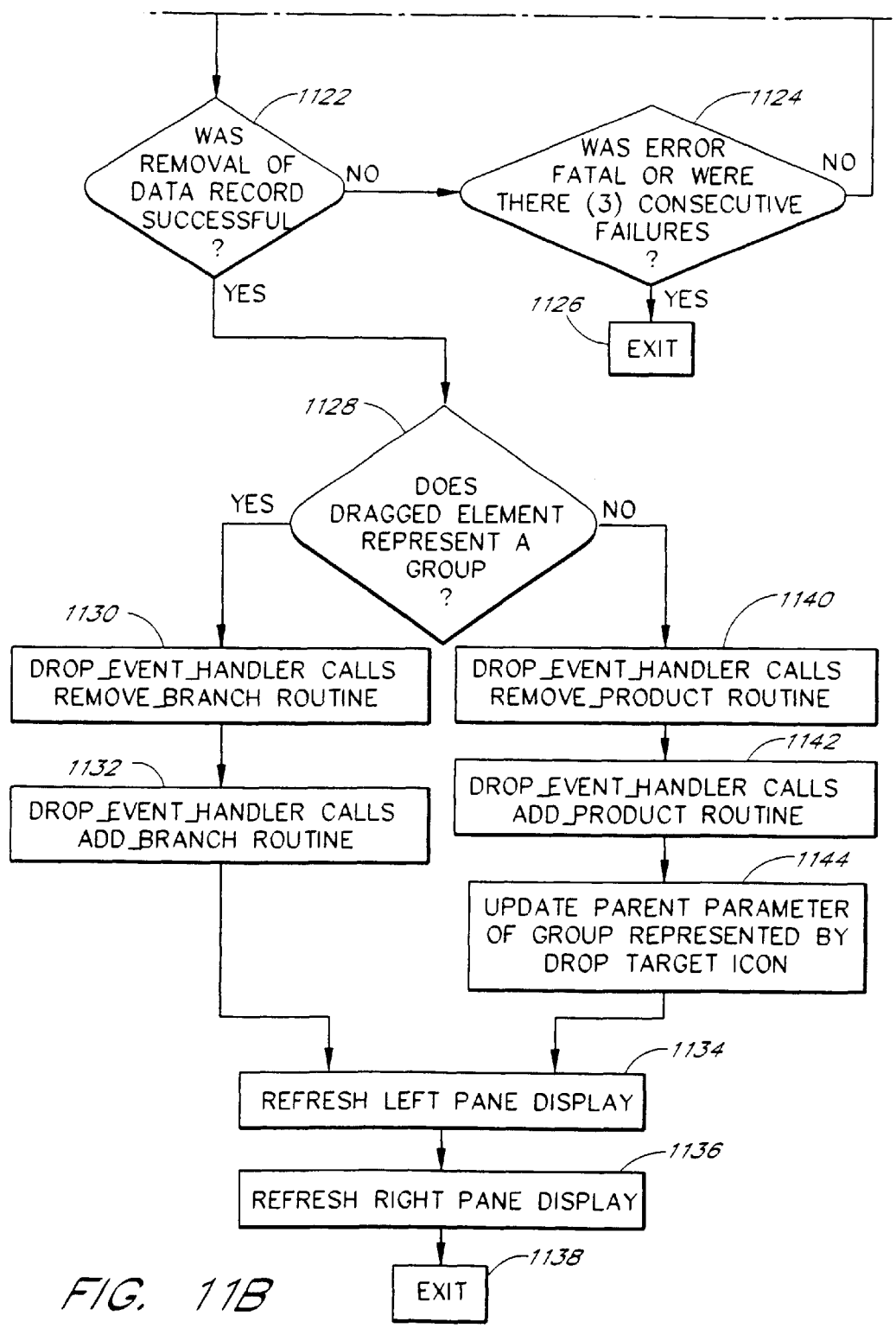

FIGS. 11A and 11B illustrate steps performed to modify relationships between groups or products when a drop event is recognized in either the left pane 902 or the right pane 904. In a first step 1102, a drop event is recognized in the left pane upon the release of a mouse button that was depressed to begin a drag operation. In a next step 1104, an event handler called, for example, Drop_Event_Handler, of the store management control 306 begins running. In a further step 1106 the Drop_Event_Handler determines the Group_ID value of the group associated with the dropped target icon.

Then, in a next step 1108, the Drop_Event_Handler generates a database command to add a new data record to the relationship table 202. The database command adds a record having an ID field equal to the Group_ID associated with the drop target icon, and a Related_ID equal to the Group_ID value or the Product_ID value corresponding to the drag source element (the element dragged by the user). The new data record will also specify a 'contained in' relationship because the command to add a new data record specifies that the value of the Relationship field be set to 'C'.

In a next step 1110, the Drop_Event_Handler calls the Send_Message routine of the store management control 306 to communicate the database command to the product information database 116 via the Internet. Communication of the database command to the product information database 116 is performed in the manner described in connection with FIG. 5.

In a further step 1112, the Drop_Event_Handler determines whether a data record was successfully added to the relationship table 202 of the product information database 116 by examining a value of a result code embedded in a message transmitted by the Web server 106 to the enhanced Web browser 112. The Drop_Event_Handler receives a result code of, for example, "Result=Success" if a data record was successfully added; a result code of, for example, "Result=Non-Fatal Error" if a non-fatal error prevented the addition of a new data record; or a result code of, for example, "Result=Fatal Error" if a fatal error prevented the addition of a new data record.

If, in the step 11 12, the Drop_Event_Handler determines that a data record was not successfully added to the relationship table 202, then, in a next step 1114, the Drop_Event_Handler determines whether an error preventing a data record from being added to the relationship table 202 was fatal. If, in the step 1114, the Drop_Event_Handler determines that a fatal error prevented a data record from being added to the relationship table 202, or if three consecutive non-fatal errors occurred, then, in a next step 1116, the Drop_Event_Handler terminates. If, however, in the step 1114, the Drop_Event_Handler determines that a non-fatal error prevented a data record from being added to the relationship table 202, and if no more than two consecutive non-fatal errors have occurred, then the Drop_Event_Handler repeats the step 1110.

Then, in a next step 1118, the Drop_Event_Handler generates a database command to remove a data record from the relationship table 202. The database command is designed to remove a data record having a Related_ID field equal to the Group_ID value associated with the dragged icon. The SQL command to remove the data record from the relationship table 202 requires certain parameters: the ID of the object to move (passed as a parameter called Moved_Object_ID), the Group_ID of the parent group (group where the group is moved FROM, passed as a parameter called From_Group_ID). The following is an example of such a database command:

Delete Relationship
   Where Relationship.ID_Type='G'
   And Relationship.ID=From_Group_ID
   And Relationship.Relationship='Contains'
   And Relationship.Related_ID=Moved_Object_ID In one embodiment of the present invention, no Product_ID value is the same as any Group_ID value. One skilled in the art will understand that, in this embodiment, the database command required to remove a data record from the relationship table 202 need not specify whether the Related_ID field of the data record to remove comprises a Product_ID value or a Group_ID value.

Next, in a further step 1120, The Drop_Event_Handler of the store management control 306 calls the Send_Message routine to transmit the database command to the product information database 116 via the Internet. Communication of the database command to the product information database 116 is performed in the manner described in connection with FIG. 5.

In a further step 1122, the Web server 106 transmits a result message to the enhanced Web browser indicating whether the database command successfully removed a data record from the product information database 116. The result message includes a result code in name/value pair format. When a data record is successfully removed, the result code is, for example, "Result=Success." When a data record is not removed due to a non-fatal error, the result code is, for example, "Result=Non-Fatal Error." When a fatal error prevents a data record from being removed, the result code is, for example, "Result=Fatal Error." In the step 1122, the Drop_Event_Handler examines the result code, and, if the result code indicates that a data record was not successfully removed, then in a next step 1124, the Drop_Event_Handler determines whether the error was fatal or non-fatal. If the error was fatal or if three consecutive non-fatal errors occurred, then, in an additional step 1126, the Drop_Event_Handler terminates. If the error was non-fatal and no more than two consecutive non-fatal errors occurred, then, the Drop_Event_Handler records an additional non-fatal error and repeats step 1120.

If, in the step 1122, the Drop_Event_Handler determines that a data record was removed successfully, then in a next step 1128, the Drop_Event_Handler accesses the drag source information to determine whether the user dragged an element representing a group. If so, then, in a next step 1130, the Drop_Event_Handler calls a Remove_Branch routine of the tree structure control 304.

The Drop_Event_Handler passes the Group_ID associated with the dragged element (e.g., an icon representing a group) as a parameter to the Remove_Branch routine. The Remove_Branch routine removes a node from the Group Tree Structure whose Group_ID value matches that associated with the dragged icon.

In a next step 1132, the Drop_Event_Handler calls the Add_Branch routine of the tree structure control 304. The Add_Branch routine receives as parameters (1) the Group_ID value associated with the drop target icon, (2) the Group_Name associated with the drag source element, (3) the Group_ID value associated with the drag source element, and (4) the Parent Value associated with the drag source element. The Add_Branch routine then adds a new node to the Group Tree Structure, the new node having a Group_Name, Group_ID, and Parent Value equal to that of the group represented by the drag source element.

Then, in a further step 1134, the Drop_Event_Handler calls the refresh method of the tree structure control 304 which updates and refreshes the left pane display 902. In a next step 1136, the Drop_Event_Handler calls the refresh method of the store management control 306. The refresh method of the store management control 306 updates and refreshes the right pane display 904. Then, in a further step 1138, the Drop_Event_Handler terminates.

If, in the step 1128, the Drop_Event_Handler determines that the dragged element represents a product, then, in a next step 1140, the Drop_Event_Handler calls the Remove_Product routine of the store management control 306. The Drop_Event_Handler passes to the Remove_Product routine the Group_ID value associated with drop target icon as a first parameter and the Product_ID value associated with the drag source element as a second parameter. The Remove_Product routine navigates the Product Tree Structure, locates a node whose Group_ID value matches that associated with the drop target icon, and establishes that node as a current node. Then, the Remove_Product routine accesses a pointer of the current node which points to a linked list of product data structures. The Remove_Product routine navigates the linked list of product data structures until it encounters a product data structure having a Product_ID that matches the Product_ID associated with the drag source element. The Remove_Product routine then removes that product data structure from the linked list of product data structures and terminates. One of ordinary skill in the art understands how to remove a data structure from a linked list of such data structures.

In a next step 1142, the Drop_Event_Handler calls the Add_Product routine of the store management control 306 and passes three parameters: (1) the Group_ID value associated with the drop target icon, (2) a Product_Name value associated with the dragged element, and (3) a Product_ID value associated with the dragged element. The Add_Product routine navigates the nodes of the Product Tree Structure and locates the node whose Group_ID matches that associated with the drop target icon. If no such node exists, the Add_Product routine adds such a node to the Product Tree Structure. The Add_Product routine then establishes the located (or created) node as a current node. Next, the Add_Product routine accesses a pointer of the current node which points to a linked list of product data structures, navigates that linked list to its end, allocates memory for a new product data structure, and adds the new product data structure to the linked list. The Add_Product routine sets the Product_ID value and Product_Name value of the new product data structure to the values as passed in the second and third parameters, which correspond to values associated with the dragged element. The Add_Product routine then terminates.

In a next step 1144, the Drop_Event_Handler updates the Parent value of a node in the Group Tree Structure whose Group_ID matches that of the drop target icon. Updating this Parent value ensures that the Group Tree Structure represents that a group associated with the drop target icon has at least one subordinate group or product. Thus, when the left pane display is updated, an expand icon is associated with the drop target icon, indicating that groups or products subordinate to the drop target icon exist and may be examined.

Next, additional steps 1134, 1136, and 1138 are performed, whereupon the left display 902 and the right display 904 are updated and refreshed, and the Drop_Event_Handler terminates.

Tables 10, 11, and 12 below illustrate respectively data in the group table 206, the products table 204, and the relationship table 202 before any updating caused by the drag and drop move actions 908, 912 illustrated in FIG. 9 (for readability, only relevant subsets of data are represented).

TABLE 10

| Group Table Before Move Actions 908, 912 | | |
| --- | --- | --- |
| GROUP I.D. | GROUP NAME | PARENT |
| 100 | Clothing | Y |
| 110 | Blouses | Y |
| 120 | Dresses | Y |
| 200 | Accessories | Y |
| 220 | Purses | Y |
| 230 | Shoes | Y |

TABLE 11

Product Table Before Move Actions 908, 912

| PRODUCT I.D. | PRODUCT NAME |
|---|---|
| 0891 | Cotton Pullover |
| 0896 | Silk Buttondown |
| 0911 | Terrycloth Bathrobe |

TABLE 12

Relationship Table Before Move Actions 908, 912

| I.D. | I.D. TYPE | RELATIONSHIP | RELATED I.D. | RELATED I.D. TYPE |
|---|---|---|---|---|
| 100 | G | C | 110 | G |
| 100 | G | C | 120 | G |
| 100 | G | C | 230 | G |
| 110 | G | C | 0891 | P |
| 110 | G | C | 0896 | P |
| 110 | G | C | 0911 | P |
| 200 | G | C | 220 | G |

Table 13 below represents data in the relationship table 202 after the group move action 908.

TABLE 13

Relationship Table After Group Move Action 908

| I.D. | I.D. TYPE | RELATIONSHIP | RELATED I.D. | RELATED I.D. TYPE |
|---|---|---|---|---|
| 100 | G | C | 110 | G |
| 100 | G | C | 120 | G |
| 110 | G | C | 0891 | P |
| 110 | G | C | 0896 | P |
| 110 | G | C | 0911 | P |
| 200 | G | C | 220 | G |
| 200 | G | C | 230 | G |

Table 14 below represents data in the relationship table 202 following the product move action 912.

TABLE 14

Relationship Table After Product Move Action 912

| I.D. | I.D. TYPE | RELATIONSHIP | RELATED I.D. | RELATED I.D. TYPE |
|---|---|---|---|---|
| 100 | G | C | 110 | G |
| 100 | G | C | 120 | G |
| 110 | G | C | 0891 | P |
| 110 | G | C | 0896 | P |
| 200 | G | C | 220 | G |
| 200 | G | C | 230 | G |
| 120 | G | C | 0911 | P |

Figure 12:
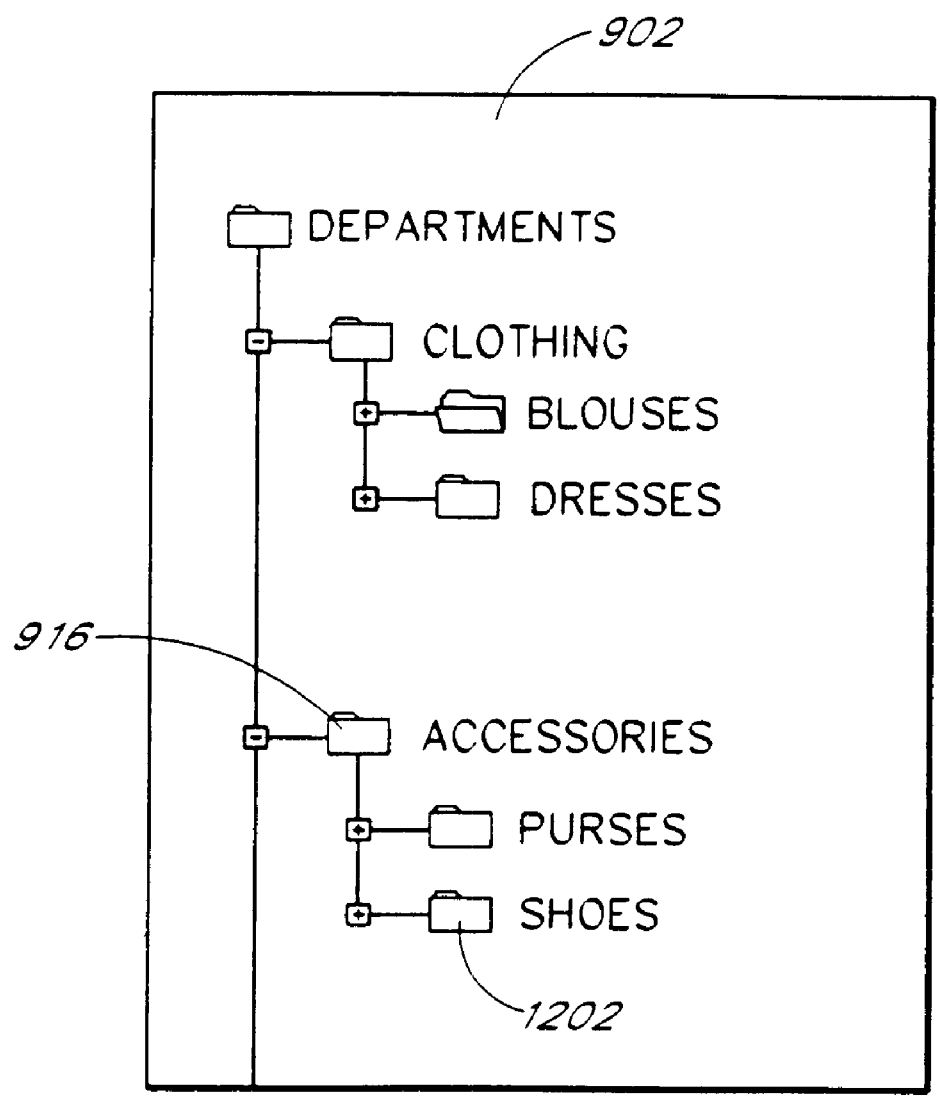
FIG. 12 illustrates an updated hierarchial structure of icons associated with groups following a drag-and-drop event operation.

FIG. 12 illustrates an updated hierarchial structure of icons associated with groups after a user performs a drag-and-drop operation as illustrated in FIG. 9. In FIG. 9, the icon 906 labeled 'shoes' is illustrated as being subordinate to an icon 922 labeled 'clothing.' Dragging the icon 906 to a new location 916 and releasing the mouse button terminates the relationship between the shoes group and the clothing group and, creates a new relationship between the shoes group and the accessories group. Thus, FIG. 12 illustrates the resulting relationship wherein an icon 1202 labeled 'shoes' is subordinate to an icon 916 labeled 'accessories.' g. Adding New Groups and New Products

Figure 13:
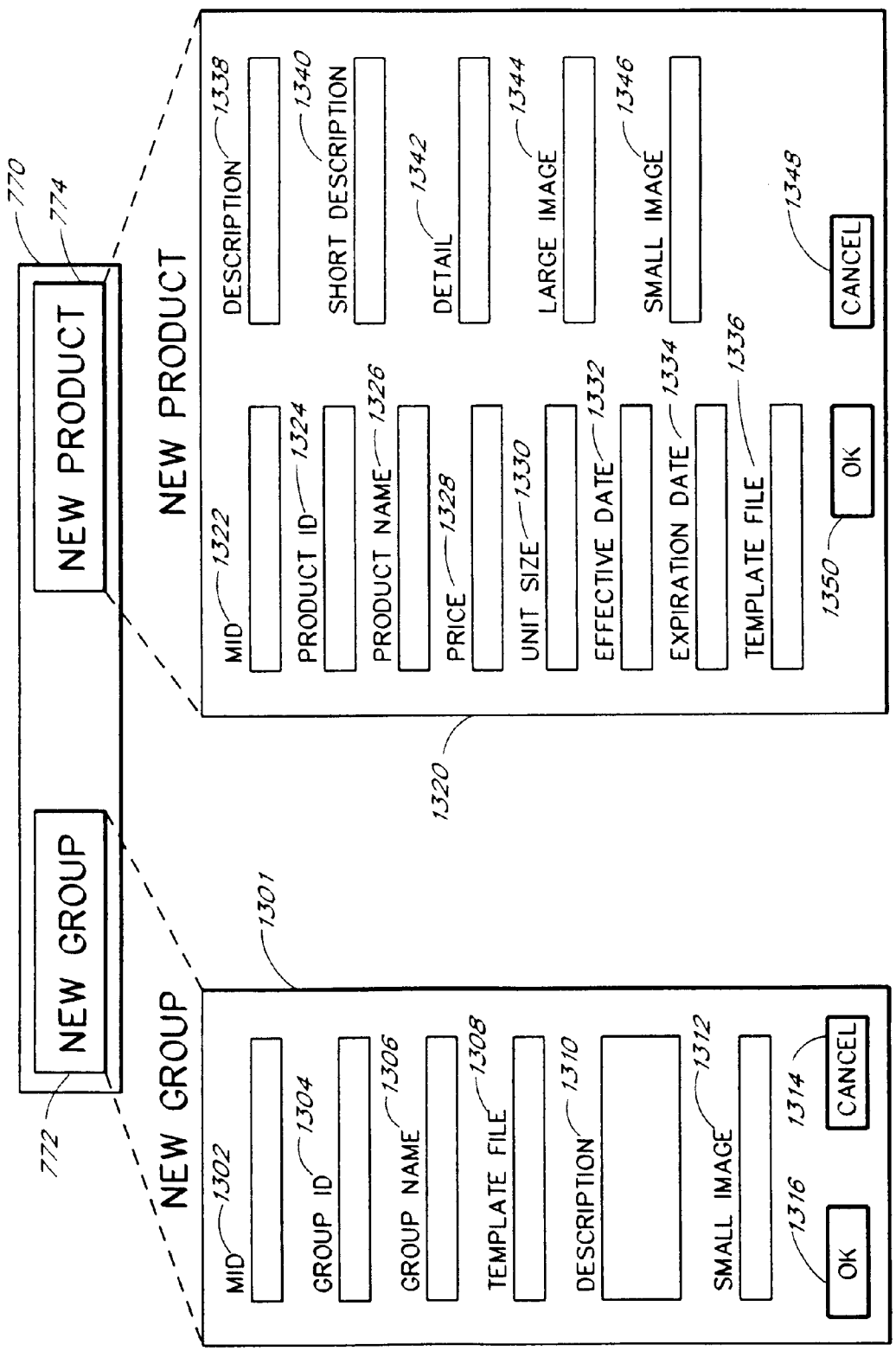
FIG. 13 illustrates a command area of a store design user interface, commands within the command area, fields and command of a new group dialogue box, and fields and command buttons comprising a new product dialogue box.

FIG. 13 illustrates portions of the store design user interface 760, including a command area 770, a new group dialogue box 1301, and a new product dialogue box 1320. The command area 770 includes a new group command 772 and a new product command 774. A user invokes the new group command 772 to enter information about a new group and invokes the new product command 774 to enter information about a new product.

FIG. 13 illustrates fields and command buttons of a new group dialogue box 1301 which prompts a user for information about a new group. The new group dialogue box 1301 includes a merchant ID field 1302, a Group_ID field 1304, a Group_Name field 1306, a template file field 1308, a description field 1310, and a small image field 1312. Also included in the new group dialogue box 1301 are a 'Cancel' button 1314 and an 'Okay' button 1316.

The new group dialogue box 1301 is displayed in response to selection of the new group command 772. A merchant or store designer enters information into the fields of the new group dialogue box, except for the merchant ID field 1302 and the Group_ID field 1304, for which the Merchant Workbench generates field values automatically. The value of the merchant ID field 1302 is held constant for all groups offered by one merchant. The value generated for the Group_ID field 1304, however, is a unique value (i.e., no two groups of products offered by a merchant have the same Group_ID value).

A user (such as a merchant operating an electronic store) enters a group name value in the Group_Name field 1306, and enters the name of an HTML template file in the template file field 1308. The HTML template file is thereby associated with the group being created. A merchant describes the new group by entering description text in the description field 1310. Also, a merchant can associate a graphical image with the new group by entering the name of a graphic file in the small image field 1312.

A user selects the cancel button 1314 to abort the creation of a new group after invoking the new group command 772 or entering information into the new group dialogue box 1301.

A user selects the okay button 1316 to finalize entry of values in the group name field 1306, template file field 1308, description field 1310, and large image field 1312. When the okay button 1316 is selected, computer instructions associated with the okay button 1316 perform steps to create a new data record in the group table 206.

Figure 14:
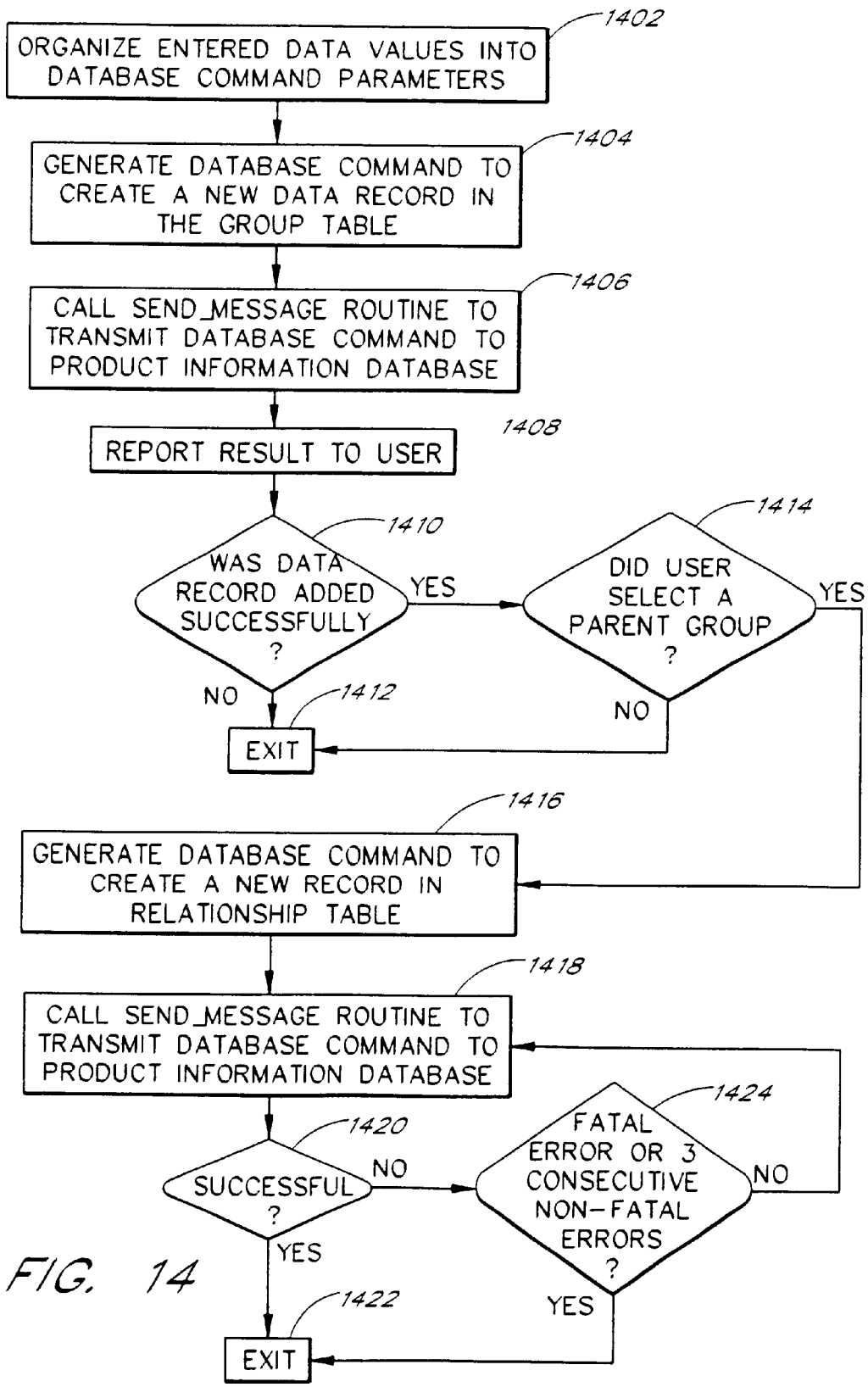
FIG. 14 illustrates steps performed to add a new group data record to a group table.

FIG. 14 illustrates steps performed to add a new data record to the group table 206. In a step 1402, the data values entered in the new group dialogue box 1301 are organized and formatted as parameter values to be included in a database command. In a next step 1404, a database command is generated which is designed to create a new data record in the group table 206. Information required to add a new record to the group table 206 includes a current merchant ID, a new group ID, a new group name, a group description, a template file name, and a small image name. The following is one example of an SQL command to add a record to the group table 206:

Insert into Groups
  Values(CurrentMerchantID, NewGroupID, NewGroupName, 'N', Description, '', Today'sDate, Today'sDate, '', '', '', '', TemplateFileName, SmallImageName)

In a further step 1406, the Send_Message routine is called to transmit the database command to the product information database 116.

In a next step 1408, a result message is received from the Web server 106 indicating the success or failure of the database command. The result message is passed as a parameter to a Message_Box routine which, in the step 1408, displays the result message in a read only dialogue box on the user's computer screen. Such Message_Box routines are known in the art. In a further step 1410, instructions associated with the okay button 1316 examine the result message to determine whether a data record was successfully added to the group table 206. If not, then, in a further step 1412, the instructions terminate. If so, then, in a next step 1414, the instructions of the okay command 1316 determine whether the user selected a parent group.

For convenience in organizing the hierarchy of groups of products of an electronic store, a user selects an existing group before invoking the new group command 772 to create a parent/child relationship between the selected group and the new group respectively. An existing group is selected, for example, by positioning a mouse pointer over an icon associated with a group and clicking a mouse button once. Thus, when creating a new group, a selected existing group becomes a parent group to the new group.

If, in the step 1414, it is determined that a parent group was not selected, the instructions of the okay button 1316 terminate in the step 1412. If, however, a parent group was selected, then, in a next step 1416, a database command is generated that is designed to add a new record to the relationship table 202. The database command specifies, for example, a Related_ID field equal to the ID value generated for the new group, a Relationship field equal to 'C' (e.g., 'contained in'), and an ID field equal to the Group_ID of the parent group.

Next, in a further step 1418, the Send Message routine is called to transmit the database command to the product information database 116. If, in a next step 1420, it is determined by examining a result message that a record was successfully added to the relationship table 202, then the instructions of the okay button 1316 terminate in a further step 1422. If, however, the record was not successfully added, then in a next step 1424, it is determined whether a fatal error occurred or whether three consecutive non-fatal errors occurred. If so, then the instructions of the okay button 1316 terminate in the step 1422. If not, then the step 1418 is repeated as necessary.

FIG. 13 illustrates fields and command buttons of a new product dialogue box 1320 which prompts a user for information about a new product. The new product dialogue box 1320 is displayed in response to selection of the new product command 774. The new product dialogue box 1320 includes a merchant ID field 1322, a Product_ID field 1324, a Product_Name field 1326, as well as fields for unit price 1328, unit size 1330, effective date 1332, expiration date 1334, template file 1336, description 1338 and short description 1340 fields, a detail field 1342, and a large image field 1344 and a small image field 1346. The new product dialogue box 1320 also includes a cancel button 1348 and an okay button 1350.

The Merchant Workbench automatically generates a value for the merchant ID field 1322 which is constant for every product offered by a particular merchant. A merchant enters a Product_ID value 1324 and a Product_Name value 1326. The merchant also enters a unit price 1328 and a unit size value 1330. The merchant determines the effective time period for the product by entering a value in the effective date field 1332 and determine when a product will expire by entering a date in the expiration date field 1334.

A merchant associates an HTML template file with the new product by entering the name of such a template file in the template file field 1336. A merchant describes a new product by entering a description in the description field 1338 and by entering a shorter description in the short description field 1340. A merchant enters detail information about a new product by entering a value in the detail field 1342. Also, by entering the name of a graphic file in the large image field 1344, a merchant associates a picture of a product with the other information about the new product. Also, a merchant associates a small picture or thumbnail-size picture of a product with the new product by typing the name of a graphic file comprising a small illustration in the small image field 1346.

A merchant aborts the creation of a data record for a new product by selecting the cancel button 1348. When a merchant is satisfied that the fields accurately reflect the information to associate with a new product, the merchant finalizes the entries by selecting the okay button 1350. Computer instructions associated with the okay button 1350 cause a data record representing a new product to be added to the products table 204 of the product information database 116.

The steps performed by the computer instructions of the okay button 1350 are nearly identical to the steps performed by the computer instructions of the okay button 1316 as illustrated in FIG. 14, and only two steps differ. The step 1404 differs when instructions of the okay button 1350 are invoked in that a generated database command is designed to add a new data record to the product table 204, rather than the group table 206. The data record added to the product table 204 includes the information entered into a new product dialogue box. Also, the step 1416 differs in that the database command is designed to associate a new product with a parent group, rather than associating a new group with a parent group. Thus, a new record added to the relationship table 202 includes a Related_ID field equal to the Product_ID of the new product, a Relationship field of 'C' (i.e., contains) and an ID field equal to the Group_ID of the parent group.

Another type of relationship can be created to support cross sales. A cross sale occurs when a consumer buys a product of one type and also decides to buy a different, but related product (e.g., a consumer buying a pair of shoes also buys socks, or a consumer buying toothpaste also buys a toothbrush, or a consumer buys french fries along with a hamburger). To facilitate such cross sales, a merchant entering information about a new product can select a cross-sales option, resulting in the presentation of a list of existing products. The merchant can then select one or more related products from a list of existing products. Once one or more related products have been selected and the merchant clicks the okay button 1350, a new record is added to the relationship table for each product selected. Each such record has a Related_ID field equal to the Product_ID of the new product, a Relationship field value of 'CS' (i.e., cross sale) and an ID field equal to the related product selected. Techniques for using such cross sale relationships include automatically generating a message to a consumer who has just ordered a particular product, such message displaying a list of related products and asking the consumer if the consumer would like to order one of the listed products.

One of ordinary skill will appreciate that validation is performed on the fields entered into either a new group dialogue box 1301 or a new product dialogue box 1320. Such validation includes determining, for example, whether values entered to represent HTML template files correspond with existing files, whether entered graphic files exist, and whether date or price values are properly formatted.

Furthermore, one of ordinary skill understands that Merchant_ID values, Group_ID values, and Product_ID values may be generated automatically or entered by a user.

h. Updating Information about Groups and Products

To update information about groups or products, a user double-clicks an element (e.g., an icon or text string) displayed in the right pane 742 (FIG. 7). To update information about a group, a user double-clicks an icon or text string associated with a group, and to update information about a product, a user double-clicks an icon or text string representing a product.

Figure 15:
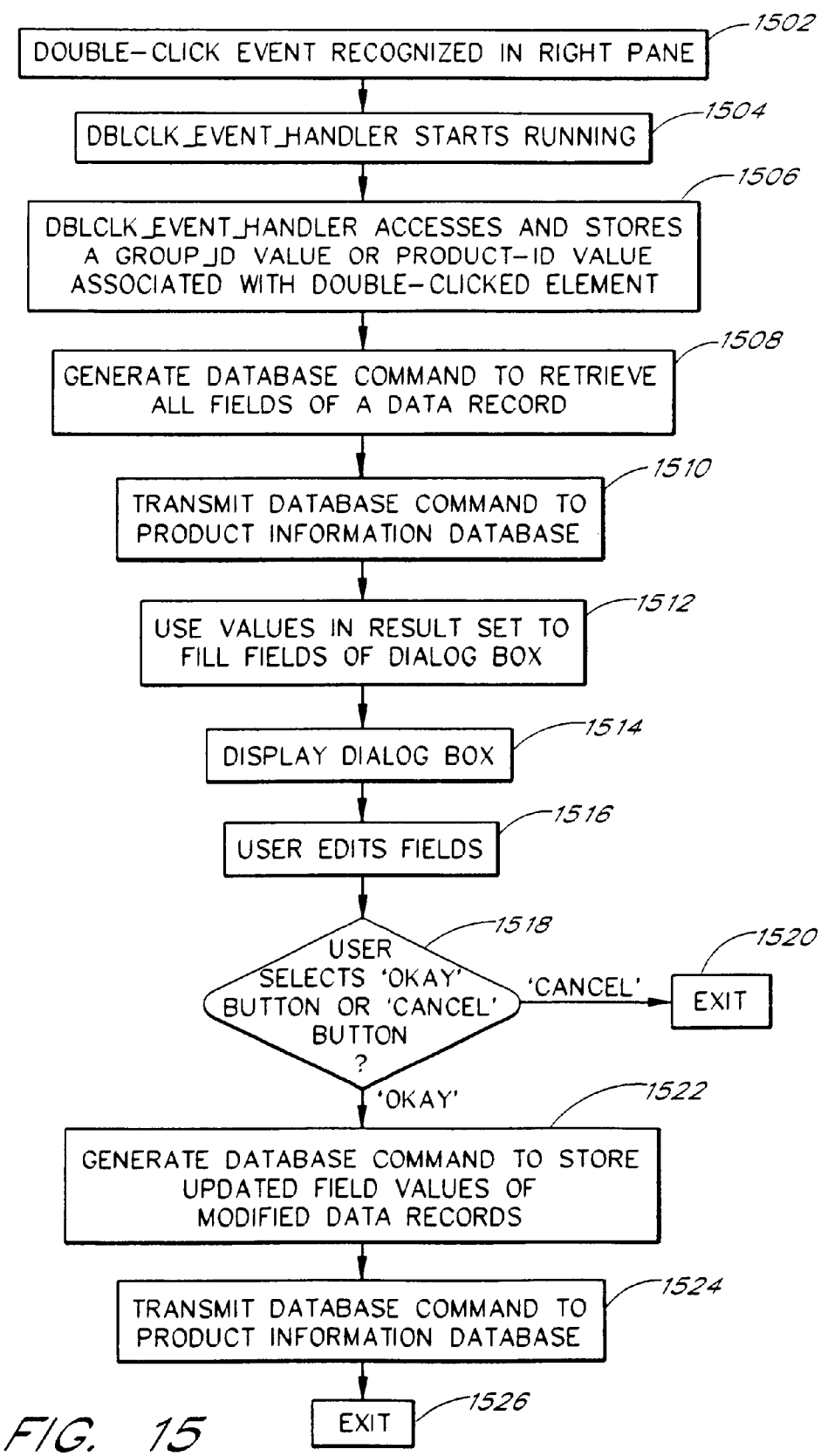
FIG. 15 illustrates steps performed to update information about a group or a product.

FIG. 15 illustrates steps performed to update information about a group or a product. In a first step 1502, a double-click event is recognized in the right pane 742. In a next step 1504, a DblClk_Event_Handler begins running in response to the double-click event. In a further step 1506, the DblClk_Event_Handler accesses the Group_ID value or the Product ID value associated with the element that was double-clicked by the user. It is known in the art to access a data structure associated with an icon when a user clicks the icon using a mouse pointer. One of ordinary skill will appreciate that such a data structure contains a value, such as a Group ID or Product ID, by which the data structure is distinguished from other such structures.

In a step 1508, the DblClk_Event_Handler generates a database command designed to retrieve all fields of the data record having an ID value equal to the Group_ID value or Product_ID value associated with the double-clicked element. An example of a command to retrieve all fields of a group record is "Select * from Groups where Groups.Group_ID=SelectedGroupID", and an example of a command to retrieve all fields of a product record is "Select * from Products where Products.Product_ID=SelectedProductID". In a next step 1510, the DblClk_Event_Handler calls the Send_Message routine to transmit the database command to the product information database 116.

In a further step 1512, the DblClk_Event_Handler receives a result set in name/value pair format in the manner described in relation to FIG. 5. The result set includes values for all the fields of a product data record or a group data record, depending on whether the user clicked an element representing a product or an element representing a group.

In the step 1512, the field values of the result set are used to fill in fields of a dialogue box. Again, the dialogue box includes all the fields of a product data record if a user double-clicked a product element, or the dialogue box contains all the fields of a group data record if the user double-clicked a group element. In a next step 1514, the DblClk_Event_Handler displays the dialogue box on the graphical user interface of the enhanced web browser 112.

In a next step 1516, a user edits the fields of the displayed dialogue box. In a further step 1518, the DblClk_Event_Handler determines whether the user selects the 'okay' button or the 'cancel' button. If the user selects the cancel button, then in a next step 1520 the DblClk_Event_Handler terminates. If, however, in the step 1518, the DblClk_Event_Handler determines that the user selects the okay button, then, in a further step 1522, the DblClk_Event_Handler generates a database command to store the updated field values of the dialogue box as modified by the user. Then, in a further step 1524, the database command to store the updated field values is transmitted to the product information database 116. One of ordinary skill in the art will appreciate that error checking is performed to verify the successful result of the step 1510 and the step 1524.

In a step 1526, the DblClk_Event_Handler terminates. It will be thus understood that the elements of the right pane 742 act as hyperlinks which, when double-clicked, enable store designers to examine and modify fielded data values associated with any product or group.

i. General Steps to Construct Electronic Store

Figure 16:
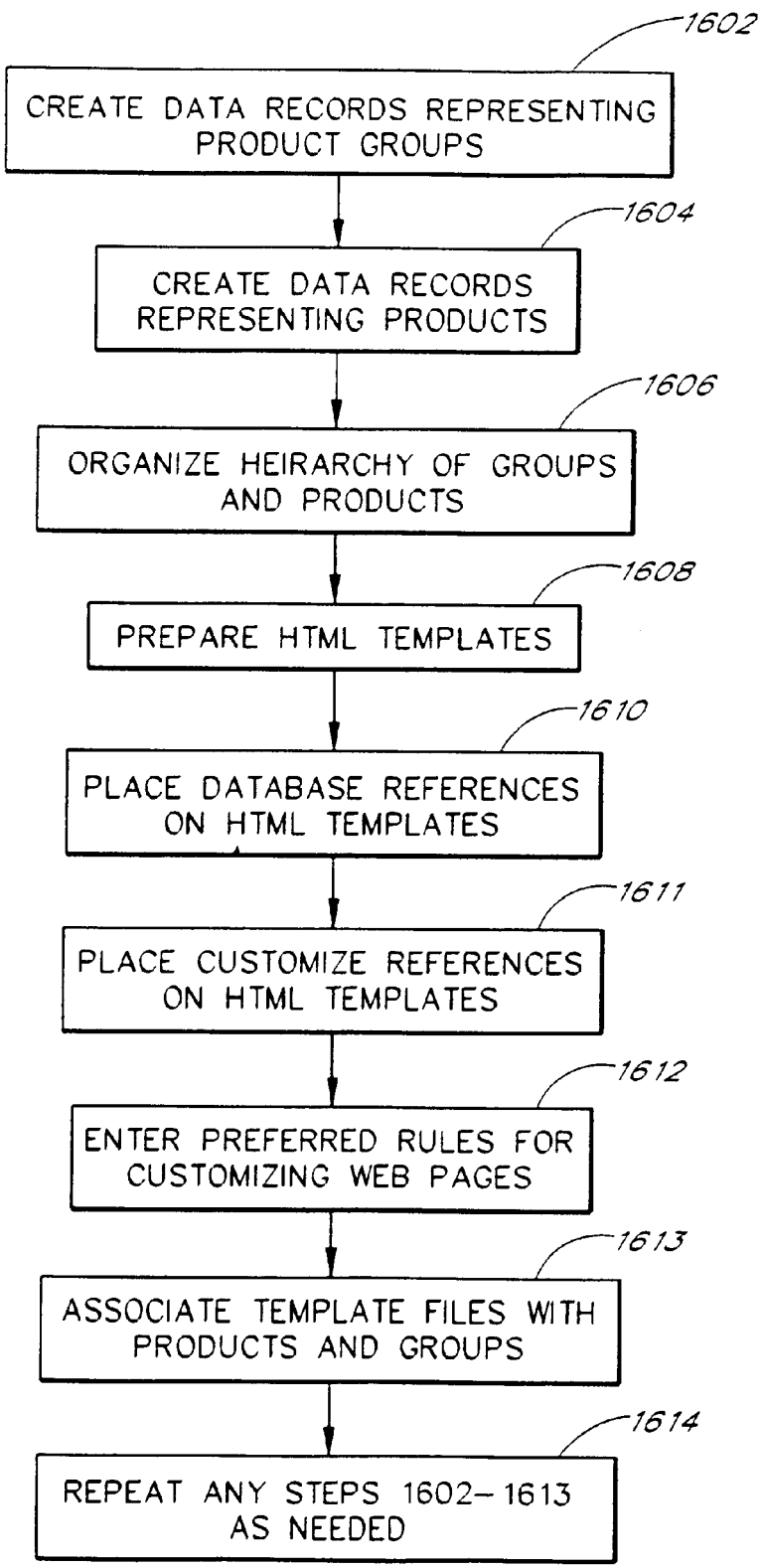
FIG. 16 illustrates high-level steps performed to integrate inventory information data with web pages of an electronic store.

FIG. 16 illustrates high-level steps performed to integrate inventory information in a computer database with web pages of an electronic store. In a first step 1602, a user creates data records representing groups (e.g., categories of products). A user creates a group data record by filling in the fields of a new group dialogue box 1301. In a next step 1604, a user creates data records representing products. To create a new product data record a user fills in the fields of a new product dialogue box 1320.

In an additional step 1606, a user organizes the hierarchy of groups and products. To organize the hierarchy of groups and products, a user manipulates elements, such as icons or text strings, of the left pane 740 or right pane 742 of the store design user interface 760, as described in relation to FIG. 9.

In a further step 1608, the user uses an HTML authoring tool to prepare HTML template pages that will ultimately display information about groups or products to a consumer. The present invention is not limited by any particular HTML authoring tool. A template page typically includes a background color or pattern and a textual title and may include additional fixed information such as a logo or a description of a group of products.

The HTML authoring tool produces a template file (i.e., a simple ASCII text file), representing a template page. Each such template file includes HTML formatting codes (or tags), text content, and references to the product information database 116 which can be resolved to extract information about a group or product.

In a further step 1610, a user embeds database references within template files. Each such database reference accomplishes two tasks: (1) extracts information about a product or group from the product information database 116, including the name of the product or group and the name of a template file associated with the product or group, and (2) translates the result set into HTML coded text. One of ordinary skill will understand that many alternative methods exist to embed such references within template files and that the present invention is not limited by a method of embedding a database reference in a template file.

According to one embodiment of the present invention, the user embeds a script of commands which specifies both a database query to perform, and a translation process to convert the query result into HTML code. The following is an example of such a script:

```
<% Set list =CreateObject("Recordset")
list.GedData "SELECT * FROM Products" %>
<TABLE BORDER=0 CELLPADDING=2>
<% If Not EmptyRecordset Then
   Do
      If EmptyRecordset Then Exit Do
      If Not FirstPass Then
         list.Movenext
      Else
         FirstPass=False
      End If
      If list.EOF Then Exit Do
      RecordsProcessed=RecordsProcessed+1
%>
<TR>
   <TD VALIGN=TOP> <%=RowCount %> </TD>
   <TD VALIGN=TOP>
      <A HREF=<%=SURL(listElemTemplate,
         "product_id",
         Cstr(list("product_id"))) %>"> <% list("name")
         %>
   </A>
   <TD VALIGN=TOP> <%=list("name") %> </TD>
   <TD VALIGN=TOP ALIGN=RIGHT> <%=(CLng(list
      ("price"))) %>
   </TD>
```

```
</TR>
    <%
Loop
End If %>
</TABLE>
```

Thus, a script embedded in a template file is accessed and executed each time a consumer requests a Web page based on that template file. The Web server processes the script to extract information from the product information database and merges the extracted information with the template file to construct the finished Web page that is sent to the requesting consumer.

In an additional step 1611, a user places customize references in template files. Placement of customize references in template files facilitates automatic adjustment of Web page content based on shopping behavior of particular consumers. Thus, for example, if a consumer routinely browses a certain favorite area (i.e., a particular Web page) of an electronic store, the electronic store can automatically modify its structure by including a hyperlink to the consumer's favorite area on all Web pages requested by that consumer.

A store designer uses an HTML authoring tool in the step 1611 to embed a customize reference in a template file associated with that Web page. A customize reference represents one or more queries to perform against a traffic database. The traffic database stores information about particular consumers, including, for example, the date and time each Web page of an electronic store was visited, and the date, time, and content of product orders.

A variety of methods exist for embedding a customize reference in a template file. According to one embodiment of the present invention, a script of commands is embedded in a template file specifying at least one query to perform on the traffic database, comparison of the query result against preferred customization rules, and, if customization is warranted, a translation to perform on the query result to convert the result to HTML format. The following is an example of a script which places on a page a link to the last product viewed by the particular consumer:

```
<% Set list=CreateObject("Recordset")
list.GetData "SELECT Product_ID, Product_Name,
   DateLastViewed FROM
Traffic, Products where Shopper ID=CurrentShopperID
   and
Traffic.Product_ID =Products.Product_ID ORDER BY
Traffic.DateLastViewed"
If Not EmptyRecordset Then %>
   <A HREF="<%=SURL(listElemTemplate, "product_
      id", Cstr(list("product_id"))) %>"> <% list
      ("Product_Name") %>
   </A>
<% End If %>
```

Thus, whenever a consumer requests a Web page based on a template file, the Merchant Workbench processes any customize command scripts to extract stored shopping patterns for the particular consumer, matches the stored patterns against customization rules (i.e., rules for determining which pages or products are preferred by a particular consumer), and, if a customization threshold is met, adjusts the content of the Web page to make shopping more convenient to the particular consumer.

In an additional step 1612, a store designer enters rules for determining which pages and which products are preferred by a particular consumer. In the step 1612, the store designer selects the preferred rules command 778 of the store design user interface 760. A Preferred_Rules routine accesses a preferred rules file. The preferred rules file includes two records: the first record comprises a collection of paired values representing preferred page rules, the second record comprises a collection of paired values representing preferred product rules. One of ordinary skill appreciates that there are many methods for storing paired values in a record of a file and the present invention is not limited by any such method.

Each paired value of the preferred page rules includes a first value representing a minimum number of accesses to a particular page by a particular consumer and a second value representing a period of time. A preferred page rule is satisfied when a consumer accesses a particular page at least as many times as specified by the first value within the time period specified by the second value. It will be appreciated by one of ordinary skill that a consumer's preference for a Web page may be shown by criteria other than a number of accesses over a period of time. For example, a consumer's preference for a Web page may be shown by the length of time (e.g., in minutes or hours) the consumer has spent accessing a Web page. This length of time may be monitored both during a single shopping session at an electronic store as well as across all shopping sessions by the consumer. Each paired value of the preferred product rules includes a first value representing a minimum number of products ordered and a second value representing a period of time. A preferred product rule is satisfied when a consumer orders a number of units of a product as least as large as the first value within the time period specified by the second value. It will be understood that a consumer's orders for products may show a preference not only for products, but also for groups (or categories) of products. Thus, a preferred group rule may include, for example, a first value representing a minimum number of products ordered from a group and a second value representing a period of time.

The Preferred_Rules routine generates a preferred rules dialogue box and displays the dialogue box on the store design user interface 760. The preferred rules dialogue box displays a preferred page list box comprising a list of entries. Each entry includes two values of a preferred page rule. The preferred rules dialogue box also displays a preferred product list box comprising a list of entries. Each entry includes two values of a preferred product rule. The entries in the preferred page and preferred product list boxes are extracted from the preferred rules file. It is known in the art to access values in a file and generate a list box of entries where each entry corresponds to a value from the file.

The store designer, in the step 1612, modifies entries of or adds entries to the preferred page and preferred product list boxes as desired. When the store designer selects an 'okay' button of the preferred rules dialogue box, the Preferred_Rules routine saves the entries of the preferred page list box as paired values in the first record of the preferred rules file and saves the entries of the preferred product list box as paired values in the second record of the preferred rules file.

One of ordinary skill will understand that many alternative methods exist for updating values stored in a file, and therefore that the present invention is not limited by any method of modifying the paired values of preferred rules.

In a next step 1613, a user associates template files with products and groups.

A user associates a template file with a product by entering the name of the template file in a template file field of either the new product dialogue box or the edit product dialogue box and then selecting the 'okay' button. A user associates a template file with a group by entering the name of the template file into the template field of the new group dialogue box or the edit group dialogue box and then selecting the 'okay' button. In a further step 1614, a user repeats any of the steps 1602-1612 as needed to specify the inventory of an electronic store and to organize its presentation.

B. Operation of an Electronic Store

An Internet-based electronic store operates by receiving and servicing requests for Web pages from consumers using standard Web browsers. Information content of a requested Web page is extracted from a product information database 116 immediately after the Web server 106 receives the request for the page. The extracted content is formatted into HTML-coded text and merged with a template file to create an HTML page. The Web server 106 then transmits the page to the requesting consumer.

Figure 17:
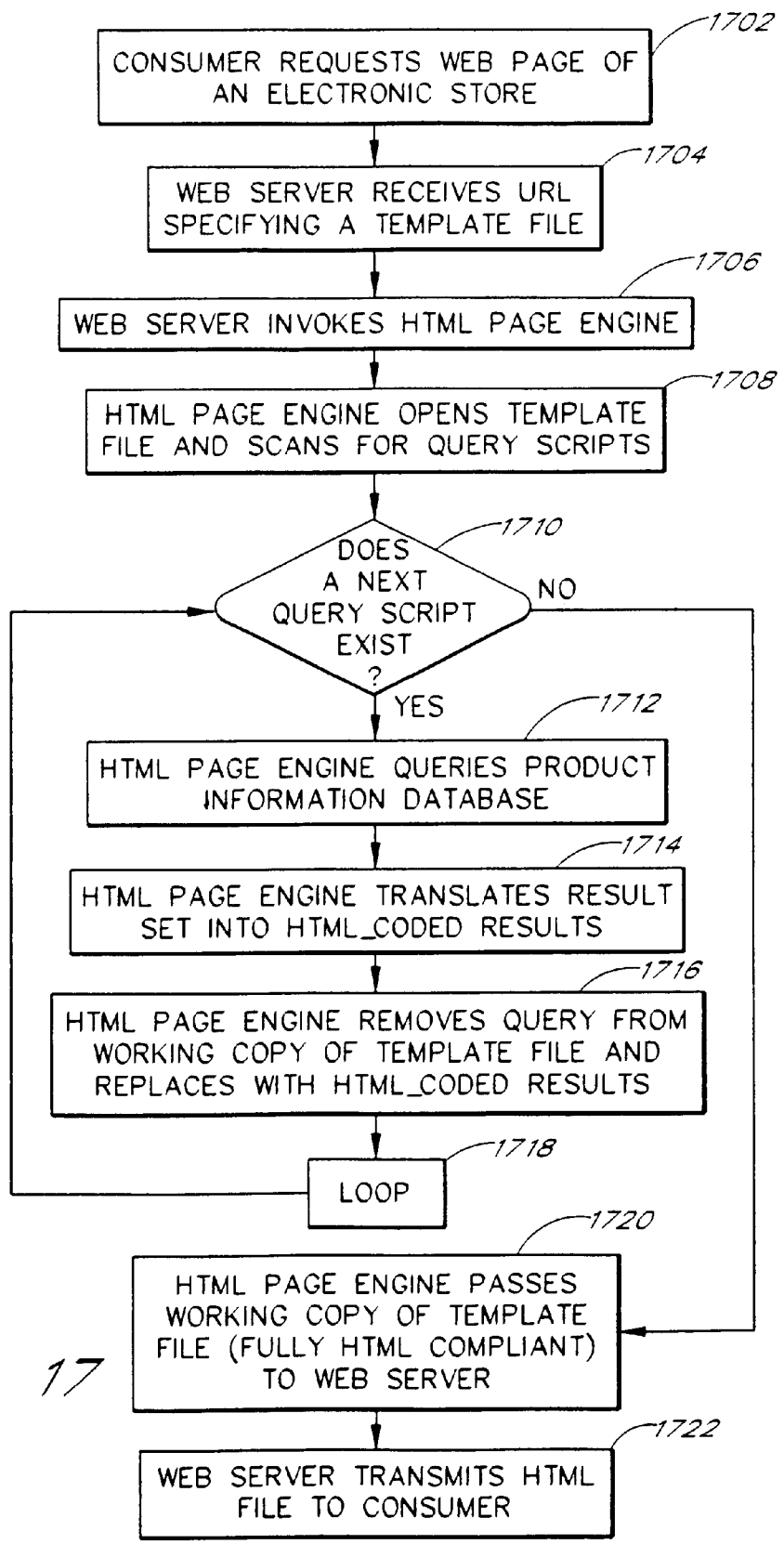
FIG. 17 illustrates steps performed by an Web server to retrieve, construct, and transmit a requested web page to a Web browser.

FIG. 17 illustrates steps performed by the Web server 106 to retrieve, construct, and transmit a requested web page to a consumer. In a first step 1702, a consumer using a standard Web browser 102 accesses an electronic store by requesting a Web page of the electronic store. In a next step 1704, the Web server 106 receives the consumer's request and examines the URL of the request. In the step 1704, the Web server determines that the URL specifies the name of a template file. One of ordinary skill in the art understands that a URL commonly specifies the name of a file.

In a further step 1706, the Web server 106 invokes an HTML page engine 126. In a next step 1708, the HTML page engine 126 opens the template file specified in the URL, and scans the template file for query scripts. It will be understood that a query script is one of many possible database references that can be included in a template file. One of ordinary skill in the art understands scanning a text file for a text string such as "<QUERY" (i.e., or other unique character string designating the beginning of a query script). In an additional step 1710, the HTML page engine 126 determines whether a query script exists in the template file. If so, then in a further step 1712, the HTML page engine 126 uses a database query in the query script to query the product information database 116. Generally, such a query extracts one or more group or product data records that are subordinate to a group represented by a hyperlink selected by a consumer. An example of such a database query is:

list.GetData "SELECT * FROM Products"

In a preferred embodiment, the HTML page engine 126 passes the query in a generic form to a relational database server 114, which translates the query into a specific form and queries the product information database 116.

In a next step 1714, the HTML page engine 126 receives a result set generated by the query and translates the result set into HTML-coded results. Those of ordinary skill are familiar with such result sets. The HTML page engine 126 translates each data record represented in the result set into HTML code which, for example, generates a hyperlink when processed by a Web browser 102. The following is an example of such HTML coding:

<A HREF="http:://www.server.com/commerce/store/product.html?group_id=23">Sedans</A>

In a further step 1716, the HTML page engine 126 makes a working copy of the template file, removes the query script from the working copy, and replaces the query script with the HTML coded results. In an additional step 1718, the HTML page engine 126 loops back to the prior step 1710 to determine whether a next query script exists in the template file. If in the step 1710, the HTML page engine 126 determines that no additional query scripts exist in the template file, then in a step 1720, the HTML page engine 126 passes the working copy of the template file, which is now fully HTML compliant, to the Web server 106, and the HTML page engine 126 then terminates. In a further step 1722, the Web server 106 transmits the HTML compliant file to the Web browser 102 over the World Wide Web 104.

Figure 18:
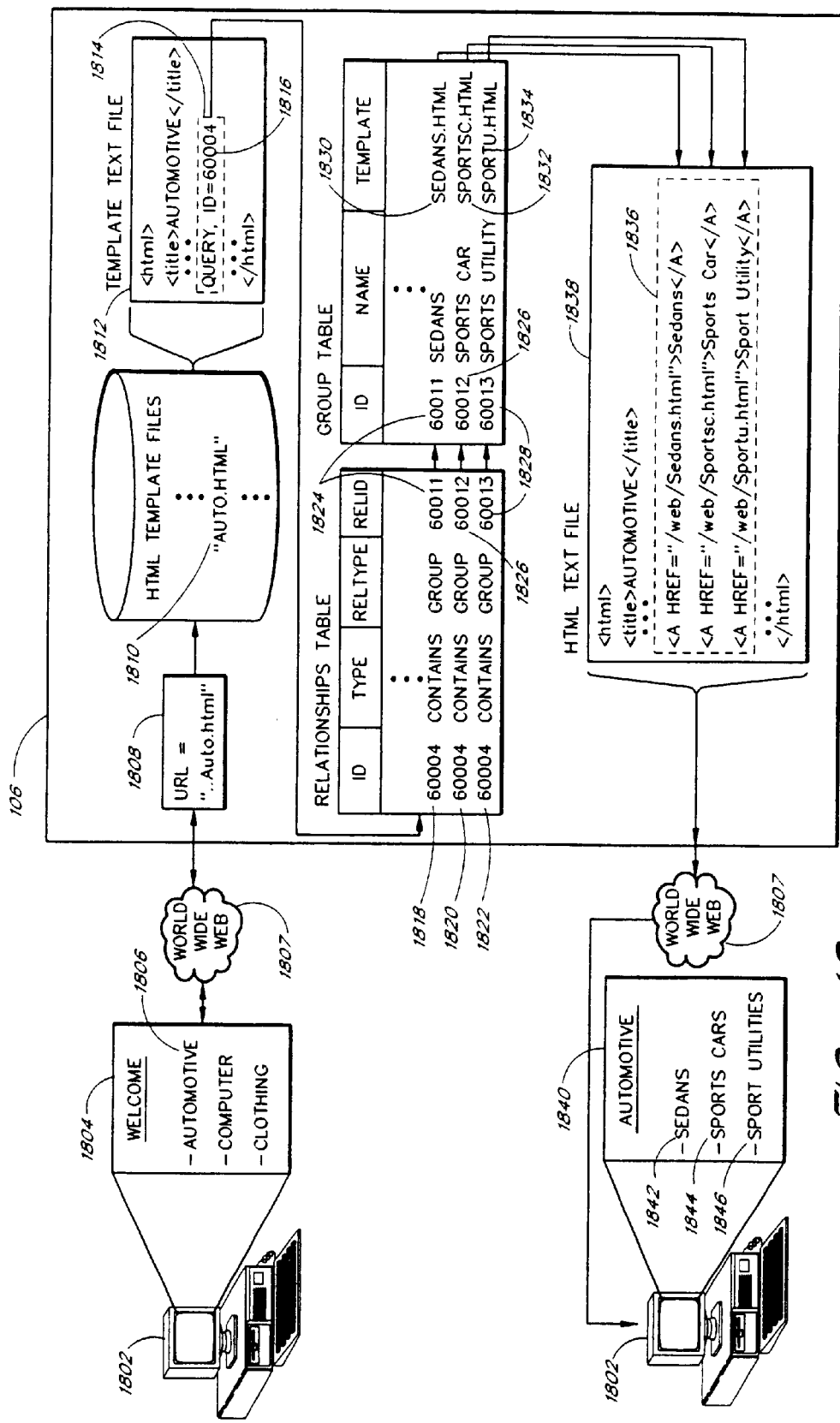
FIG. 18 illustrates an example of steps performed according to the present invention to construct a Web page requested by a consumer.

FIG. 18 represents an example of steps performed to construct a Web page requested by a consumer. A computer 1802 running a standard Web browser 102 displays a Web page 1804 at a time $t_1$. The Web page 1804 includes a hyperlink 1806 labelled "Automotive". A consumer selects the hyperlink 1806 labelled "Automotive," and the Web browser 102 generates a message requesting a Web page related to the "Automotive" hyperlink 1806. The request message is transmitted via the World Wide Web 1807 to the Web server 106.

The Web server 106 receives the request message and examines a URL 1808 embedded in the request message. The Web server 106 scans the URL 1808 and recognizes that a template file 1810 named "Auto.html" is requested. The Web server 106 then invokes an HTML page engine process.

The HTML page engine opens the template file 1810 named "Auto.html". The template file 1810 is a text file 1812. The text file 1812 includes ASCII text, HTML tags, and query scripts. The HTML page engine scans the text file 1812, searching for query scripts. The HTML page engine finds a query script 1814. The query script 1814 specifies that a query be performed against the product information database 116 to determine all groups or products related to (e.g., contained in) an automotive group having a Group_ID 1816 of 60004.

The query is then posed against the relationship table 202 of the product information database 116. As illustrated in FIG. 18, three rows 1818, 1820, 1822 of the relationship table 202 have a "contains" relationship with a group having the ID 60004. Each of the rows 1818, 1820, 1822 satisfying the query respectively includes a Rel_ID value 1824, 1826, 1828 (e.g., related ID value) identifying a group related to the automotive group.

To generate a result set from the query, the Rel_ID values 1824, 1826, 1828 are used to locate data records in the group table 206. A name and a template file name are extracted from each located data record in the group table 206. Thus, as illustrated in FIG. 18, a name of "Sedans" and a template file name of "Sedans.html" are extracted from a data record 1830 having an ID value 60011. Likewise, the names "Sports Car" and "Sport Utility" and template file names "Sportsc.html" and "Sportu.html" are extracted from data records 1832, 1834 having ID values 60012 and 60013 respectively. An example result set is the following:

Sedans, sedans.html

Sports Car, sportsc.html

Sport Utility, Sportu.html

The HTML page engine formats the result set into an HTML coded result set. The following is an example of an HTML coded result set:

<A HREF="/web/sedans.html">Sedans</A>

<A HREF="/web/sportsc.html">Sports Car</A>

<A HREF="/web/sportu.html">Sport Utility</A>

The HTML page engine then removes the query script 1814 from the text file 1812 and replaces it with the HTML coded result set 1836. After the replacement, the text file is an HTML text file 1838, compliant with the HTML coding standard.

Then the HTML text file 1838 is transmitted by the Web server 106 to the computer 1802. The HTML text file is interpreted by the Web browser 102 to generate a Web page 1840 displayed at a time $t_2$ after time $t_1$. The HTML coded result set is interpreted by the Web browser 102 as three hyperlinks 1842, 1844, 1846 on the displayed Web page 1840.

Figure 19:
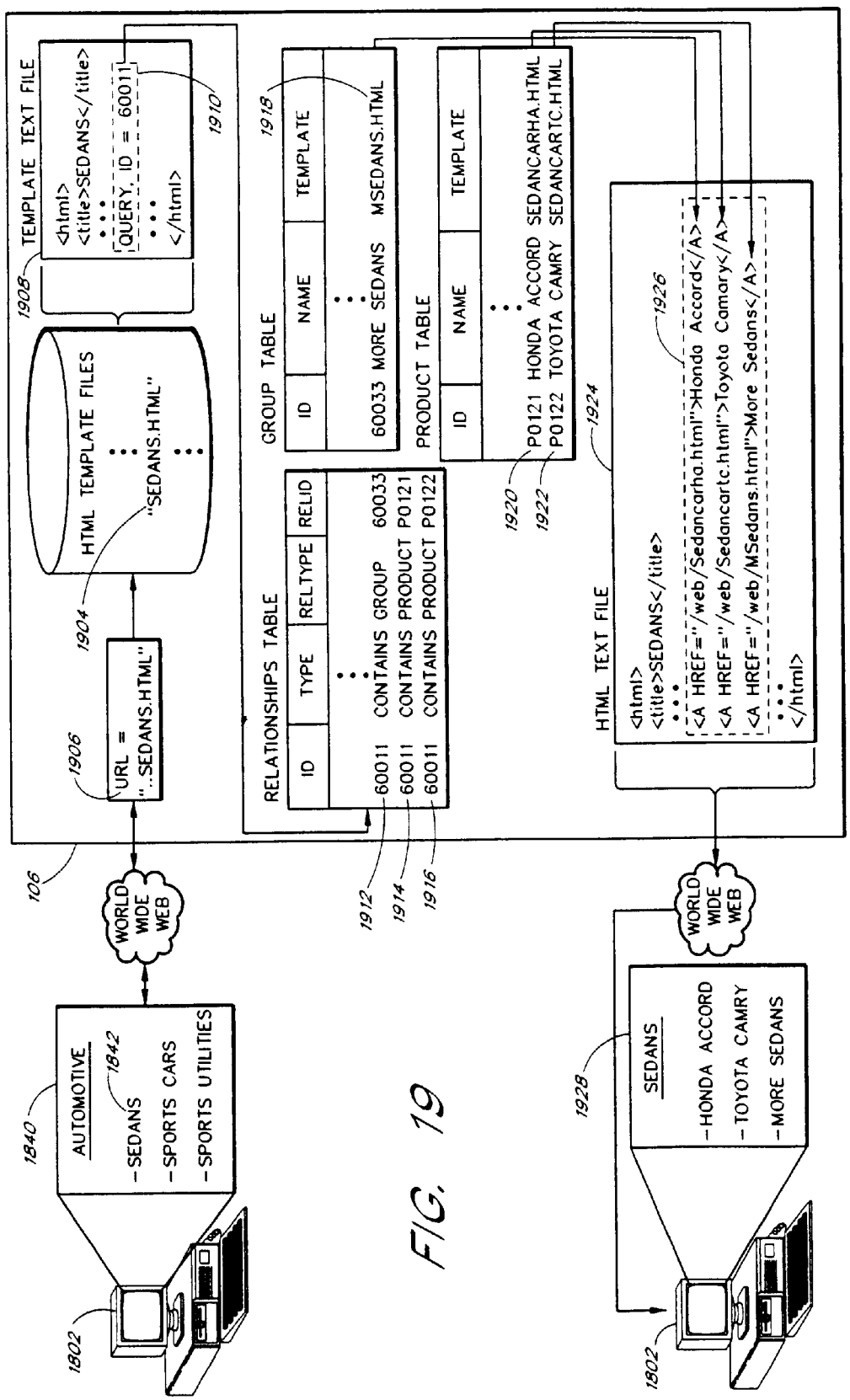
FIG. 19 illustrates a further example of steps performed to construct a Web page requested by a consumer.

FIG. 19 represents a further example of steps performed to construct a Web page requested by a consumer. The Web page 1840 is displayed by the computer 1802 at a time $t_2$. The consumer selects a hyperlink 1902 labelled "Sedans", and the Web browser 102 running on the computer 1802 transmits a message requesting a Web page to the Web server 106. The Web server 106 receives the request message and recognizes that a template file 1904 named "sedans.html" is specified in a URL 1906 of the request message.

The Web server 106 invokes the HTML page engine which opens the template file 1904. The referenced template file 1904 is a text file 1908. The HTML page engine searches the text file 1908 for query scripts. The HTML page engine finds a query script 1910 specifying a query for products or groups related to an ID of 60011.

The query is then posed against the relationship table 202 of the product information database 116. Three data records 1912, 1914, 1916 are retrieved which have a "contains" (i.e., contained in) relationship to the group having an ID of 60011(e.g., the sedans group). The data record 1912 specifies a Rel_ID of 60033 representing another group. Thus, the group table 206 is searched to locate a data record 1918 having an ID of 60033 and, when the data record 1918 is located, the name "more sedans" and the template file name "msedans.html" are extracted and stored in a result set.

The two other data records 1914, 1916 have Rel_ID values P0121 and P0122 both identifying data records of the product table 204. Accordingly, two data records 1920, 1922 are retrieved from the product table 204 having respective ID values P0121 and P0122. The name "Honda Accord" and the template file name "sedancarha.html" are extracted from one data record 1920 of the product table 204, and the name "Toyota Camry" and the template file name "sedancartc.html" are extracted from another data record 1922. The following is an example result set:

More Sedans, msedans.html
Honda Accord, sedancarha.html
Toyota Camry, sedancartc.html The HTML page engine receives the result set and translates it into an HTML coded result set. The following is an example of such an HTML coded result set:

<A HREF="/web/msedans.html">More Sedans</A>
<A HREF="/web/sedancarha.html">Honda Accord</A>
<A HREF="/web/sedancartc.html">Toyota Camry</A>

The HTML page engine creates an HTML text file 1924 by removing the query script 1910 from the text file 1908 and replacing the query script 1910 with the HTML coded result set 1926. Accordingly, one of ordinary skill understands that selectable hypertext links of a Web page are extracted from the product information database 116. It will be understood that various embodiments of the present invention extract differing elements associated with groups or products, such as graphic files comprising illustrations of a product or text files comprising detailed or summary descriptions of groups or products or numeric values representing available units or prices. Parameters of query scripts embedded in template files determine what information is extracted from a product information database. These extracted elements are translated into HTML coded result sets and merged with a template file to create an HTML compliant file which is transmitted for presentation to a consumer.

In one implementation of the Merchant Workbench, before transmitting the HTML text file 1924 to the Web browser, the Web server queries the product information database to examine the availability status of each product. One of ordinary skill will understand that a product ID value may be used to query an availability status field associated with each product. If it is determined that a product is not available, then the hyperlink associated with the unavailable product is removed from the HTML text file. It will thus be appreciated that a product availability query permits a single product information database to support both electronic store product sales and physical store sales.

For example, a physical store sells barcoded products which are passed by a barcode reader when sold. The reading of the barcode results in removing the unit product sold from the inventory on hand as indicated in the product information database (or inventory control system). By checking inventory on hand as indicated in the product information database, an electronic store implemented with the Merchant Workbench recognizes inventory fluctuation resulting from sales made by a physical store. A physical store, as used herein, refers to a store from which consumers place orders for products by voice over the telephone, by a delivery service such as U.S. mail, while physically present at the physical store, or other means not utilizing a computer network.

Once hyperlink tags are added to the HTML text file 1924, the Web server 106 then transmits the HTML text file 1924 to the Web browser 102. The Web browser 102 interprets the HTML text file and generates and displays a Web page 1928 at a time $t_3$.

1. Automatic Customization of Web Pages for Particular Consumers

The Merchant Workbench learns shopping behaviors of individual consumers and automatically adjusts the structure and content of Web pages to allow consumers to more efficiently access their favorite products or product categories. To learn shopping behaviors of individual consumers, the Merchant Workbench compiles an historical log detailing each consumer's use of an electronic store, such as which pages each consumer accesses and which products each consumer orders.

A traffic analysis database logs (i.e., stores information about) an individual consumer's access to each Web page and also logs each consumer's order for any product. The traffic analysis database thus, in one embodiment, comprises a 'browse'table and a 'product orders' table.

The browse table comprises data records having at least the following fields:

| | |
|---|---|
| Consumer_ID | (value uniquely identifying a consumer) |
| Template_File | (representing a Web page accessed by a consumer) |
| Product_ID | (value identifying product ordered) |
| Group_ID | (value identifying product category for ordered product) |
| Date | (date Web page was accessed) |
| Time | (time Web page was accessed) |

Each time a consumer accesses any Web page of an electronic store, a software tool of the present invention creates a new data record in the browse table to log information identifying the consumer, the page accessed, and the date and time of the access. It will be understood that a timestamp which indicates some instance in time can be stored and would suffice to determine when the consumer accessed a Web page.

Each time a consumer submits an order for products of an electronic store, a software tool of the present invention adds a new data record to the product orders table. Data records of the product orders table include the following fields:

| | |
|---|---|
| Consumer_ID | (value uniquely identifying a consumer) |
| Product_ID | (value uniquely identifying a product) |
| Quantity | (number of units ordered) |
| Date | (date order was placed) |
| Time | (time order was placed) |

To recognize individual consumers and distinguish between them, the software tool generates a unique ID value for each consumer. Thus, a unique consumer ID value is assigned to each individual consumer.

To effect such assignments, the Web server 106 constructs a persistent client state cookie ('cookie') and sends the cookie to a consumer's Web browser 102. The cookie comprises a name/value pair, such as 'Consumer_ID= 00333714.' After a Web browser 102 receives such a cookie, the Web browser 102 transmits the particular name/value pair (e.g., Consumer_ID=00333714) to the Web server 106 with every Web page request. Thus, when any page of an electronic store is accessed, the Web server 106 identifies the requesting consumer. Persistent client state cookies are known in the art. The present invention is not limited, however, by any method for identifying a consumer. For example, in another embodiment of the invention, a Web page of an electronic store prompts a consumer to supply a name, password, or other identification information upon each access to the electronic store. The present invention uses the supplied identification information to identify each consumer accessing the electronic store.

Figure 20B:
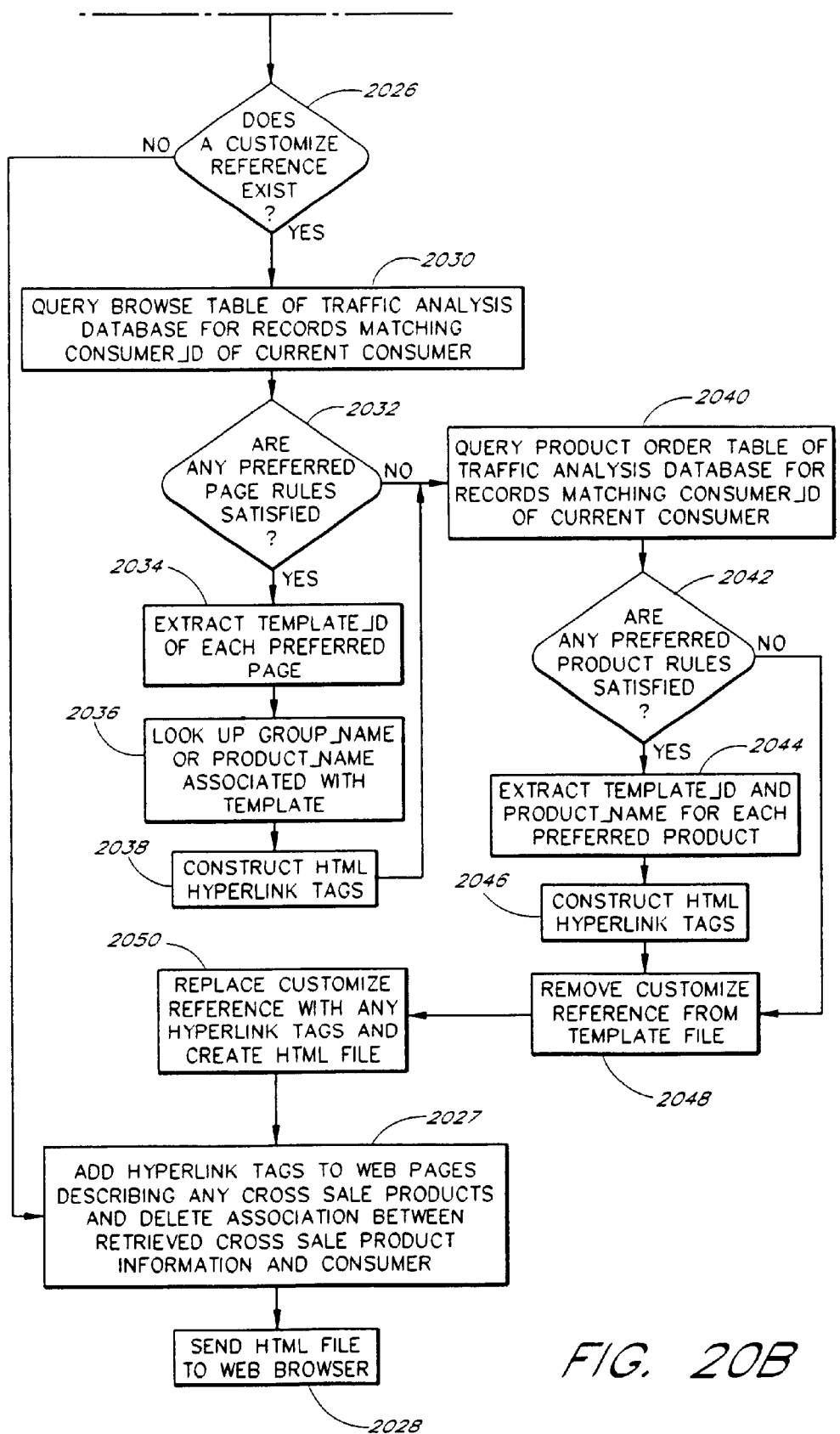

FIGS. 20A and 20B illustrate steps performed to assign a consumer ID to a consumer and to log a consumer's access to a Web page or a consumer's order for a product. In a first step 2002, the Web server 106 receives a request from a Web browser 102 for a Web page and scans the request message for a cookie identifier. In a preferred embodiment, a cookie identifier for a consumer is a name/value pair beginning with the name, "Consumer_ID=" followed by a value assigned to the consumer.

In a next step 2004, the Web server 106 determines whether a cookie identifier exists in the request message. If not, then a further step 2006, the Web server 106 generates a consumer ID value to uniquely identifying the consumer. It is well known in the art to successively generate values uniquely identifying each of a set of elements. One such method is to store an initial value on non-volatile storage media, read the value and increment it to generate a unique value, and then replace the stored value on the non-volatile storage media with the incremented value.

Next, in an additional step 2008, the Web server 106 generates a set-cookie command. A set-cookie command comprises a keyword, "Set-Cookie:" followed by a number of possible parameters. The set-cookie command uses a first parameter comprising a name/value pair. To generate a name/value pair, the Web server 106 combines an identifier constant (e.g., "Consumer_ID=") with the unique value (e.g., "000333714") generated in the step 2006. In the step 2008, the Web server combines the "Set-Cookie:" keyword with the name/value pair to generate the set-cookie command (e.g., "Set-Cookie: Consumer_ID=00333714").

In a further step 2010, the Web server 106 combines the set-cookie command with data, such as an HTML file, to be sent to the Web browser. It is known in the art to combine set-cookie commands with HTML files to create a message to be transmitted to a Web browser.

In a next step 2012, the Web server determines whether the consumer requested the first Web page (or "welcome" page) of an electronic store. This step 2012 follows the prior step 2004 if the Web server locates a cookie identifier in the request message. It will be understood that consumers browsing an electronic store routinely access the welcome page at the beginning of each shopping session. Accessing a welcome page is a shopping behavior common to virtually all consumers, and such access reveals no particular preference on the part of any consumer. Thus, one embodiment of the present invention does not compile information detailing each consumers' access to a welcome page. To determine whether a consumer is accessing a welcome page, the Web server 106 scans the URL of the request message for the presence of a file name that matches the file name of the welcome page. It will be appreciated that a file name for a welcome page may be "mystore.htm" and that a request message having a URL value of "http:\\www.elecstore.com\mystore.htm" comprises a request for a welcome page of an electronic store.

If, in the step 2012, the Web server 106 determines that the consumer requested a welcome page, then, in a next step 2020, the Web server 106 scans the URL of the request message for the name of a template file. If, however, in the step 2012, the Web server 106 determines that the consumer did not request a welcome page, then, in a further step 2014, the Web server 106 determines whether the consumer placed an order for a product. Methods by which consumers order products from electronic stores over the Internet are well known, and the present invention is not limited by any such method.

Generally, to order a product from a Web-based electronic store, a consumer enters purchase information into an order form Web page which includes text entry fields prompting a consumer, for example, for number of units, payment method (e.g., credit card number), and shipping address. A Web server 106 determines that a consumer has ordered a product by (1) scanning the URL of a request message for the presence of a file name corresponding to an order form Web page, and (2) validating the purchase information (e.g., credit card number, whether inventory includes at least the number of units ordered, etc.) entered by the consumer which is included in the request message. It will be understood that a file name of an order form Web page may be "order.asp" (in one embodiment of the present invention, the file extension ".asp" designates a template file having an embedded script that can be processed) and that a URL value of "http:\\www.elecstore.com\order.asp" indicates that a consumer has accessed an order form Web page. It will be further understood that, if insufficient inventory is available, a Web page may be transmitted to the consumer describing that the consumer's order could not be processed for insufficient inventory, or displaying some other explanatory message.

If, in the step 2014, the Web server 106 determines that the consumer ordered a product, then, in an additional step 2016, the Web server creates a new data record for the product order table of the traffic analysis database. The Web server scans the consumer's cookie identifier to determine the Consumer_ID uniquely identifying the consumer. The Web server 106 also accesses the purchase information entered by the consumer on the order form Web page which is included in the request message. The Web server 106 scans the request message for a product name, or product identifier value, and also for a quantity value (i.e., the number of units orders).

The Web server, in the step 2016, generates a database command designed to add a record to the product order table. One of ordinary skill understands that such a database command includes values for the fields of the new record. The Web server supplies values for each of the following fields:

Consumer_ID established by scanning the consumer's cookie identifier

Product_ID established by scanning the request message generated by a Web browser to order a product; the Product_ID is always specified in the request message URL Quantity established by scanning the request message generated by a Web browser to order a product Date established by accessing a common calendar function of the computer operating system under which the Web server 106 operates Time established by accessing a time function of the computer operating system under which the Web server 106 operates Then, in the step 2016, the Web server 106 issues the database command to the traffic analysis database to create a new record in the product order table. In one embodiment, the Web server uses the Quantity value to generate a database transaction command which, when processed, decreases in the product information database the total number of units available with respect to the product ordered. A status field, units field, or other attribute field of a record in the products table 204 may represent the number of units available for a particular product. Also, in the step 2016, the Web server 106 queries the relationships table 202 to retrieve any records having a "CS" or cross sales relationship with the products ordered by the consumer. The Web server 106 uses values from the Related_ID fields of any retrieved records to query the products table 204 for description information for any cross sale related products. The Web server then creates an association between the information describing any cross sale related products and the consumer. Next, in the step 2020, the Web server 106 scans the URL of the request message for the name of a template file.

If, in the step 2014, the Web server determines that the consumer did not order a product, then, in a next step 2018, the Web server 106 generates a database command designed to add a new record to the browse table of the traffic analysis database. It will be understood that such a database command accepts parameters representing values for the fields of a new record of the browse table. To supply a value for the Consumer_ID field of the new record, the Web server 106 access the consumer's cookie identifier and extracts the unique Consumer_ID value. The Web server establishes a value for the Template_File field of the new record by extracting a template file name from the URL of the request message. One of ordinary skill will appreciate that a URL of "http:\\www.elecstore.com\auto.htm" includes a template file "auto.htm" and that methods for extracting such a template file name are known. The Date and Time fields are established by accessing, respectively, a common calendar routine and a common clock routine of the operating system under which the Web server 106 operates.

In the step 2018, the Web server 106 issues the database command to the traffic analysis database to add a new record to the browse table identifying the consumer, the page accessed, and the date and time of the access. In the next step 2020, the Web server scans the URL in the request message, and extracts the name of a template file.

In a further step 2022, the Web server 106 invokes an HTML page engine. The HTML page engine, in an additional step 2024, opens the template file and scans for customize references. A customize reference comprises data which references a series of commands to construct a Web page customized for a particular consumer. One of ordinary skill will appreciate that a customize reference may include a command script or may comprise an identifier used to reference a command script. In a preferred embodiment, the customize reference is an identifier such as "<<customize>>" (i.e., a unique character string), and the HTML page engine includes computer instructions that are performed when the HTML page engine finds a customize reference in a template file.

Next, in an additional step 2026, the HTML page engine scans the template file and determines whether there is a customize reference in the template file. If not, then, in a next step 2027, the HTML page engine determines whether any cross sale related product information is associated with the consumer and, if so, generates HTML hyperlink tags to Web pages describing the cross sale products. After adding these cross sale product hyperlink tags to the requested HTML file or template file, the HTML page engine deletes any association between cross sale product information and the consumer. In a further step 2028, the Web server 106 transmits the template file (a compliant HTML file) to the Web browser 102.

If, however, in the step 2026, the HTML page engine determines that a customize reference exists in the template file, then, in a further step 2030, the HTML page engine queries the browse table of the traffic analysis database for all records having a Consumer_ID field matching the Consumer_ID value of the consumer's cookie. The resulting set of data records describes all prior accesses by the consumer to any of the Web pages of the electronic store.

In a next step 2032, the HTML page engine examines the resulting set of data records to determine whether the consumer accessed any Web page with sufficient frequency to create additional hyperlinks to the page for the benefit of the consumer. Threshold access frequencies are stored as a set of preferred page rules. One of ordinary skill will understand that Web page access frequencies may be expressed as a certain minimum number of accesses within a certain time period. Thus, a Web page access frequency may comprise two values: (1) an access total (i.e., an integer representing the number of times a consumer accessed a particular Web page), and (2) a time period (e.g., an integer representing a number of days). Accordingly, a set of preferred page rules comprises one or more paired values, and each particular preferred page rule comprises one pair of values.

One of ordinary skill will appreciate that many methods exist whereby a store designer enters preferred page rules. According to one method, a store designer selects a preferred rules command 778 of the store design user interface 760, and enters new rules or modifies or deletes existing rules by interacting with a dialogue box which displays a list of existing rules, as well as fields to enter new rules. The present invention is not limited by any method of entering preferred page rules.

The following is an example set of three preferred page rules: (3, 10), (4, 20), (5, 30). The first preferred page rule, (3, 10), is satisfied if a consumer accessed a particular page three or more times within ten days. The second preferred page rule, (4, 20), is satisfied if a consumer accessed a certain page four or more different times in a twenty-day period. Likewise, the third preferred page rule, (5, 30), is satisfied whenever a consumer accesses a particular page five or more times within thirty days.

By sequentially examining each data record resulting from the query, the HTML page engine creates a list of each Web page the consumer accessed. Starting with the first Web page in the list, the HTML page engine determines whether any of the preferred page rules is satisfied by any subset of data records describing accesses to that Web page. Then, the HTML page engine determines whether any of the preferred page rules is satisfied by any subset of data records describing accesses to the second Web page in the list. In this manner, the HTML page engine determines whether, for any Web page in the list, any of the preferred page rules is satisfied.

In an alternative embodiment, preferred page rules include duration thresholds (each indicating a length of time a consumer views a Web page). In this embodiment, the HTML page engine determines, whether, for any Web page accessed by the consumer, the length of time spent by the consumer accessing the Web page is equal to or exceeds the duration threshold.

If, in the step 2032, the HTML page engine locates at least one preferred page (a page accessed with sufficient frequency to satisfy a preferred page rule), then, in a further step 2034, the HTML page engine extracts from browse table data records the Template_
ID of each preferred page. In a next step 2036, the HTML page engine uses the Template_ID value of each preferred page to query the group table 206 or the product table 204 for a Group_Name value or a Product_Name value, respectively, associated with the Template_ID.

Then, in an additional step 2038, the HTML page engine combines the Template_ID value and either a Group_Name value or a Product_Name value to create HTML hyperlink tags referencing preferred pages. For example, if a Template_ID is 'sedans.html' and an associated Group_Name is 'Sedans', the HTML page engine creates the HTML hyperlink tag:
<A HREF="/web/sedans.html">Sedans</A>
Thus, the HTML page engine creates an HTML hyperlink tag for each preferred page.

After the HTML page engine creates HTML hyperlink tags, or if, in the step 2032, the HTML page engine located no preferred pages, then, in a next step 2040, the HTML page engine queries the product order database for all records having a Consumer_ID value that matches the Consumer_ID of the consumer's cookie. After extracting all data records from the product order table describing product orders by the consumer, then, in a further step 2042, the HTML page engine determines whether any preferred product rules are satisfied.

It will be understood that a preferred product rule, like a preferred page rule described above, comprises a pair of values: the first value representing a number of times a particular product was ordered by the consumer, and the second value representing a period of time. Thus, a preferred product rule is expressed as a pair of numbers. For example, the preferred product rule (3, 10) is satisfied when a consumer orders at least three units of a particular product within a ten-day period. It will be understood that preferred product rules may be entered, under one method, by selecting the preferred rules command 778 of the store design user interface 760, whereupon a dialogue box is displayed on the store design user interface 760. The dialogue box allows a store designer to delete or alter existing preferred product rules or add new ones. The present invention is not limited by any method of entering preferred product rules.

The HTML page engine, in the step 2042, scans all the data records describing product orders by the consumer and creates a list of Product_ID values, each Product_ID representing a product the consumer has ordered. Beginning with the first Product_ID in the list, the HTML page engine determines whether the product was ordered with sufficient frequency to satisfy a preferred product rule, thus making the product a preferred product of the consumer. One of ordinary skill will appreciate that the HTML page engine examines the Quantity field value of each data record when determining how many units of a particular product were ordered in a particular time period.

In an alternative embodiment, preferred group rules are used. In this embodiment the HTML page engine combines the quantities of products within each group to generate a value for each product group indicating the number of products from each group that the consumer has ordered. It will be understood that each such value generated may represent the number of products of each group ordered on each day by the consumer. The HTML page engine determines whether products of any group were ordered with sufficient frequency to satisfy a preferred group rule.

If, in the step 2042, the HTML page engine determines that at least one product is a preferred product of the consumer, then, in a further step 2044, the HTML page engine extracts a Product_ID value from a product order table data record for each preferred product. The HTML page engine then uses each Product_ID value to query the product table 204 for an associated Template_ID value and an associated Product_Name value.

In a next step 2046, the HTML page engine combines the Template_ID value and Product_Name value associated with each preferred product to create an HTML hyperlink tag for each preferred product. For example, if a Template_ID value is "hacksawb.html" and a Product_Name value is "Hacksaw Blade", then the HTML page engine creates the HTML hyperlink tag:
<A HREF="/web/hacksawb.html">Hacksaw Blade</A>Thus, the HTML page engine creates an HTML hyperlink tag for each preferred product. One of ordinary skill in the art will appreciate that, when preferred group rules are used, a similar hyperlink tag may be generated in the same manner to associate a Template_ID value with a Group_Name value.

After constructing any HTML hyperlink tags for preferred products, or if, in the step 2042, the HTML page engine determines there are no preferred products, then, in an additional step 2048, the HTML page engine removes the customize reference from the template file. In a next step 2050, the HTML page engine replaces the customize reference with any HTML hyperlink tags created. After the step 2050, the template file is an HTML compliant file. Then, in the step 2027, the HTML page engine adds to the HTML file hyperlink tags to Web pages describing cross sale related products if any such product information has been associated with the consumer. The HTML page engine then deletes any association between cross sale related product information and the consumer. Then, in the step 2028, the HTML page engine terminates and the Web server 106 transmits the HTML file to the Web browser 102.

Figure 21:
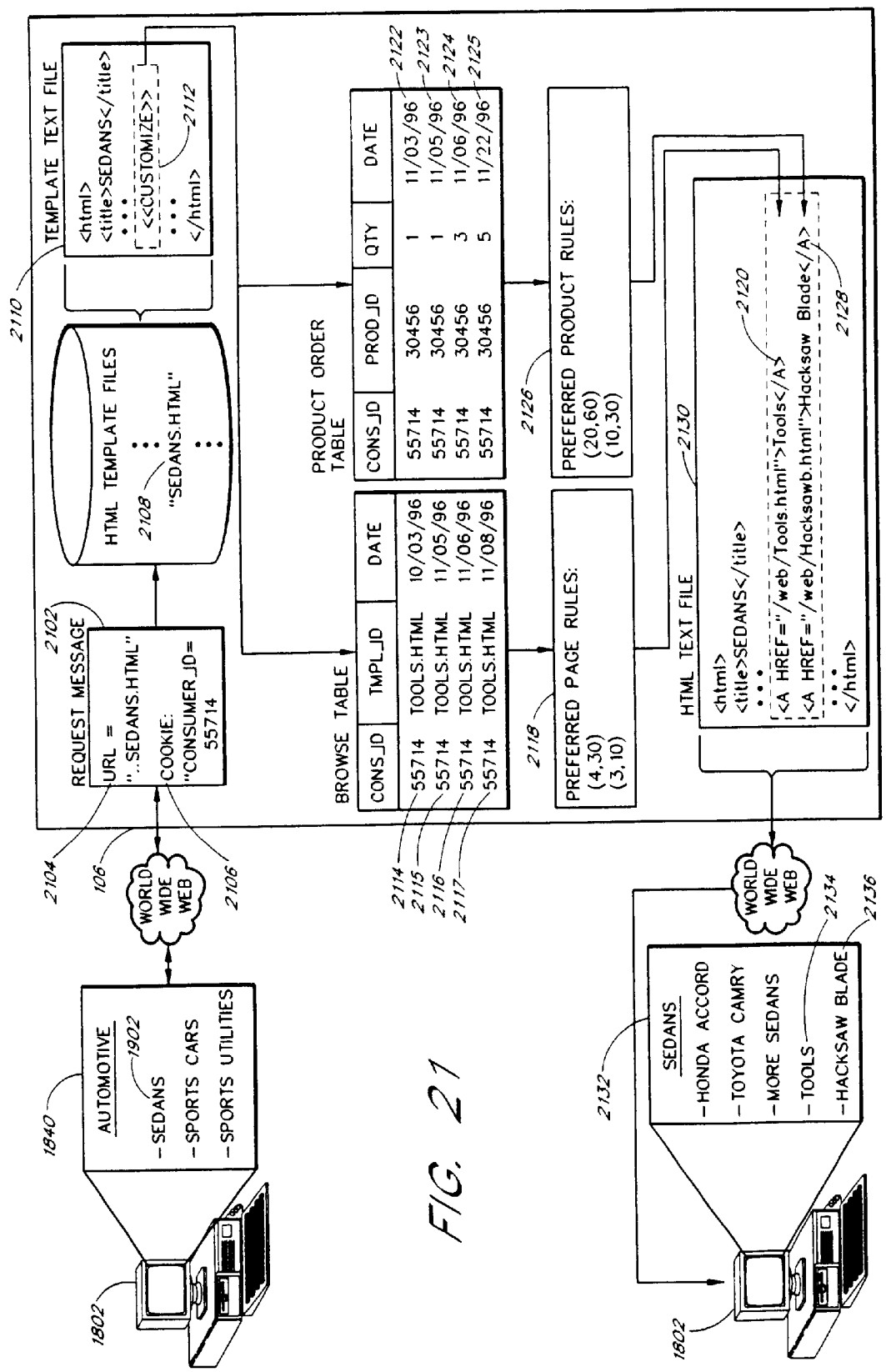
FIG. 21 illustrates an example of steps performed according to the present invention to customize a Web page of an electronic store for a particular consumer.

FIG. 21 illustrates an example of steps performed to customize a Web page of an electronic store for a particular consumer. A Web browser 102 running on a computer 1802 displays a Web page 1840 at a time $t_2$. The Web page 1840 includes a hyperlink 1902 labelled "Sedans". A consumer selects the "Sedans" hyperlink 1902, and the Web browser 102 generates a message 2102 requesting a Web page related to the "Sedans" hyperlink 1902 and transmits the message over the World Wide Web to the Web server 106.

The Web server 106 scans the request message 2102 for a URL 2104 and a cookie identifier 2106. The Web server 106 then scans the URL 2104 for the name of a template file (e.g., "sedan.html") and also scans the cookie identifier 2106 for a Consumer_ID value (e.g., "55714") uniquely identifying the consumer.

The Web server then invokes the HTML page engine. The HTML page engine uses the template file name found in the URL 2104 to open a template file 2108 having the same name. The template file 2108 includes ASCII text, HTML tags, and customize references. The HTML page engine scans the opened template file 2110 for a customize reference, and locates a customize reference 2112 comprising a character string, "<<CUSTOMIZE>>".

The HTML page engine then uses the Consumer_ID value of the cookie identifier 2106 to query data records from both the browse table and the product order table of the traffic analysis database. A set of data records describing all page accesses by the consumer is extracted from the browse table, and a set of data records describing all product orders placed by the consumer is extracted from the product order table.

Four data records extracted from the browse table 2114, 2115, 2116, 2117 describe accesses to a Web page associated with a template file "tools.html". Note, data records describing accesses to other pages are not illustrated in FIG. 21. The HTML page engine then determines whether the Web page associated with the "tools.html" template file is a preferred page. Thus, the HTML page engine accesses preferred page rules 2118, then examines the data records to determine whether any set of the four records 2114, 2115, 2116, 2117 satisfies one of the preferred page rules. If there are two preferred page rules, for example (4, 30) and (3, 10), then the HTML page engine determines that the first preferred page rule, (4, 30), is not satisfied because the Web page associated with the template file "tools.html" was not accessed four times within thirty days. However, the second preferred page rule, (3, 10), is satisfied because, as indicated by three of the browse table data records, 2115, 2116, 2117, the page was accessed three times within ten days.

After determining that the Web page associated with the "tools.html" template file is a preferred page, the HTML page engine then creates an HTML hyperlink tag 2120 which references that Web page. The HTML page engine locates the Group_Name "Tools" by using the template file name "tools.html" to query the group table 206 for an associated Group_Name.

Next, the HTML page engine examines the data records extracted from the product order table to determine whether, for this consumer, there are any preferred products. Four data records 2122, 2123, 2124, 2125 of the product order table describe orders placed by the consumer for a particular product (e.g., a hacksaw blade). The HTML page engine accesses preferred product rules 2126 and finds two such rules: (20, 60) and (10, 30). The HTML page engine determines that the first rule is not satisfied because the consumer did not order 20 units of the product within 60 days. However, the second rule is satisfied because, the sum of the value of the quantity fields of the four records 2122, 2123, 2124, 2125 is 10 and all of the four orders were placed within a 30-day period.

After finding a preferred product for the consumer, the HTML page engine constructs an HTML hyperlink tag 2128 for the product. The HTML page engine uses the Product_ID value for the preferred product to query the product table 204 for a Template_ID value (e.g., "hacksawb.html") and a Product_Name value (e.g., "Hacksaw Blade").

The HTML page engine then constructs an HTML file 2130 by replacing the customize reference 2112 with the constructed HTML hyperlink tags 2120, 2128. The HTML page engine then termninates, and the Web server 106 transmits the HTML file 2130 to the Web browser 102. The Web browser 102 interprets the HTML file 2130 into a Web page display 2132 having a hyperlink 2132 labelled "Tools" and a hyperlink 2136 labelled "Hacksaw Blade".

In the manner described above, the Merchant Workbench permits a designer of an electronic store to construct the Web pages of the store in such a way that the electronic store can automatically adjust the navigable links between pages as well as the content on pages to better suit the needs of individual consumers. One of ordinary skill in the art will appreciate that the mechanisms described above also permit a store designer to customize for a particular consumer any promotional information, sale information, or other content on particular Web pages.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A system for viewing product information, comprising:

a web server configured to run on a first computer;

a product information database including information describing a hierarchical relationship between groups of products, said product information database stored on a computer storage media, said web server having access to said product information database;

a web browser configured to run on a second computer, said web browser configured to generate a user interface, said user interface displaying icons representing said groups of products, said icons arranged to visually represent said relationship between said groups of products, said web browser configured to send a network message over a network to said web server in response to selection by a user of the second computer of one of said icons representing a first of said groups of products, said network message including a database query command that specifies a query of said product information database for related groups of products having said relationship to said first group of products; and said web server configured to submit said query to said product information database, and to return to said web browser a web page including results of said query, said web page including information describing said related groups of products, said web browser configured to extract said information describing said related groups of products and to display second icons representing said related groups of products.

2. The system as described in claim 1 wherein said network message complies with an Internet protocol and said network is the Internet.

3. The system as described in claim 1 wherein an arrangement of said additional icons displayed by said user interface represents said relationship between said first group and said related groups.

4. A system for viewing product information, comprising:

a web server configured to run on a first computer;

a product information database including information describing a hierarchical relationship between a product and a group of products, said product information database stored on a computer storage media, said web server having access to said product information database;

a web browser configured to run on a second computer, said web browser configured to generate a user interface, said user interface displaying an icon representing said groups of products, said web browser responsive to user input such that a user, by selecting said icon, queries said product information database for any products having said relationship to said group of products and, in response to said selection, said user interface displays information representing said product;

a network message including a database query command, said message sent over a network by said web browser to said web server, said web server extracting said database query command from said network message to query said product information database; and a web page including information representing said product, said web page sent over said network by said web server to said web browser, said web browser extracting said information representing said product to display a product icon representing said product, wherein an arrangement of said information displayed on said user interface represents said hierarchical relationship between said product and said group of products.

5. The system as described in claim 4 wherein said network message complies with an Internet protocol and said network is the Internet.

6. A system for generating web pages of an electronic store, comprising:

a web browser configured to run on a first computer;

a web server configured to run on a second computer;

a product information database including information describing a relationship between a group of products, said product information database comprising a relationship table that describes a relationship among a group of products, and a group table that is referenced by the relationship table, the group table containing data records that are identifiable by an ID value and further containing a product name and a template file name, said product information database stored on a computer storage media, said web server having access to said product information database;

a first web page including a first hyperlink identifying a template file stored on said computer storage media, said template file including content data complying with an Internet protocol and a database query command;

an Internet message including information identifying said template file, said Internet message generated by said web browser and sent over the Internet to said web server in response to a user selecting said first hyperlink; and a second web page generated by said web server in response to receipt of said Internet message, said web page including said content data and also including result data generated by querying said product information database using said database query command, said result data containing at least one product name and at least one corresponding template file name.

7. The system as described in claim 6 wherein said content data include a hyperlink identifying a second template.

8. The system as described in claim 6 wherein said result data describe products or groups of products.

9. A method for automatically generating a web page wherein variable content data included in said web page are extracted from a database, said method comprising the steps of:

embedding a database reference within a template web page at a server, said database reference representing a database query, said template web page including fixed content data compatible with a network protocol;

monitoring web page requests;

responding to a request for a web page by scanning said template web page for said database reference;

extracting variable content data from said database by querying said database using said database query;

combining said variable content data with said fixed content data to create a web page; and transmitting said web page to said network.

10. The method as described in claim 9 wherein said network in the Internet and wherein said web page complies with an Internet protocol.

11. The method as described in claim 10 wherein said fixed content data and said variable content data describe inventory of an electronic store.

12. A method for viewing product inventory information, said method comprising the steps of:

displaying, on a user interface of a web browser running on a first computer, a first group icon representing a first group of products of an electronic store;

monitoring user input for selection of said first group icon;

responding to said selection of said first group icon by embedding a database query command in a network message, said database query command designed to query a product inventory database for information describing groups of products related to said first group of products, the database query command containing at least one HTML template file request;

processing said network message with a second computer to extract from said network message said database query command including the one HTML template file request;

opening a template file corresponding to the one HTML template file request;

searching the opened template file for any query scripts;

querying a product inventory database using a query script to generate query result data including information describing a second group of products related to said first group of products;

embedding said query result data in a web page, the query result data including at least one name and template file;

processing said web page with said first computer to extract said query result data; and displaying a second group icon on said user interface at a location indicating that said second group icon is subordinate to said first group icon, said second group icon representing said second group products.

13. The method as described in claim 12 wherein said network message and said web page comply with respective Internet protocols and said network is the Internet.

14. The method as described in claim 12 further comprising the steps of: monitoring user input for selection of said second group icon; and responding to said selection of said second group icon by displaying on said user interface said information describing said second group of products.

15. The method as described in claim 14 further comprising the steps of:
- monitoring user input for selection of a contract icon associated with said first group icon;
- responding to selection of said contract icon by hiding said second group icon from view on said user interface;
- monitoring user input for selection of an expand icon associated with said first group icon; and
- responding to selection of said expand icon by displaying said second group icon on said user interface at a location indicating that said second group icon is subordinate to said first group icon.

16. The method as described in claim 12 wherein said database query command is designed to query a product inventory database for information describing a product related to said first group of products, wherein aid query result data include information describing a product related to said first group of products, and wherein said step of displaying comprises displaying a product icon on said user interface at a location indicating that said product icon is subordinate to said first group icon, said product icon representing said product.

17. The method as described in claim 16 further comprising the steps of:
- monitoring user input for selection of a contract icon associated with said first group icon;
- responding to selection of said contract icon by hiding said product icon from view on said user interface;
- monitoring user input for selection of an expand icon associated with said first group icon; and
- responding to selection of said expand icon by displaying said product icon on said user interface at a location indicating that said product icon is subordinate to said first group icon.

\* \* \* \* \*

UNITED STATES PATENT AND TRADEMARK OFFICE
CERTIFICATE OF CORRECTION

PATENT NO.    : 6,484,149 B1
DATED         : November 19, 2002
INVENTOR(S)   : Jammes et al.

It is certified that error appears in the above-identified patent and that said Letters Patent is hereby corrected as shown below:

<u>Title page,</u>
Item [56], insert the heading -- FOREIGN PATENT DOCUMENTS --; and insert the Cited References -- EP  0123456-A2  01/2000 --.

<u>Column 11,</u>
Line 10, replace "Related_I_Type" with -- Related_ID_Type --.

<u>Column 17,</u>
Line 6, replace "Group_," with -- Group_ID, --.

<u>Column 20,</u>
Line 16, replace "000." with -- 1000. --.

<u>Column 33,</u>
Line 23, replace "tenninates" with -- terminates --.

<u>Column 46,</u>
Line 13, replace "byperlink" with -- hyperlink --.

<u>Column 56,</u>
Line 2, replace "termninates," with -- terminates, --.

Signed and Sealed this

Twentieth Day of May, 2003

JAMES E. ROGAN
*Director of the United States Patent and Trademark Office*